US008601556B2

(12) United States Patent (10) Patent No.: US 8,601,556 B2
Kanekar (45) Date of Patent: Dec. 3, 2013

(54) SYSTEMS AND METHODS FOR HANDLING SSL SESSION NOT REUSABLE ACROSS MULTIPLE CORES

(75) Inventor: Tushar Kanekar, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1199 days.

(21) Appl. No.: 12/489,333

(22) Filed: Jun. 22, 2009

(65) Prior Publication Data

US 2010/0325420 A1 Dec. 23, 2010

(51) Int. Cl.
*H04L 29/06* (2006.01)
*G06F 15/16* (2006.01)

(52) U.S. Cl.
USPC ...... 726/6; 726/7; 726/10; 713/151; 713/164; 709/228; 709/237

(58) Field of Classification Search
USPC ............. 713/151, 164; 726/3–7, 10; 709/227, 709/228, 230, 237
See application file for complete search history.

(56) References Cited

U.S. PATENT DOCUMENTS

| | | | | |
|---|---|---|---|---|
| 5,928,363 | A * | 7/1999 | Ruvolo | 726/22 |
| 6,349,337 | B1 * | 2/2002 | Parsons et al. | 709/227 |
| 6,418,472 | B1 | 7/2002 | Mi et al. | |
| 7,062,570 | B2 * | 6/2006 | Hong et al. | 709/238 |
| 7,111,162 | B1 * | 9/2006 | Bagepalli et al. | 713/151 |
| 8,081,958 | B2 | 12/2011 | Soderstrom et al. | |
| 8,335,943 | B2 * | 12/2012 | Kamath et al. | 714/4.1 |
| 2004/0199586 | A1 | 10/2004 | Kaler et al. | |
| 2005/0213498 | A1 * | 9/2005 | Appanna et al. | 370/216 |
| 2005/0223359 | A1 | 10/2005 | Rao Nagaraju et al. | |
| 2008/0127296 | A1 | 5/2008 | Carroll et al. | |
| 2009/0287826 | A1 | 11/2009 | Kaufman et al. | |

OTHER PUBLICATIONS

US Notice of Allowance on U.S. Appl. No. 12/489,320 dated Jul. 19, 2012.
US Office Action on U.S. Appl. No. 12/489,320 dated Oct. 12, 2011.
US Office Action on U.S. Appl. No. 12/489,320 dated Apr. 3, 2012.
US Office Action on U.S. Appl. No. 12/489,325 dated Mar. 13, 2013.

\* cited by examiner

*Primary Examiner* — Zachary A Davis
(74) *Attorney, Agent, or Firm* — Foley and Lardner LLP; Christopher J. McKenna

(57) ABSTRACT

The present invention is directed towards systems and methods for managing SSL session persistence and reuse in a multi-core system. A first core may indicate that an SSL session established by the first core is non-resumable. Responsive to the indication, the core may set an indicator at a location in memory accessible by each core of the multi-core system, the indicator indicating that the SSL session is non-resumable. A second core of the multi-core system may receive a request to reuse the SSL session. The request may include a session identifier of the SSL session. In addition, the session identifier may identify the first core as an establisher of the SSL session. The second core can identify from encoding of the session identifier whether the second core is not the establisher of the SSL session. Responsive to the identification, the second core may determine whether to resume the SSL session.

13 Claims, 23 Drawing Sheets

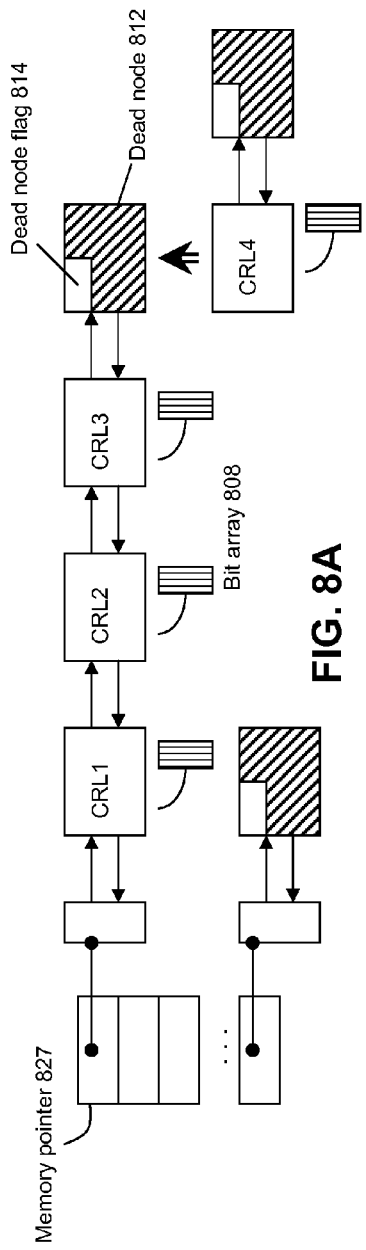
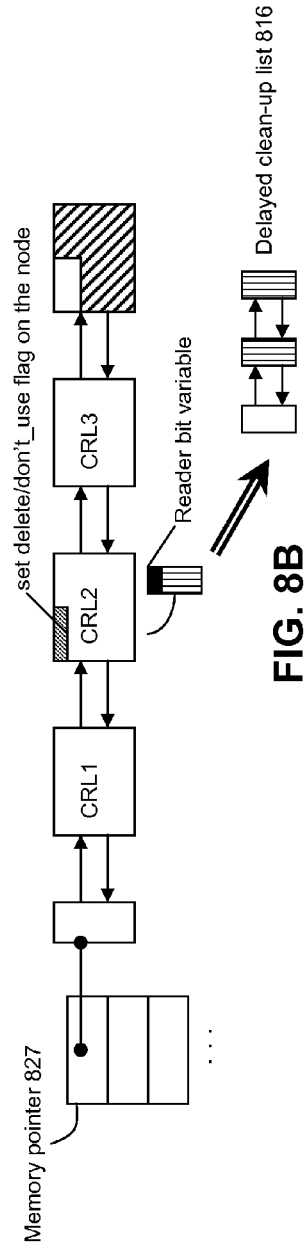
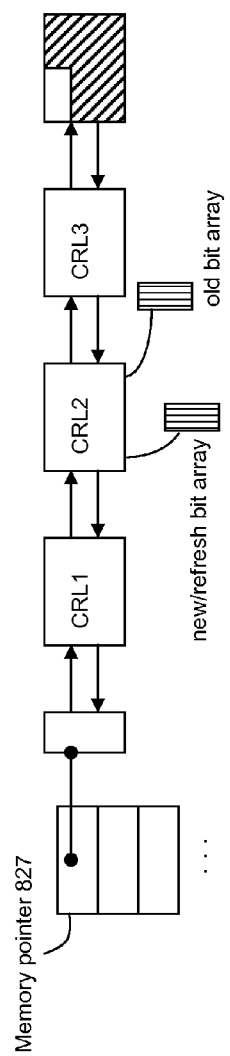
FIG. 8A
FIG. 8B
FIG. 8C

SYSTEMS AND METHODS FOR HANDLING SSL SESSION NOT REUSABLE ACROSS MULTIPLE CORES

FIELD OF THE DISCLOSURE

The present application generally relates to data communication networks. In particular, the present application relates to systems and methods for managing sessions in a multi-processor system.

BACKGROUND

A secure socket layer (SSL) session may be allocated private memory address space and associated with a SSL protocol stack that is independent from other SSL sessions. In a single-core system such as a single-core appliance maintaining a SSL session between a client and a server, the SSL session may be resumed if the SSL session is temporarily disrupted and/or inactive.

A certificate revocation list (CRL) may be used in any cryptographic system, such as a public key infrastructure (PKI) system, for storing information on digital certificates that have been revoked or are no longer valid. A request for connection may include a certificate that has to be validated against a CRL. If information on the certificate matches an entry in the CRL, the request may be refused as the certificate has been identified as revoked.

BRIEF SUMMARY

The present application is directed towards methods and systems for maintaining secure socket layer (SSL) session persistence and reuse, including maintaining a certificate revocation list (CRL), in a multi-core system. In a multi-core system, a client may send a request to resume a SSL session upon a disruption. This request may be directed to one core although the SSL session was originally established by another core. The second core may request information from the other core to create a copy of the SSL session for resuming the client communications. There may also be a need to validate a certificate of the request. The core receiving the request may not have access to a master CRL associated with the certificate and owned by the other core. Instead, the core can access a secondary CRL based on the master CRL.

In one aspect, the present invention is related to a method of identifying a core establishing a SSL connection in a multi-core system via an SSL identifier. The method includes receiving, by a packet engine executing on a first core of the multi-core system, a request from a client to establish a secure socket layer (SSL) session. The core is assigned a core identifier. The packet engine may establish a session identifier for the SSL session. The packet engine may also encode the core identifier in the session identifier to form a second session identifier. Responsive to the request, the packet engine establishes the SSL session with the client using the second session identifier.

In one embodiment, the packet engine of the core of the multi-core system deployed as an intermediary between the client and a server receives a request from the client to establish the SSL session with the server. The multi-core system may assign the core the core identifier based on an identifier of the core. The multi-core system may assign the core a one-byte core identifier. In one embodiment, the packet engine may generate the session identifier for the SSL session. In another embodiment, the core may obtain the session identifier from a server.

The packet engine may encode a byte of the session identifier with the core identifier to form the second session identifier. The packet engine may encode with a block cipher the core identifier and a validity identifier with the session identifier to form the second session identifier. In some embodiments, the packet engine may encode encoding the core identifier into a plurality of bits of the session identifier to form the second session identifier. In one embodiment, the packet engine may determine at a predetermined frequency a predetermined set of one or more bytes of the session identifier to encode to form the second session identifier.

In another aspect, the present invention is related to a method of determining an identifier of a core of a multi-core system via a SSL session identifier. The method includes receiving, by a packet engine executing on a core of the multi-core system, a request from a client via a SSL session. The request may include a session identifier. In addition, the core is assigned a core identifier. The packet engine may decode a second core identifier encoded in the session identifier. The packet engine may also determine whether the second core identifier corresponds to the core identifier of the core.

In one embodiment, a packet engine of the core of the multi-core system deployed as an intermediary between the client and a server receives a request from the client to establish the SSL session with the server. The core can be assigned the core identifier based on an identifier of a processing unit of the core. The core may be assigned a one-byte core identifier. In some embodiments, the packet engine decodes a predetermined byte of the session identifier to obtain the second core identifier. The packet engine may decode with a block cipher the second core identifier to obtain the session identifier. The packet engine may also decode the second core identifier from a plurality of bits of the session identifier.

In one embodiment, the packet engine determines that the second core identifier does not correspond to the core identifier of the core. Responsive to the determination, the packet engine may send a message to a second core identified by the second core identifier to obtain information about the SSL session. The packet engine can establish a copy of the SSL session on the core based on the information about the SSL session obtained from the second core. In one embodiment, the packet engine determines that the second core identifier corresponds to the core identifier of the core, and responsive to the determining, forwarding the request to a server.

In still another aspect, the present invention is related to a method of identifying a non-resumable SSL session among cores in a multi-core system. The method includes indicating, by a first packet engine of a first core of a multi-core system, that an SSL session established by the first core is non-resumable. Responsive to the indication, the first packet engine may set an indicator at a location in memory accessible by each core of the multi-core system, the indicator indicating that the SSL session is non-resumable. A second packet engine of a second core of the multi-core system may receive a request to reuse the SSL session. The request may include a session identifier of the SSL session. In addition, the session identifier may identify the first core as an establisher of the SSL session. The second packet engine can identify from encoding of the session identifier that the second core is not the establisher of the SSL session. Responsive to the identification, the second packet engine may determine not to resume the SSL session.

In one embodiment, the first packet engine of the first core of the multi-core system deployed as an intermediary between the client and a server receives a notification that the SSL session is non-resumable. The first packet engine of the first core of the multi-core system deployed as an intermediary between the client and a server may determine that the SSL session is non-resumable in accordance with a policy. The first packet engine may store to the location in the memory a value for a resumable field associated with the SSL session as the indicator. In some embodiments, a receive side scaler of the multi-core system determines to forward the request to the second core based on a source port indicated by the request.

In one embodiment, the second packet engine identifies a core identifier from a byte of the session identifier. The second packet engine may also determine whether a predetermined maximum reuse threshold has been reached. In some embodiments, the second packet engine may determine that the session identifier is not in a session cache of the second core. In one of these embodiments, the second packet engine removes information about the SSL session from a session cache of the second core. In other embodiments, the second packet engine establishes a second SSL session responsive to the request.

In yet another aspect, the present invention is related to a method of identifying a SSL session as not reusable among cores in a multi-core system. The method includes indicating, by a first packet engine executing on a first core of a multi-core system, that an SSL session is not reusable. The first packet engine may identify, one or more core identifiers of one or more cores of the multi-core system that have requested session information for the SSL session. The first packet engine may transmit to each of the identified one or more cores of the multi-core system a message indicating that the SSL session is non-resumable. A second packet engine of the multi-core system may receive a request to reuse the SSL session established by the first core. The request may include a session identifier of the SSL session. In addition, the session identifier may identify the first core as an establisher of the SSL session. The second packet engine may identify from encoding of the session identifier that the second core is not the establisher of the SSL session. The second packet engine may further determine not to reuse the SSL session based on the message from the first packet engine and the identification that the second core is not the establisher of the SSL session.

In one embodiment, the first packet engine identifies the one or more cores based on a bit pattern of data stored on the first core. A receive side scaler of the multi-core system may determine to forward the request to the second core based on a source port of the request. The second core may decode a core identifier from a byte of the session identifier. The second packet engine may determine whether a predetermined maximum reuse threshold has been reached. The second packet engine may determine that the session identifier is not in a session cache of the second core. In one embodiment, the second packet engine may remove information about the SSL session from a session cache of the second core. In another embodiment, the second core may establish a second SSL session responsive to the request.

In still even another aspect, the present invention is related to a method of identifying an SSL session as not resumable among processors of a plurality of processors. The method includes indicating, by a first processor of multiple processors, that an SSL session is non-resumable. Responsive to the indication, the first processor may set an indicator at a location in memory accessible by each processor of the multiple processors. The indicator may indicate that the SSL session is non-resumable. A second processor of the multiple processors may receive a request to reuse the SSL session established by the first processor. The request may include a session identifier of the SSL session. In addition, the session identifier may identify the first processor as an establisher of the SSL session. The second processor may identify from encoding of the session identifier that the second processor is not the establisher of the SSL session. The second processor may determine not to resume the SSL session responsive to accessing the indicator at the location.

In yet even another aspect, the present invention is related to a method of maintaining a certificate revocation list (CRL) for a multi-core system. The method includes generating, by a first packet engine of a first core, a secondary CRL corresponding to a master CRL maintained by the first core. The CRLs may identify certificates to revoke. The first packet engine can store the secondary CRL to a memory element accessible by the plurality of cores. A second packet engine of a second core of the multi-core system may receive a request to validate a certificate. The second packet engine can provisionally determine, via access to the secondary CRL in the memory element to provisionally revoke the certificate. Responsive to the determination, the second packet engine may send a message to the first core to verify whether the certificate is revoked based on the master CRL.

In one embodiment, the master CRL identifies certificates to revoke and the secondary CRL identifies certificates to provisionally revoke and certificates not to revoke. The CRL generator may generate the secondary CRL to comprise a plurality of bit arrays. The CRL generator may assign each bit array to at least one certificate and set bits of a serial number of each certificate in the assigned bit array. The second packet engine may identify a bit array of the secondary CRL to validate the certificate, the identification based on a name of the certificate's issuer. The second packet engine may determine, via access to the secondary CRL in the memory element that the certificate as not revoked.

The second packet engine may perform a bit scan of the identified bit array against a serial number of the certificate. The serial number comprises a plurality of bits. The second packet engine may determine that the certificate is provisionally revoked based on a matching bit scan against a serial number of the certificate. The second packet engine may determine that the certificate as not revoked based on a non-matching bit scan against a serial number of the certificate. The second packet engine may determine not to send the message based on the determination that the certificate is not revoked.

In yet even another aspect, the present invention is related to a system of maintaining a certificate revocation list (CRL) for a multi-core system. The system includes a master certificate revocation list (CRL) maintained by a first packet engine of a first core of a multi-core system comprising a plurality of cores. A CRL generator of a second core of the multi-core system generates a secondary CRL corresponding to the master CRL. The secondary CRL is stored in a memory element accessible by the plurality of cores. A certificate manager of the second core may receive a request to validate a certificate, determine via access to the secondary CRL in the memory element to provisionally revoke the certificate, and responsive to the determination, send a message to the first core to verify whether the certificate is revoked based on the master CRL.

In one embodiment, the master CRL identifies certificates to revoke and the secondary CRL identifies certificates to provisionally revoke and certificates not to revoke. The secondary CRL may comprise a plurality of bit arrays. The plurality of bit arrays may be assigned to at least one certificate and bits of a serial number of each certificate are set in the assigned bit array. The certificate manager may identify a bit array of the secondary CRL to validate the certificate, the identification based on a name of the certificate's issuer. The certificate manager may determines, via access to the secondary CRL in the memory element that the certificate is not revoked.

The certificate manager may perform a bit scan of the identified bit array against a serial number of the certificate, the serial number comprising a plurality of bits. The certificate manager may determine that the certificate is provisionally revoked based on a matching bit scan against a serial number of the certificate. The certificate manager may determine that the certificate is not revoked based on a non-matching bit scan against a serial number of the certificate. The certificate manager may determine not to send the message based on the determination that the certificate is not revoked.

In one aspect, the present invention is related to a method of maintaining persistence of a SSL session across cores in a multi-core system. The method includes establishing, by a first core of a multi-core system, an SSL session with a client. A second packet engine of a second core of the multi-core system receives a request from the client identifying a session identifier of the SSL session. The second packet engine may identify from a core identifier identified by the session identifier, that a core different than the second core established the SSL session. The second packet engine may determine that the core identifier does not correspond to the second core. The second core may transmit to the core identified by the core identifier a message requesting information about the established SSL session.

In one embodiment, a flow distributor determines to forward the request to the second core based on a source port of the request. The first packet engine may generate the session identifier for the SSL session. The second packet engine may decode the core identifier from a byte of the session identifier. The second packet engine may also determine that the session identifier is not in a session cache of the second core. In one embodiment, the second packet engine may request a minimum set of information to resume the SSL session on the second core. The first core may transmit to the second core, a master key, a client certificate, a name of a cipher, a result of client authentication, and an SSL version. Responsive to the request of the client, the second core may reuse the SSL session from the first core.

In another aspect, the present invention is related to a system of maintaining persistence of a secure socket layer (SSL) session across cores in a multi-core system includes a first packet engine executing on a first core of a multi-core system establishing an SSL session with a client. The system includes a flow distributor of the multi-core system forwarding to a core of the multi-core system a request from the client to reuse the SSL session, the request comprising a session identifier. The system further includes a second packet engine executing on a second core receiving the request and identifying from encoding in the session identifier that a core different than the second core established the SSL session. The second core may transmit to the core identified by the core identifier a message requesting information about the established SSL session.

In one embodiment, the multi-core system is deployed as an intermediary between the client and a server and receives the client's request to establish the SSL session with the server. The first core can be assigned the core identifier based on an identifier of a processing unit of the core. In one embodiment, the first packet engine generates the session identifier for the SSL session. The second packet engine may request a minimum set of information from the first core to reuse the SSL session on the second core.

In still another aspect, the present invention is related to a method of maintaining persistence of a SSL session across processors in a multiple processor system. The method includes establishing, by a first processor of a multiple processor system, an SSL session with a client. A second processor of a multiple processor system may receive a request from the client identifying a session identifier of the SSL session. The second processor may identify that a processor identifier encoded in the session identifier identifies a processor different than the second processor. The second processor may transmit to the processor identified by the processor identifier a message requesting information about the established SSL session.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

The foregoing and other objects, aspects, features, and advantages of the invention will become more apparent and better understood by referring to the following description taken in conjunction with the accompanying drawings, in which:

FIG. 8A-8D are block diagrams of embodiments of a system for supporting certificate revocation lists for client access;

Figure 1A:
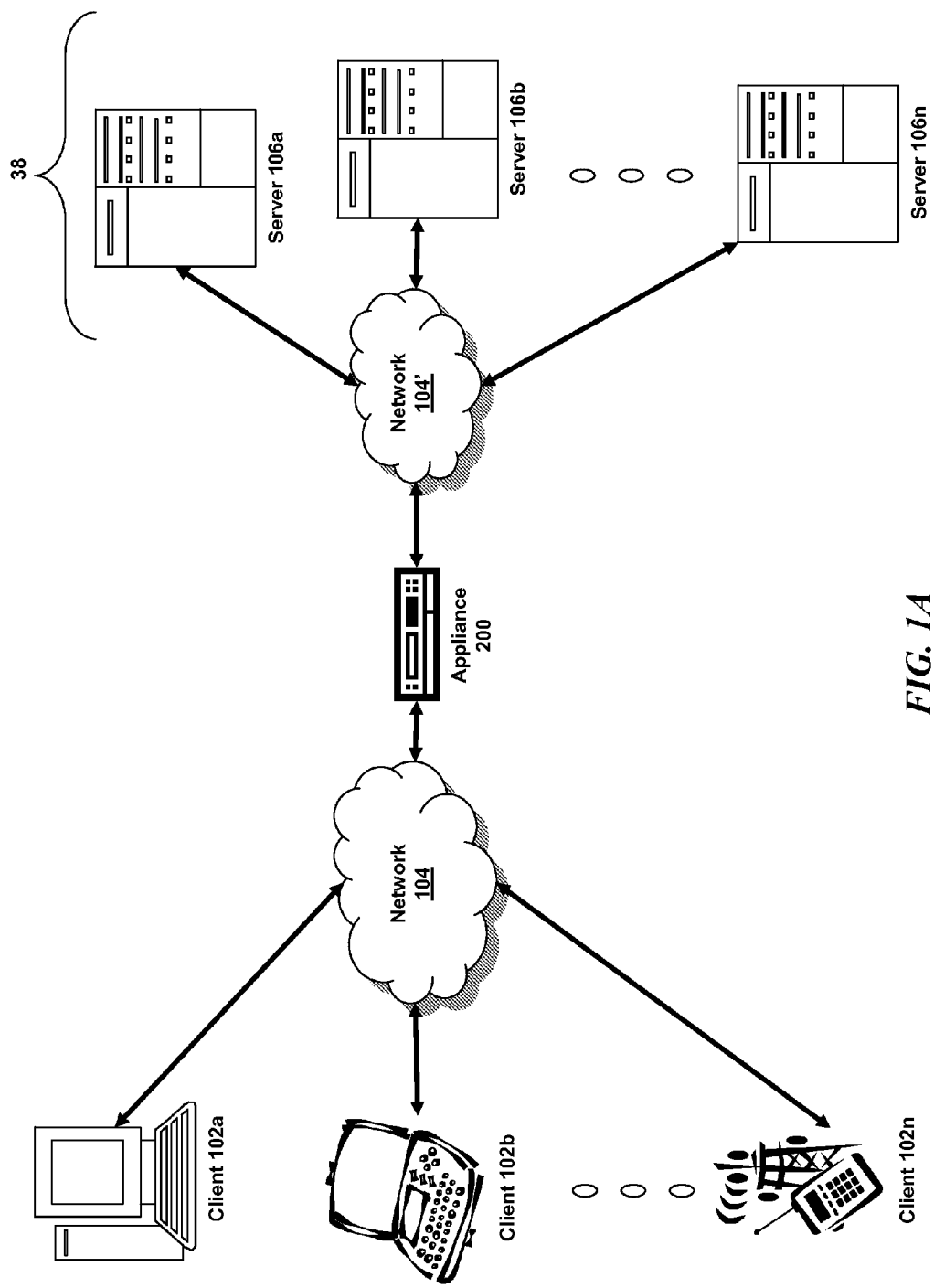
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for accelerating communications between a client and a server;

Section D describes embodiments of systems and methods for virtualizing an application delivery controller;

Section E describes embodiments of systems and methods for providing a multi-core architecture and environment;

Section F describes embodiments of systems and methods for managing SSL session persistence and reuse in a multi-core system; and Section G describes embodiments of systems and methods maintaining certificate revocation lists (CRLs) for client access in a multi-core system.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as servers) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
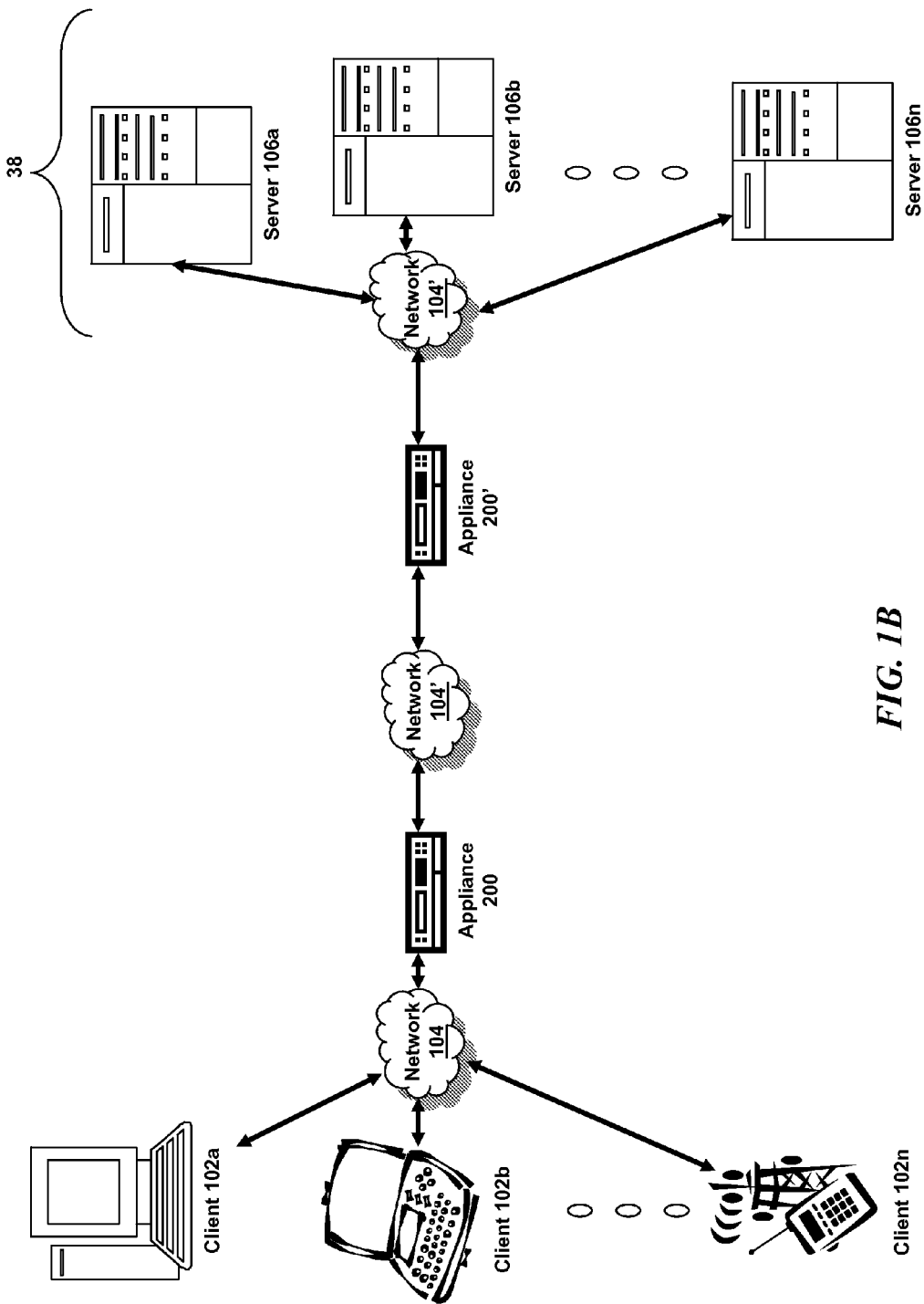
FIG. 1B is a block diagram of an embodiment of an environment for delivering a computing environment from a server to a client via an appliance.
Figure 1C:
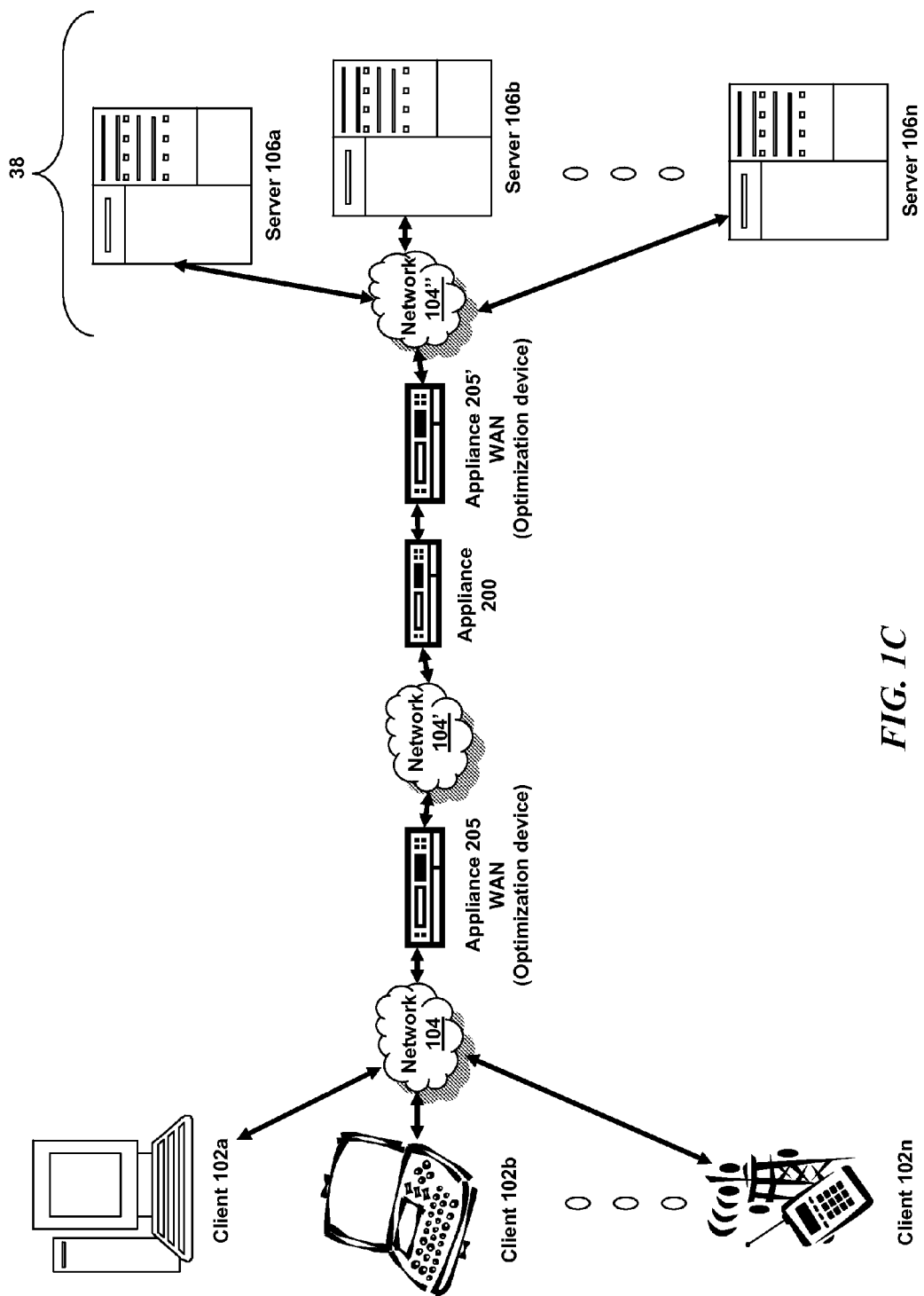
FIG. 1C is a block diagram of another embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
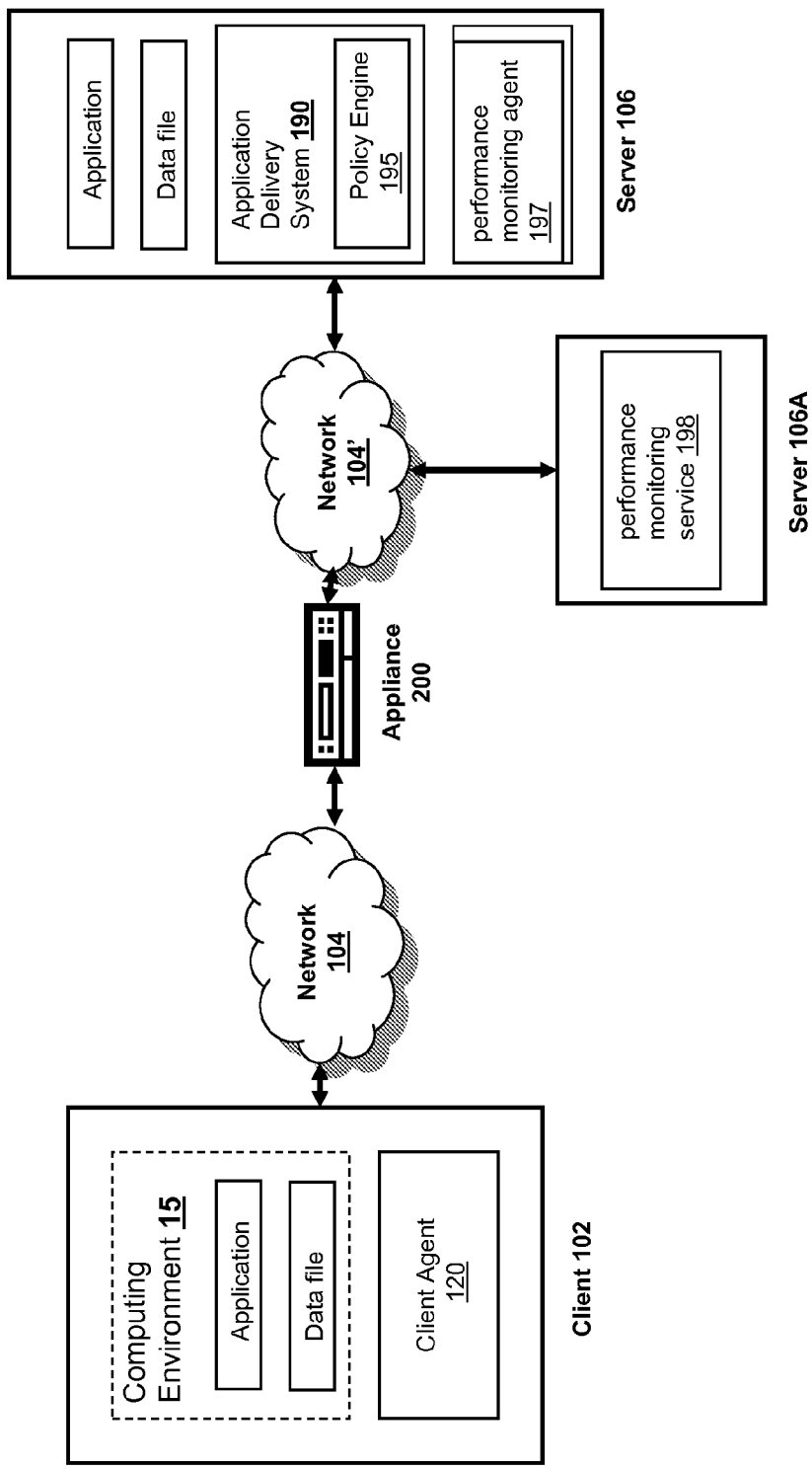
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
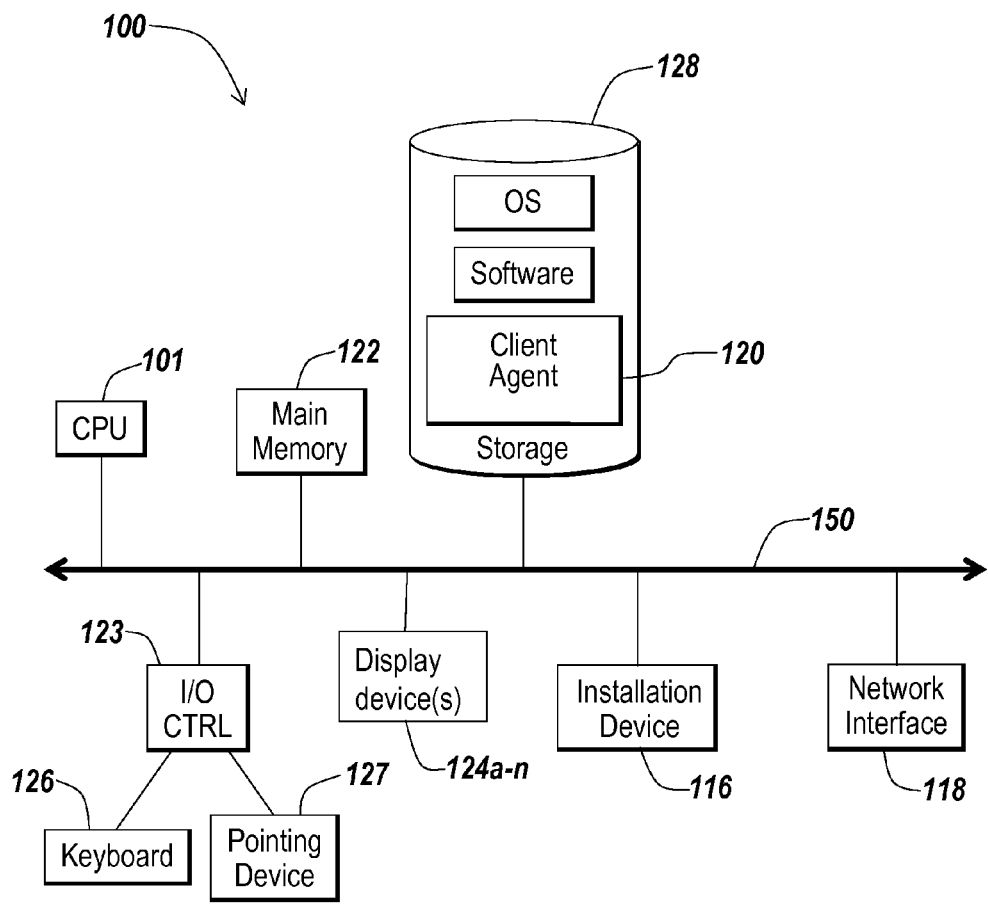
FIGS. 1E-1H are block diagrams of embodiments of a computing device.
Figure 1F:
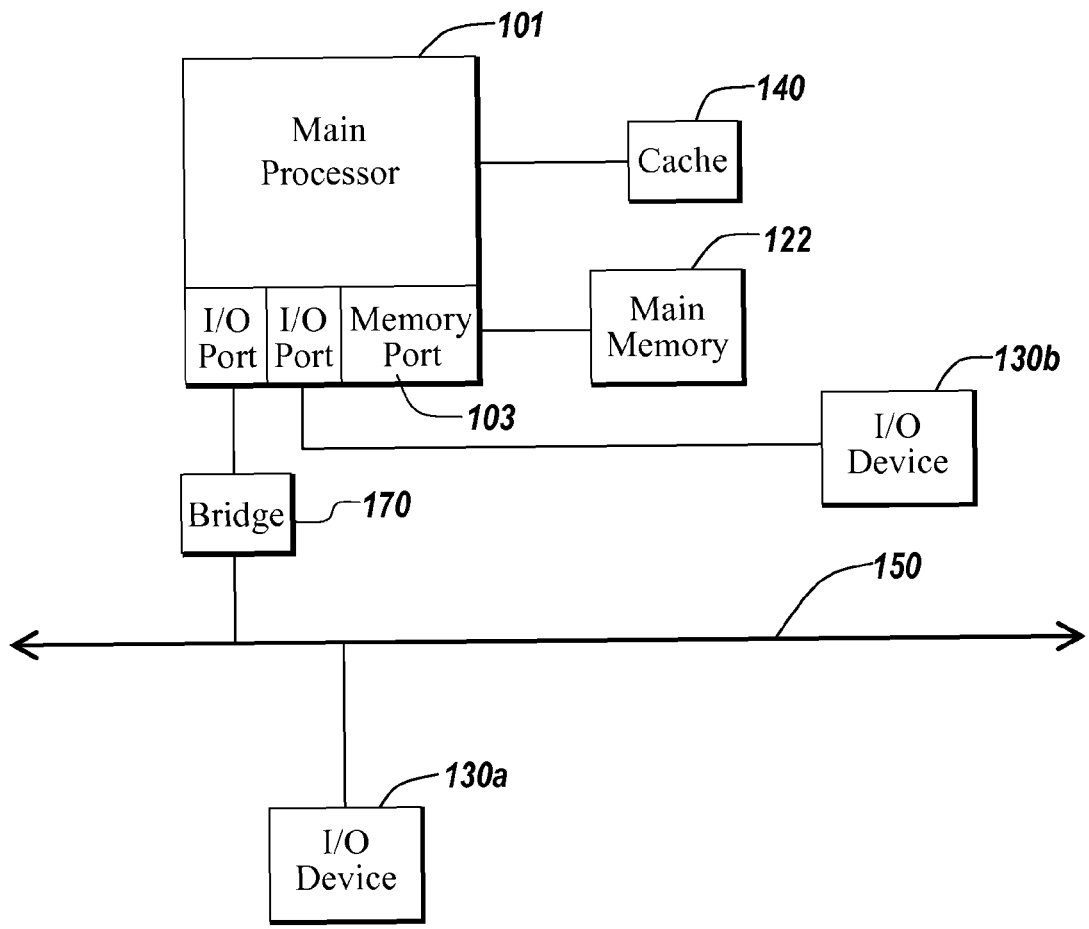

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via HyperTransport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCPI.AMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
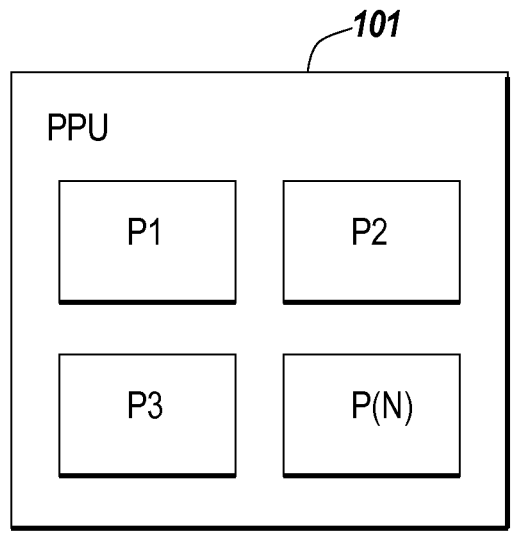

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
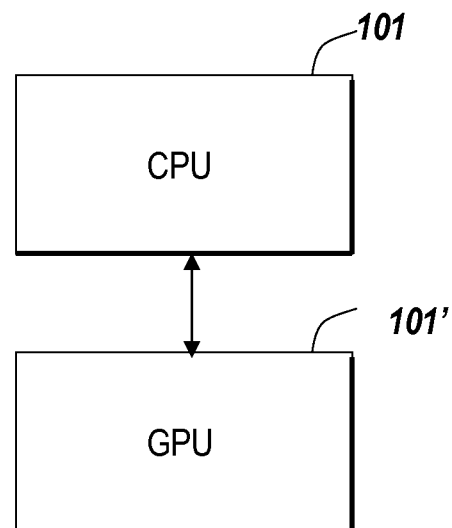

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
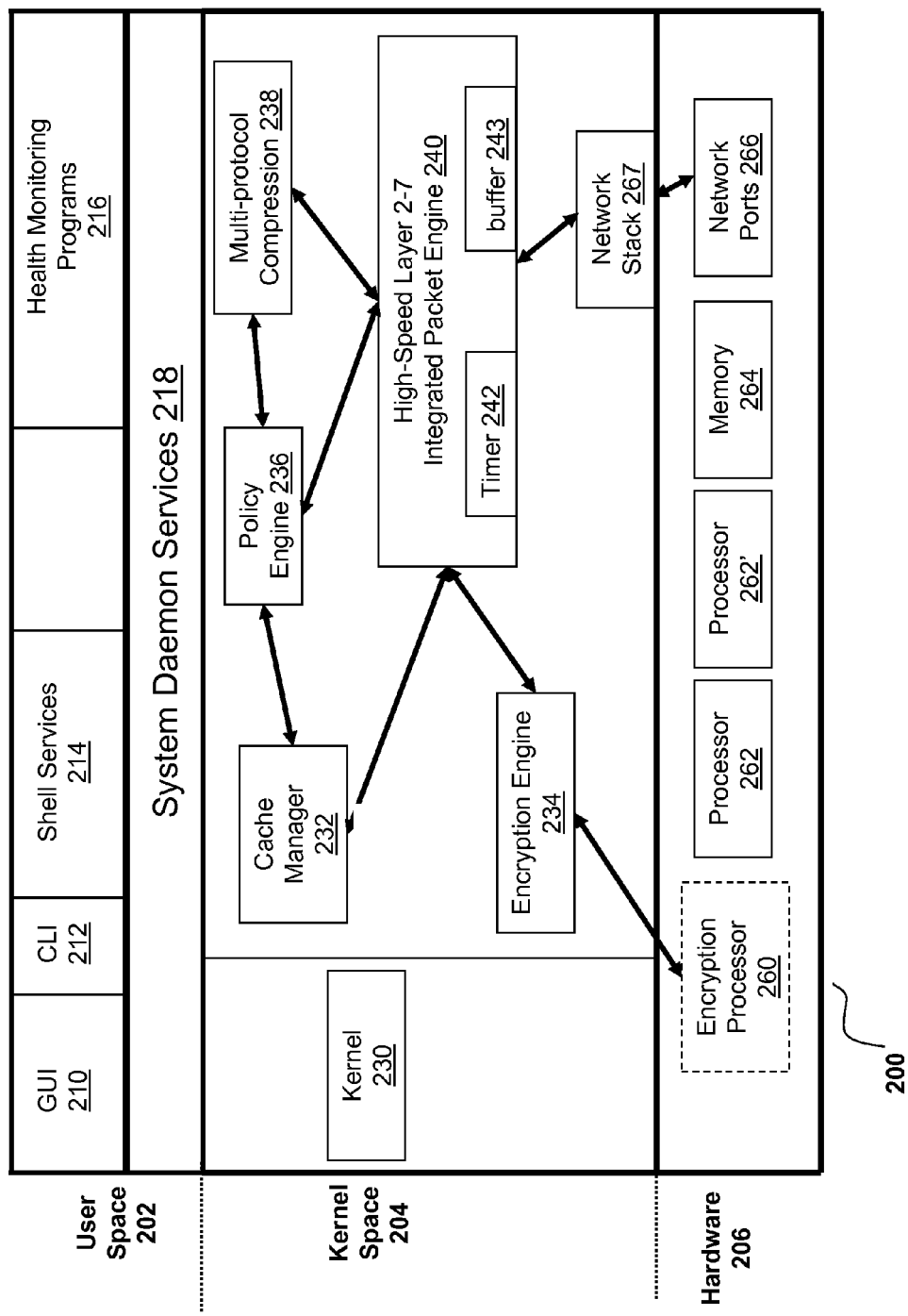
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any realtime operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
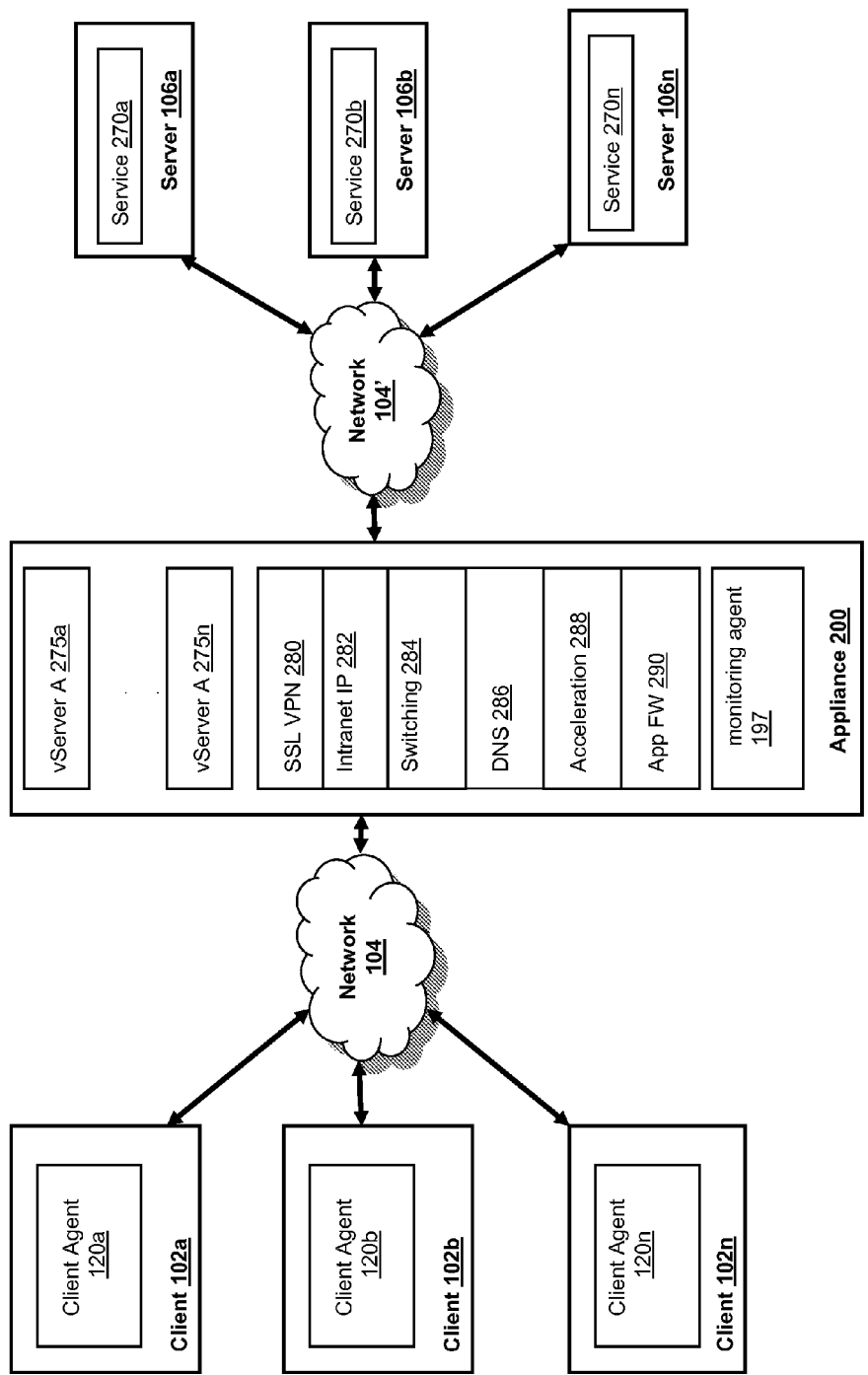
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102 In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 198 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
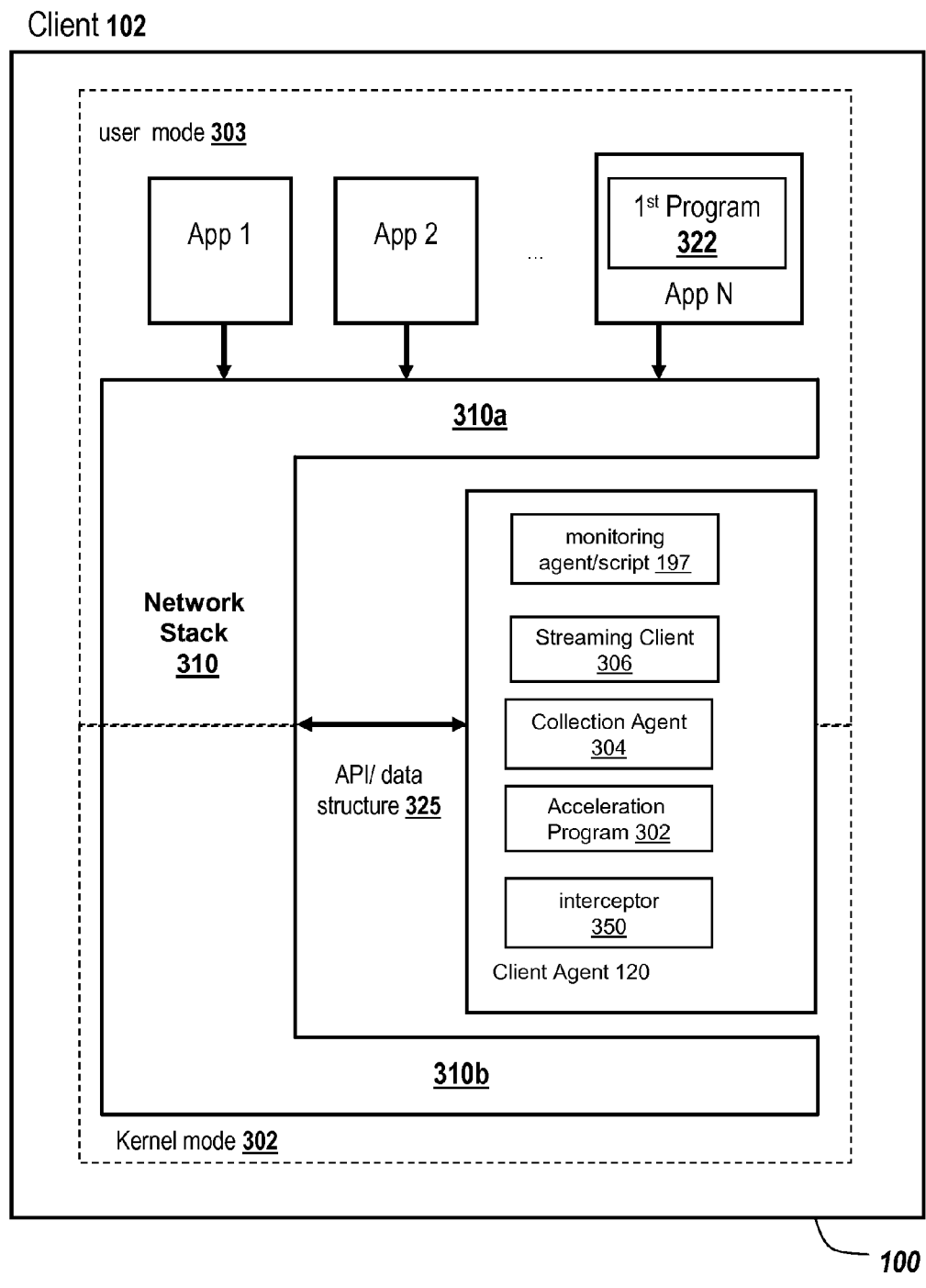
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol. The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 129 monitors and measures performance of any portion of the client agent 120. For example, in some embodiments, the monitoring agent 129 monitors and measures performance of the acceleration program 302. In another embodiment, the monitoring agent 129 monitors and measures performance of the streaming client 306. In other embodiments, the monitoring agent 129 monitors and measures performance of the collection agent 304. In still another embodiment, the monitoring agent 129 monitors and measures performance of the interceptor 350. In some embodiments, the monitoring agent 129 monitors and measures any resource of the client 102, such as memory, CPU and disk.

The monitoring agent 197 may monitor and measure performance of any application of the client. In one embodiment, the monitoring agent 129 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Figure 4A:
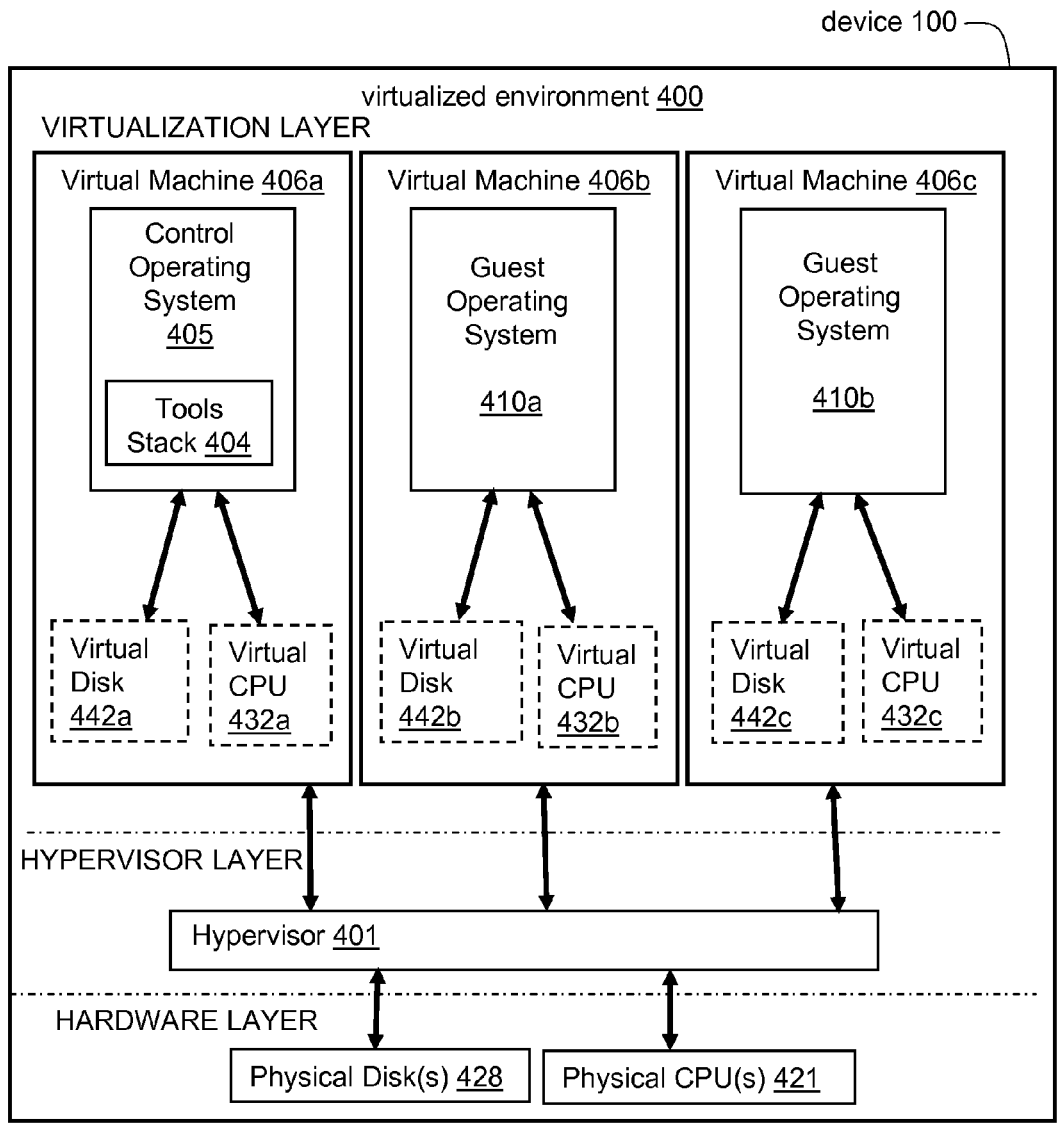
FIG. 4A is a block diagram of an embodiment of a virtualization environment.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406*a-c* (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405*a* on a computing device 100*a* may exchange data with a control operating system 405*b* on a computing device 100*b*, via communications between a hypervisor 401*a* and a hypervisor 401*b*. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100*b*), or managing virtual machines 406*b*, 406*c* on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 104.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4B:
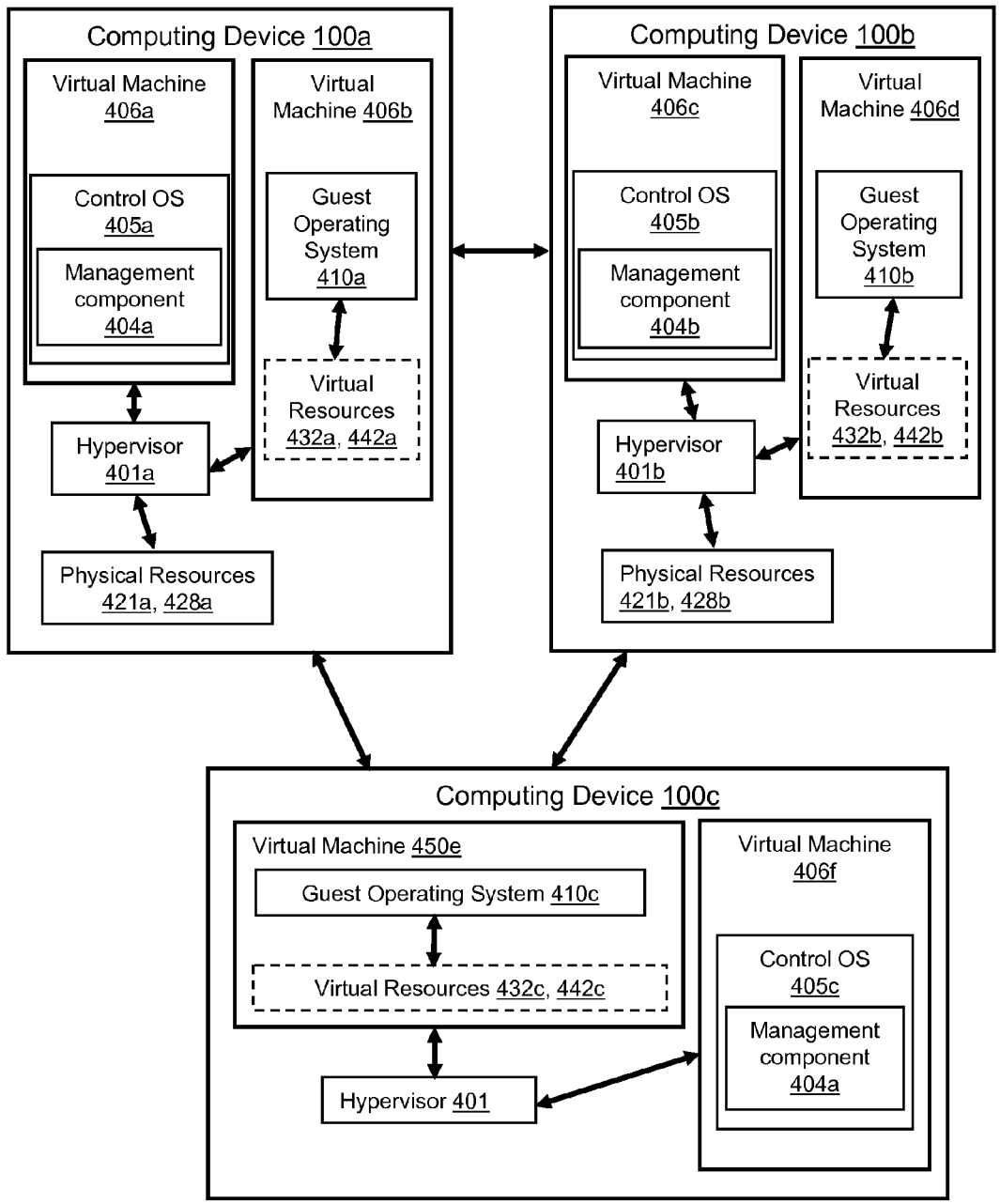
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to as tools stacks 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404a is referred to as a pool management component 404a. In another embodiment, a management operating system 405a, which may be referred to as a control operating system 405a, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406b from one physical machine 100 to another. In further embodiments, the management component 404a identifies a computing device 100b on which to execute a requested virtual machine 406d and instructs the hypervisor 401b on the identified computing device 100b to execute the identified virtual machine; such a management component may be referred to as a pool management component.

Figure 4C:
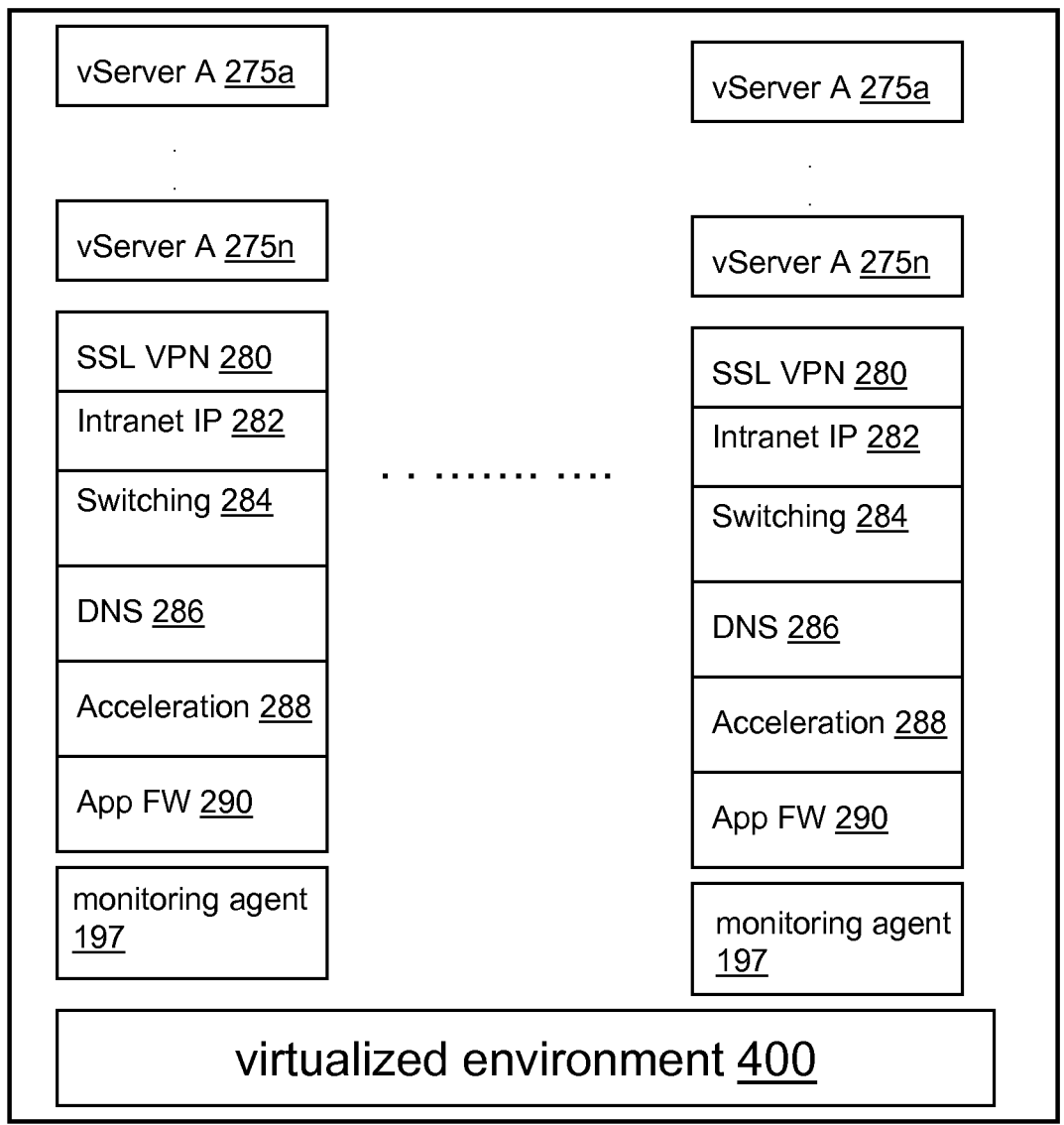
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 280 and monitoring agent may be packaged, combined, designed or constructed in a form of application delivery controller 450 deployable as one or more software modules or components executable on a device and/or virtualized environment 400.

In some embodiments, a server may execute multiple virtual machines 406a-406n in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E. Systems and Methods for Providing A Multi-Core Architecture

In accordance with Moore's Law, the number of transistors that may be placed on an integrated circuit may double approximately every two years. However, CPU speed increases may reach plateaus, for example CPU speed has been around 3.5-4 GHz range since 2005. In some cases, CPU manufacturers may not rely on CPU speed increases to gain additional performance. Some CPU manufacturers may add additional cores to their processors to provide additional performance. Products, such as those of software and networking vendors, that rely on CPUs for performance gains may improve their performance by leveraging these multi-core CPUs. The software designed and constructed for a single CPU may be redesigned and/or rewritten to take advantage of a multi-threaded, parallel architecture or otherwise a multi-core architecture.

A multi-core architecture of the appliance 200, referred to as nCore or multi-core technology, allows the appliance in some embodiments to break the single core performance barrier and to leverage the power of multi-core CPUs. In the previous architecture described in connection with FIG. 2A, a single network or packet engine is run. The multiple cores of the nCore technology and architecture allow multiple packet engines to run concurrently and/or in parallel. With a packet engine running on each core, the appliance architecture leverages the processing capacity of additional cores. In some embodiments, this provides up to a 7× increase in performance and scalability.

Figure 5A:
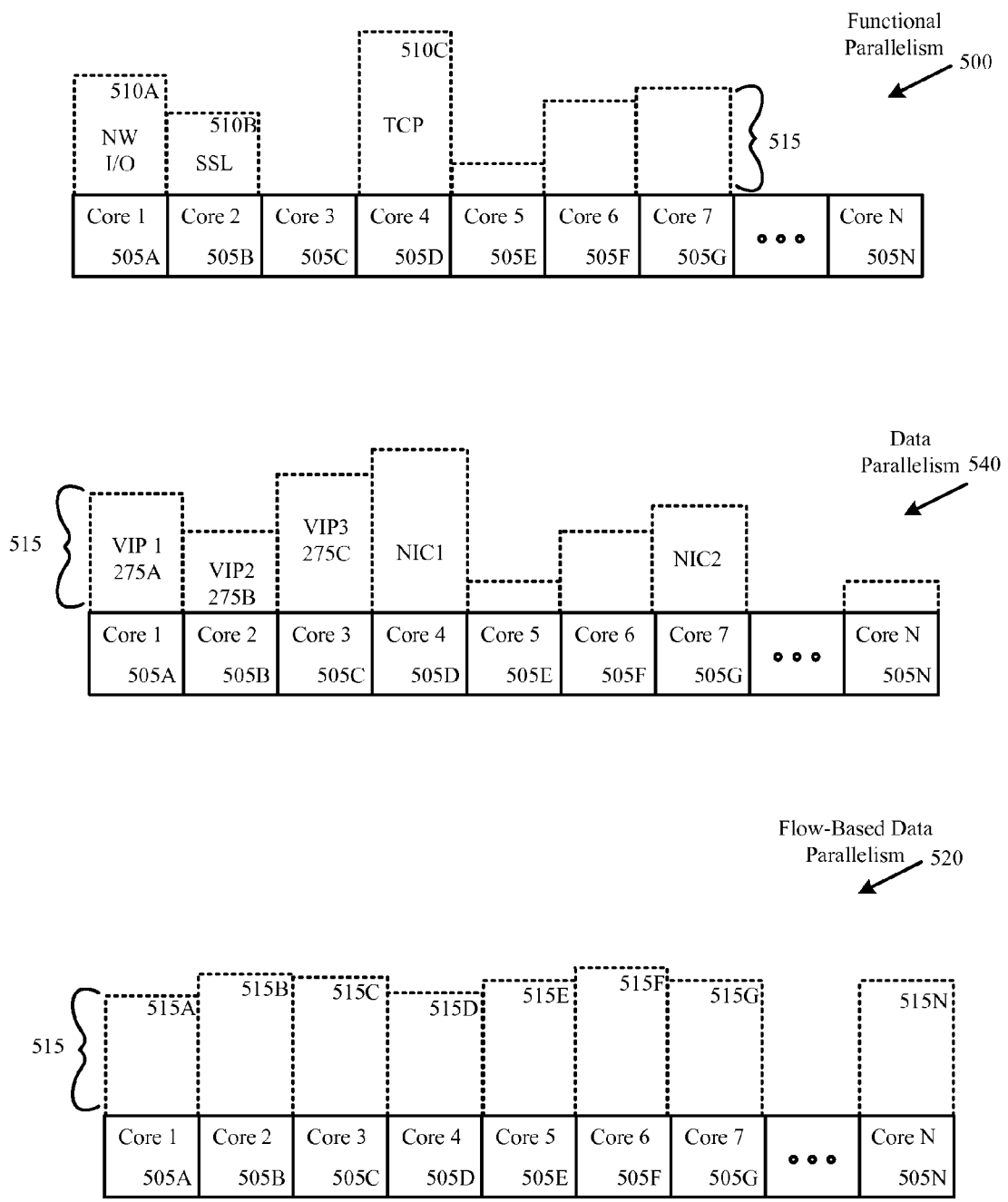
FIG. 5A are block diagrams of embodiments of approaches to implementing parallelism in a multi-core network appliance.

Illustrated in FIG. 5A are some embodiments of work, task, load or network traffic distribution across one or more processor cores according to a type of parallelism or parallel computing scheme, such as functional parallelism, data parallelism or flow-based data parallelism. In brief overview, FIG. 5A illustrates embodiments of a multi-core system such as an appliance 200' with n-cores, a total of cores numbers 1 through N. In one embodiment, work, load or network traffic can be distributed among a first core 505A, a second core 505B, a third core 505C, a fourth core 505D, a fifth core 505E, a sixth core 505F, a seventh core 505G, and so on such that distribution is across all or two or more of the n cores 505N (hereinafter referred to collectively as cores 505.) There may be multiple VIPs 275 each running on a respective core of the plurality of cores. There may be multiple packet engines 240 each running on a respective core of the plurality of cores. Any of the approaches used may lead to different, varying or similar work load or performance level 515 across any of the cores. For a functional parallelism approach, each core may run a different function of the functionalities provided by the packet engine, a VIP 275 or appliance 200. In a data parallelism approach, data may be paralleled or distributed across the cores based on the Network Interface Card (NIC) or VIP 275 receiving the data. In another data parallelism approach, processing may be distributed across the cores by distributing data flows to each core.

In further detail to FIG. 5A, in some embodiments, load, work or network traffic can be distributed among cores 505 according to functional parallelism 500. Functional parallelism may be based on each core performing one or more respective functions. In some embodiments, a first core may perform a first function while a second core performs a second function. In functional parallelism approach, the functions to be performed by the multi-core system are divided and distributed to each core according to functionality. In some embodiments, functional parallelism may be referred to as task parallelism and may be achieved when each processor or core executes a different process or function on the same or different data. The core or processor may execute the same or different code. In some cases, different execution threads or code may communicate with one another as they work. Communication may take place to pass data from one thread to the next as part of a workflow.

In some embodiments, distributing work across the cores 505 according to functional parallelism 500, can comprise distributing network traffic according to a particular function such as network input/output management (NW I/O) 510A, secure sockets layer (SSL) encryption and decryption 510B and transmission control protocol (TCP) functions 510C. This may lead to a work, performance or computing load 515 based on a volume or level of functionality being used. In some embodiments, distributing work across the cores 505 according to data parallelism 540, can comprise distributing an amount of work 515 based on distributing data associated with a particular hardware or software component. In some embodiments, distributing work across the cores 505 according to flow-based data parallelism 520, can comprise distributing data based on a context or flow such that the amount of work 515A-N on each core may be similar, substantially equal or relatively evenly distributed.

In the case of the functional parallelism approach, each core may be configured to run one or more functionalities of the plurality of functionalities provided by the packet engine or VIP of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A, division by function may lead to different cores running at different levels of performance or load 515.

In the case of the functional parallelism approach, each core may be configured to run one or more functionalities of the plurality of functionalities provided by the packet engine of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A division by function may lead to different cores running at different levels of load or performance.

Figure 5B:
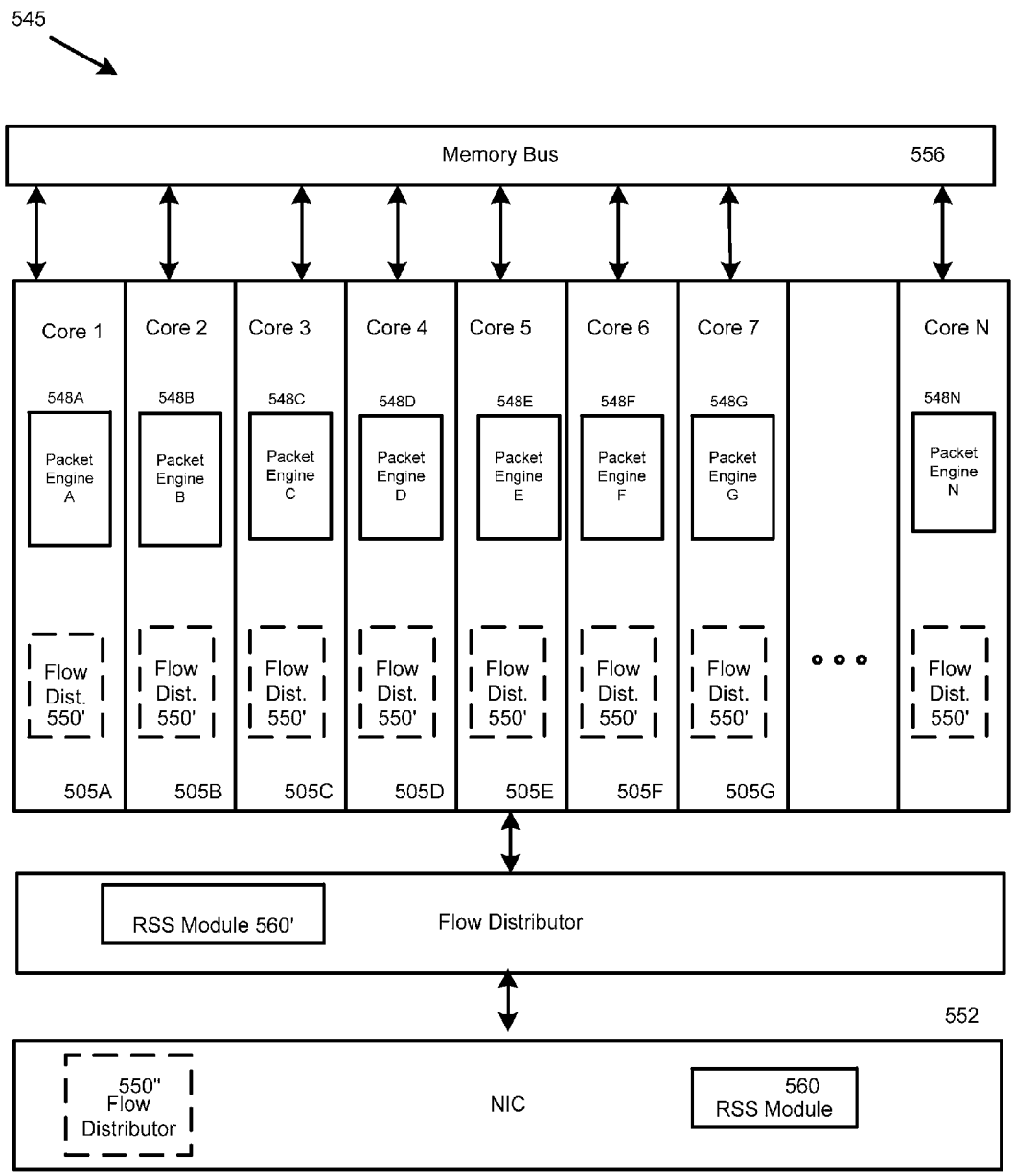
FIG. 5B is a block diagram of an embodiment of a system utilizing a multi-core network application.

The functionality or tasks may be distributed in any arrangement and scheme. For example, FIG. 5B illustrates a first core, Core 1 505A, processing applications and processes associated with network I/O functionality 510A. Network traffic associated with network I/O, in some embodiments, can be associated with a particular port number. Thus, outgoing and incoming packets having a port destination associated with NW I/O 510A will be directed towards Core 1 505A which is dedicated to handling all network traffic associated with the NW I/O port. Similarly, Core 2 505B is dedicated to handling functionality associated with SSL processing and Core 4 505D may be dedicated handling all TCP level processing and functionality.

While FIG. 5A illustrates functions such as network I/O, SSL and TCP, other functions can be assigned to cores. These other functions can include any one or more of the functions or operations described herein. For example, any of the functions described in conjunction with FIGS. 2A and 2B may be distributed across the cores on a functionality basis. In some cases, a first VIP 275A may run on a first core while a second VIP 275B with a different configuration may run on a second core. In some embodiments, each core 505 can handle a particular functionality such that each core 505 can handle the processing associated with that particular function. For example, Core 2 505B may handle SSL offloading while Core 4 505D may handle application layer processing and traffic management.

In other embodiments, work, load or network traffic may be distributed among cores 505 according to any type and form of data parallelism 540. In some embodiments, data parallelism may be achieved in a multi-core system by each core performing the same task or functionally on different pieces of distributed data. In some embodiments, a single execution thread or code controls operations on all pieces of data. In other embodiments, different threads or instructions control the operation, but may execute the same code. In some embodiments, data parallelism is achieved from the perspective of a packet engine, vServers (VIPs) 275A-C, network interface cards (NIC) 542D-E and/or any other networking hardware or software included on or associated with an appliance 200. For example, each core may run the same packet engine or VIP code or configuration but operate on different sets of distributed data. Each networking hardware or software construct can receive different, varying or substantially the same amount of data, and as a result may have varying, different or relatively the same amount of load 515

In the case of a data parallelism approach, the work may be divided up and distributed based on VIPs, NICs and/or data flows of the VIPs or NICs. In one of these approaches, the work of the multi-core system may be divided or distributed among the VIPs by having each VIP work on a distributed set of data. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple NICs.

While FIG. 5A illustrates a single vServer associated with a single core 505, as is the case for VIP1 275A, VIP2 275B and VIP3 275C. In some embodiments, a single vServer can be associated with one or more cores 505. In contrast, one or more vServers can be associated with a single core 505. Associating a vServer with a core 505 may include that core 505 to process all functions associated with that particular vServer. In some embodiments, each core executes a VIP having the same code and configuration. In other embodiments, each core executes a VIP having the same code but different configuration. In some embodiments, each core executes a VIP having different code and the same or different configuration.

Like vServers, NICs can also be associated with particular cores 505. In many embodiments, NICs can be connected to one or more cores 505 such that when a NIC receives or transmits data packets, a particular core 505 handles the processing involved with receiving and transmitting the data packets. In one embodiment, a single NIC can be associated with a single core 505, as is the case with NIC1 542D and NIC2 542E. In other embodiments, one or more NICs can be associated with a single core 505. In other embodiments, a single NIC can be associated with one or more cores 505. In these embodiments, load could be distributed amongst the one or more cores 505 such that each core 505 processes a substantially similar amount of load. A core 505 associated with a NIC may process all functions and/or data associated with that particular NIC.

While distributing work across cores based on data of VIPs or NICs may have a level of independency, in some embodiments, this may lead to unbalanced use of cores as illustrated by the varying loads 515 of FIG. 5A.

In some embodiments, load, work or network traffic can be distributed among cores 505 based on any type and form of data flow. In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approaches.

In flow-based data parallelism 520, distribution of data is related to any type of flow of data, such as request/response pairings, transactions, sessions, connections or application communications. For example, network traffic between a client and a server traversing the appliance may be distributed to and processed by one core of the plurality of cores. In some cases, the core initially establishing the session or connection may be the core for which network traffic for that session or connection is distributed. The distribution of data flow may be such that each core 505 carries a substantially equal or relatively evenly distributed amount of load, data or network traffic.

In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached. In one embodiment, data flow can be distributed based on a transaction or a series of transactions. This transaction, in some embodiments, can be between a client and a server and can be characterized by an IP address or other packet identifier. For example, Core 1 505A can be dedicated to transactions between a particular client and a particular server, therefore the load 536A on Core 1 505A may be comprised of the network traffic associated with the transactions between the particular client and server. Allocating the network traffic to Core 1 505A can be accomplished by routing all data packets originating from either the particular client or server to Core 1 505A.

While work or load can be distributed to the cores based in part on transactions, in other embodiments load or work can be allocated on a per packet basis. In these embodiments, the appliance 200 can intercept data packets and allocate them to a core 505 having the least amount of load. For example, the appliance 200 could allocate a first incoming data packet to Core 1 505A because the load 536A on Core 1 is less than the load 536B-N on the rest of the cores 505B-N. Once the first data packet is allocated to Core 1 505A, the amount of load 536A on Core 1 505A is increased proportional to the amount of processing resources needed to process the first data packet. When the appliance 200 intercepts a second data packet, the appliance 200 will allocate the load to Core 4 505D because Core 4 505D has the second least amount of load. Allocating data packets to the core with the least amount of load can, in some embodiments, ensure that the load 536A-N distributed to each core 505 remains substantially equal.

In other embodiments, load can be allocated on a per unit basis where a section of network traffic is allocated to a particular core 505. The above-mentioned example illustrates load balancing on a per/packet basis. In other embodiments, load can be allocated based on a number of packets such that every 10, 100 or 1000 packets are allocated to the core 505 having the least amount of load. The number of packets allocated to a core 505 can be a number determined by an application, user or administrator and can be any number greater than zero. In still other embodiments, load can be allocated based on a time metric such that packets are distributed to a particular core 505 for a predetermined amount of time. In these embodiments, packets can be distributed to a particular core 505 for five milliseconds or for any period of time determined by a user, program, system, administrator or otherwise. After the predetermined time period elapses, data packets are transmitted to a different core 505 for the predetermined period of time.

Flow-based data parallelism methods for distributing work, load or network traffic among the one or more cores 505 can comprise any combination of the above-mentioned embodiments. These methods can be carried out by any part of the appliance 200, by an application or set of executable instructions executing on one of the cores 505, such as the packet engine, or by any application, program or agent executing on a computing device in communication with the appliance 200.

The functional and data parallelism computing schemes illustrated in FIG. 5A can be combined in any manner to generate a hybrid parallelism or distributed processing scheme that encompasses function parallelism 500, data parallelism 540, flow-based data parallelism 520 or any portions thereof. In some cases, the multi-core system may use any type and form of load balancing schemes to distribute load among the one or more cores 505. The load balancing scheme may be used in any combination with any of the functional and data parallelism schemes or combinations thereof.

Illustrated in FIG. 5B is an embodiment of a multi-core system 545, which may be any type and form of one or more systems, appliances, devices or components. This system 545, in some embodiments, can be included within an appliance 200 having one or more processing cores 505A-N. The system 545 can further include one or more packet engines (PE) or packet processing engines (PPE) 548A-N communicating with a memory bus 556. The memory bus may be used to communicate with the one or more processing cores 505A-N. Also included within the system 545 can be one or more network interface cards (NIC) 552 and a flow distributor 550 which can further communicate with the one or more processing cores 505A-N. The flow distributor 550 can comprise a Receive Side Scaler (RSS) or Receive Side Scaling (RSS) module 560.

Further referring to FIG. 5B, and in more detail, in one embodiment the packet engine(s) 548A-N can comprise any portion of the appliance 200 described herein, such as any portion of the appliance described in FIGS. 2A and 2B. The packet engine(s) 548A-N can, in some embodiments, comprise any of the following elements: the packet engine 240, a network stack 267; a cache manager 232; a policy engine 236; a compression engine 238; an encryption engine 234; a GUI 210; a CLI 212; shell services 214; monitoring programs 216; and any other software or hardware element able to receive data packets from one of either the memory bus 556 or the one of more cores 505A-N. In some embodiments, the packet engine(s) 548A-N can comprise one or more vServers 275A-N, or any portion thereof. In other embodiments, the packet engine(s) 548A-N can provide any combination of the following functionalities: SSL VPN 280; Intranet UP 282; switching 284; DNS 286; packet acceleration 288; App FW 280; monitoring such as the monitoring provided by a monitoring agent 197; functionalities associated with functioning as a TCP stack; load balancing; SSL offloading and processing; content switching; policy evaluation; caching; compression; encoding; decompression; decoding; application firewall functionalities; XML processing and acceleration; and SSL VPN connectivity.

The packet engine(s) 548A-N can, in some embodiments, be associated with a particular server, user, client or network. When a packet engine 548 becomes associated with a particular entity, that packet engine 548 can process data packets associated with that entity. For example, should a packet engine 548 be associated with a first user, that packet engine 548 will process and operate on packets generated by the first user, or packets having a destination address associated with the first user. Similarly, the packet engine 548 may choose not to be associated with a particular entity such that the packet engine 548 can process and otherwise operate on any data packets not generated by that entity or destined for that entity.

In some instances, the packet engine(s) 548A-N can be configured to carry out the any of the functional and/or data parallelism schemes illustrated in FIG. 5A. In these instances, the packet engine(s) 548A-N can distribute functions or data among the processing cores 505A-N so that the distribution is according to the parallelism or distribution scheme. In some embodiments, a single packet engine(s) 548A-N carries out a load balancing scheme, while in other embodiments one or more packet engine(s) 548A-N carry out a load balancing scheme. Each core 505A-N, in one embodiment, can be associated with a particular packet engine 505 such that load balancing can be carried out by the packet engine 505. Load balancing may in this embodiment, require that each packet engine 505 associated with a core 505 communicate with the other packet engines 505 associated with cores 505 so that the packet engines 505 can collectively determine where to distribute load. One embodiment of this process can include an arbiter that receives votes from each packet engine 505 for load. The arbiter can distribute load to each packet engine 505 based in part on the age of the engine's vote and in some cases a priority value associated with the current amount of load on an engine's associated core 505.

Any of the packet engines running on the cores may run in user mode, kernel or any combination thereof. In some embodiments, the packet engine operates as an application or program running is user or application space. In these embodiments, the packet engine may use any type and form of interface to access any functionality provided by the kernel. In some embodiments, the packet engine operates in kernel mode or as part of the kernel. In some embodiments, a first portion of the packet engine operates in user mode while a second portion of the packet engine operates in kernel mode. In some embodiments, a first packet engine on a first core executes in kernel mode while a second packet engine on a second core executes in user mode. In some embodiments, the packet engine or any portions thereof operates on or in conjunction with the NIC or any drivers thereof.

In some embodiments the memory bus 556 can be any type and form of memory or computer bus. While a single memory bus 556 is depicted in FIG. 5B, the system 545 can comprise any number of memory buses 556. In one embodiment, each packet engine 548 can be associated with one or more individual memory buses 556.

The NIC 552 can in some embodiments be any of the network interface cards or mechanisms described herein. The NIC 552 can have any number of ports. The NIC can be designed and constructed to connect to any type and form of network 104. While a single NIC 552 is illustrated, the system 545 can comprise any number of NICs 552. In some embodiments, each core 505A-N can be associated with one or more single NICs 552. Thus, each core 505 can be associated with a single NIC 552 dedicated to a particular core 505.

The cores 505A-N can comprise any of the processors described herein. Further, the cores 505A-N can be configured according to any of the core 505 configurations described herein. Still further, the cores 505A-N can have any of the core 505 functionalities described herein. While FIG. 5B illustrates seven cores 505A-G, any number of cores 505 can be included within the system 545. In particular, the system 545 can comprise "N" cores, where "N" is a whole number greater than zero.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

Further referring to FIG. 5B, any of the functionality and/or embodiments of the cores 505 described above in connection with FIG. 5A can be deployed in any embodiment of the virtualized environment described above in connection with FIGS. 4A and 4B. Instead of the functionality of the cores 505 being deployed in the form of a physical processor 505, such functionality may be deployed in a virtualized environment 400 on any computing device 100, such as a client 102, server 106 or appliance 200. In other embodiments, instead of the functionality of the cores 505 being deployed in the form of an appliance or a single device, the functionality may be deployed across multiple devices in any arrangement. For example, one device may comprise two or more cores and another device may comprise two or more cores. For example, a multi-core system may include a cluster of computing devices, a server farm or network of computing devices. In some embodiments, instead of the functionality of the cores 505 being deployed in the form of cores, the functionality may be deployed on a plurality of processors, such as a plurality of single core processors.

In one embodiment, the cores 505 may be any type and form of processor. In some embodiments, a core can function substantially similar to any processor or central processing unit described herein. In some embodiment, the cores 505 may comprise any portion of any processor described herein. While FIG. 5A illustrates seven cores, there can exist any "N" number of cores within an appliance 200, where "N" is any whole number greater than one. In some embodiments, the cores 505 can be installed within a common appliance 200, while in other embodiments the cores 505 can be installed within one or more appliance(s) 200 communicatively connected to one another. The cores 505 can in some embodiments comprise graphics processing software, while in other embodiments the cores 505 provide general processing capabilities. The cores 505 can be installed physically near each other and/or can be communicatively connected to each other. The cores may be connected by any type and form of bus or subsystem physically and/or communicatively coupled to the cores for transferring data between to, from and/or between the cores.

While each core 505 can comprise software for communicating with other cores, in some embodiments a core manager (Not Shown) can facilitate communication between each core 505. In some embodiments, the kernel may provide core management. The cores may interface or communicate with each other using a variety of interface mechanisms. In some embodiments, core to core messaging may be used to communicate between cores, such as a first core sending a message or data to a second core via a bus or subsystem connecting the cores. In some embodiments, cores may communicate via any type and form of shared memory interface. In one embodiment, there may be one or more memory locations shared among all the cores. In some embodiments, each core may have separate memory locations shared with each other core. For example, a first core may have a first shared memory with a second core and a second share memory with a third core. In some embodiments, cores may communicate via any type of programming or API, such as function calls via the kernel. In some embodiments, the operating system may recognize and support multiple core devices and provide interfaces and API for inter-core communications.

The flow distributor 550 can be any application, program, library, script, task, service, process or any type and form of executable instructions executing on any type and form of hardware. In some embodiments, the flow distributor 550 may any design and construction of circuitry to perform any of the operations and functions described herein. In some embodiments, the flow distributor distribute, forwards, routes, controls and/ors manage the distribution of data packets among the cores 505 and/or packet engine or VIPs running on the cores. The flow distributor 550, in some embodiments, can be referred to as an interface master. In one embodiment, the flow distributor 550 comprises a set of executable instructions executing on a core or processor of the appliance 200. In another embodiment, the flow distributor 550 comprises a set of executable instructions executing on a computing machine in communication with the appliance 200. In some embodiments, the flow distributor 550 comprises a set of executable instructions executing on a NIC, such as firmware. In still other embodiments, the flow distributor 550 comprises any combination of software and hardware to distribute data packets among cores or processors. In one embodiment, the flow distributor 550 executes on at least one of the cores 505A-N, while in other embodiments a separate flow distributor 550 assigned to each core 505A-N executes on an associated core 505A-N. The flow distributor may use any type and form of statistical or probabilistic algorithms or decision making to balance the flows across the cores. The hardware of the appliance, such as a NIC, or the kernel may be designed and constructed to support sequential operations across the NICs and/or cores.

In embodiments where the system 545 comprises one or more flow distributors 550, each flow distributor 550 can be associated with a processor 505 or a packet engine 548. The flow distributors 550 can comprise an interface mechanism that allows each flow distributor 550 to communicate with the other flow distributors 550 executing within the system 545. In one instance, the one or more flow distributors 550 can determine how to balance load by communicating with each other. This process can operate substantially similarly to the process described above for submitting votes to an arbiter which then determines which flow distributor 550 should receive the load. In other embodiments, a first flow distributor 550' can identify the load on an associated core and determine whether to forward a first data packet to the associated core based on any of the following criteria: the load on the associated core is above a predetermined threshold; the load on the associated core is below a predetermined threshold; the load on the associated core is less than the load on the other cores; or any other metric that can be used to determine where to forward data packets based in part on the amount of load on a processor.

The flow distributor 550 can distribute network traffic among the cores 505 according to a distribution, computing or load balancing scheme such as those described herein. In one embodiment, the flow distributor can distribute network traffic or; pad according to any one of a functional parallelism distribution scheme 550, a data parallelism load distribution scheme 540, a flow-based data parallelism distribution scheme 520, or any combination of these distribution scheme or any load balancing scheme for distributing load among multiple processors. The flow distributor 550 can therefore act as a load distributor by taking in data packets and distributing them across the processors according to an operative load balancing or distribution scheme. In one embodiment, the flow distributor 550 can comprise one or more operations, functions or logic to determine how to distribute packers, work or load accordingly. In still other embodiments, the flow distributor 550 can comprise one or more sub operations, functions or logic that can identify a source address and a destination address associated with a data packet, and distribute packets accordingly.

In some embodiments, the flow distributor 550 can comprise a receive-side scaling (RSS) network driver, module 560 or any type and form of executable instructions which distribute data packets among the one or more cores 505. The RSS module 560 can comprise any combination of hardware and software, In some embodiments, the RSS module 560 works in conjunction with the flow distributor 550 to distribute data packets across the cores 505A-N or among multiple processors in a multi-processor network. The RSS module 560 can execute within the NIC 552 in some embodiments, and in other embodiments can execute on any one of the cores 505.

In some embodiments, the RSS module 560 uses the MICROSOFT receive-side-scaling (RSS) scheme. In one embodiment, RSS is a Microsoft Scalable Networking initiative technology that enables receive processing to be balanced across multiple processors in the system while maintaining in-order delivery of the data. The RSS may use any type and form of hashing scheme to determine a core or processor for processing a network packet.

The RSS module 560 can apply any type and form hash function such as the Toeplitz hash function. The hash function may be applied to the hash type or any the sequence of values. The hash function may be a secure hash of any security level or is otherwise cryptographically secure. The has function may use a hash key. The size of the key is dependent upon the hash function. For the Toeplitz hash, the size may be 40 bytes for IPv6 and 16 bytes for IPv4.

The hash function may be designed and constructed based on any one or more criteria or design goals. In some embodiments, a hash function may be used that provides an even distribution of hash result for different hash inputs and different hash types, including TCP/IPv4, TCP/IPv6, IPv4, and IPv6 headers. In some embodiments, a hash function may be used that provides a hash result that is evenly distributed when a small number of buckets are present (for example, two or four). In some embodiments, hash function may be used that provides a hash result that is randomly distributed when a large number of buckets were present (for example, 64 buckets). In some embodiments, the hash function is determined based on a level of computational or resource usage. In some embodiments, the hash function is determined based on ease or difficulty of implementing the hash in hardware. In some embodiments, the hash function is determined bases on the ease or difficulty of a malicious remote host to send packets that would all hash to the same bucket.

The RSS may generate hashes from any type and form of input, such as a sequence of values. This sequence of values can include any portion of the network packet, such as any header, field or payload of network packet, or portions thereof. In some embodiments, the input to the hash may be referred to as a hash type and include any tuples of information associated with a network packet or data flow, such as any of the following: a four tuple comprising at least two IP addresses and two ports; a four tuple comprising any four sets of values; a six tuple; a two tuple; and/or any other sequence of numbers or values. The following are example of hash types that may be used by RSS:

- 4-tuple of source TCP Port, source IP version 4 (IPv4) address, destination TCP Port, and destination IPv4 address. This is the only required hash type to support.
- 4-tuple of source TCP Port, source IP version 6 (IPv6) address, destination TCP Port, and destination IPv6 address.
- 2-tuple of source IPv4 address, and destination IPv4 address.
- 2-tuple of source IPv6 address, and destination IPv6 address.
- 2-tuple of source IPv6 address, and destination IPv6 address, including support for parsing IPv6 extension headers.

The hash result or any portion thereof may used to identify a core or entity, such as a packet engine or VIP, for distributing a network packet. In some embodiments, one or more hash bits or mask are applied to the hash result. The hash bit or mask may be any number of bits or bytes. A NIC may support any number of bits, such as seven bits. The network stack may set the actual number of bits to be used during initialization. The number will be between 1 and 7, inclusive.

The hash result may be used to identify the core or entity via any type and form of table, such as a bucket table or indirection table. In some embodiments, the number of hash-result bits are used to index into the table. The range of the hash mask may effectively define the size of the indirection table. Any portion of the hash result or the hast result itself may be used to index the indirection table. The values in the table may identify any of the cores or processor, such as by a core or processor identifier. In some embodiments, all of the cores of the multi-core system are identified in the table. In other embodiments, a port of the cores of the multi-core system are identified in the table. The indirection table may comprise any number of buckets for example 2 to 128 buckets that may be indexed by a hash mask. Each bucket may comprise a range of index values that identify a core or processor. In some embodiments, the flow controller and/or RSS module may rebalance the network rebalance the network load by changing the indirection table.

In some embodiments, the multi-core system 575 does not include a RSS driver or RSS module 560. In some of these embodiments, a software steering module (Not Shown) or a software embodiment of the RSS module within the system can operate in conjunction with or as part of the flow distributor 550 to steer packets to cores 505 within the multi-core system 575.

The flow distributor 550, in some embodiments, executes within any module or program on the appliance 200, on any one of the cores 505 and on any one of the devices or components included within the multi-core system 575. In some embodiments, the flow distributor 550' can execute on the first core 505A, while in other embodiments the flow distributor 550" can execute on the NIC 552. In still other embodiments, an instance of the flow distributor 550' can execute on each core 505 included in the multi-core system 575. In this embodiment, each instance of the flow distributor 550' can communicate with other instances of the flow distributor 550' to forward packets back and forth across the cores 505. There exist situations where a response to a request packet may not be processed by the same core, i.e. the first core processes the request while the second core processes the response. In these situations, the instances of the flow distributor 550' can intercept the packet and forward it to the desired or correct core 505, i.e. a flow distributor instance 550' can forward the response to the first core. Multiple instances of the flow distributor 550' can execute on any number of cores 505 and any combination of cores 505.

The flow distributor may operate responsive to any one or more rules or policies. The rules may identify a core or packet processing engine to receive a network packet, data or data flow. The rules may identify any type and form of tuple information related to a network packet, such as a 4-tuple of source and destination IP address and source and destination ports. Based on a received packet matching the tuple specified by the rule, the flow distributor may forward the packet to a core or packet engine. In some embodiments, the packet is forwarded to a core via shared memory and/or core to core messaging.

Although FIG. 5B illustrates the flow distributor 550 as executing within the multi-core system 575, in some embodiments the flow distributor 550 can execute on a computing device or appliance remotely located from the multi-core system 575. In such an embodiment, the flow distributor 550 can communicate with the multi-core system 575 to take in data packets and distribute the packets across the one or more cores 505. The flow distributor 550 can, in one embodiment, receive data packets destined for the appliance 200, apply a distribution scheme to the received data packets and distribute the data packets to the one or more cores 505 of the multi-core system 575. In one embodiment, the flow distributor 550 can be included in a router or other appliance such that the router can target particular cores 505 by altering meta data associated with each packet so that each packet is targeted towards a sub-node of the multi-core system 575. In such an embodiment, CISCO's vn-tag mechanism can be used to alter or tag each packet with the appropriate meta data.

Figure 5C:
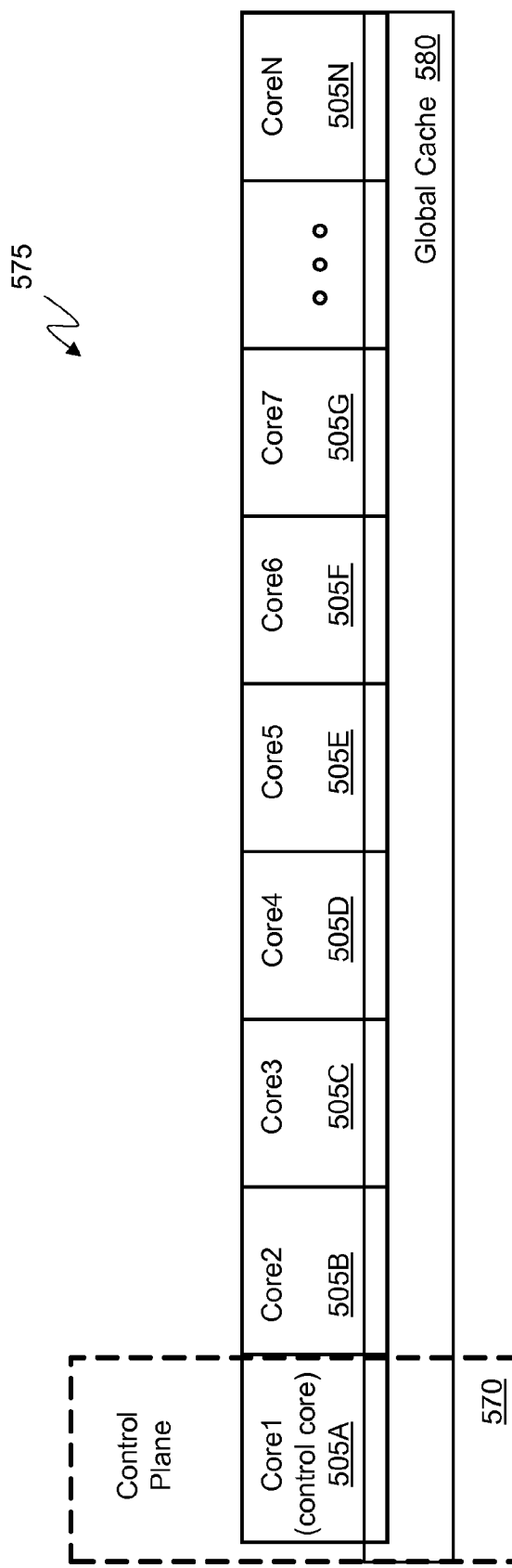
FIG. 5C is a block diagram of an embodiment of an aspect of a multi-core network appliance.

Illustrated in FIG. 5C is an embodiment of a multi-core system 575 comprising one or more processing cores 505A-N. In brief overview, one of the cores 505 can be designated as a control core 505A and can be used as a control plane 570 for the other cores 505. The other cores may be secondary cores which operate in a data plane while the control core provides the control plane. The cores 505A-N may share a global cache 580. While the control core provides a control plane, the other cores in the multi-core system form or provide a data plane. These cores perform data processing functionality on network traffic while the control provides initialization, configuration and control of the multi-core system.

Further referring to FIG. 5C, and in more detail, the cores 505A-N as well as the control core 505A can be any processor described herein. Furthermore, the cores 505A-N and the control core 505A can be any processor able to function within the system 575 described in FIG. 5C. Still further, the cores 505A-N and the control core 505A can be any core or group of cores described herein. The control core may be a different type of core or processor than the other cores. In some embodiments, the control may operate a different packet engine or have a packet engine configured differently than the packet engines of the other cores.

Any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The global cache 580 can be any type and form of memory or storage element, such as any memory or storage element described herein. In some embodiments, the cores 505 may have access to a predetermined amount of memory (i.e. 32 GB or any other memory amount commensurate with the system 575.) The global cache 580 can be allocated from that predetermined amount of memory while the rest of the available memory can be allocated among the cores 505. In other embodiments, each core 505 can have a predetermined amount of memory. The global cache 580 can comprise an amount of the memory allocated to each core 505. This memory amount can be measured in bytes, or can be measured as a percentage of the memory allocated to each core 505. Thus, the global cache 580 can comprise 1 GB of memory from the memory associated with each core 505, or can comprise 20 percent or one-half of the memory associated with each core 505. In some embodiments, only a portion of the cores 505 provide memory to the global cache 580, while in other embodiments the global cache 580 can comprise memory not allocated to the cores 505.

Each core 505 can use the global cache 580 to store network traffic or cache data. In some embodiments, the packet engines of the core use the global cache to cache and use data stored by the plurality of packet engines. For example, the cache manager of FIG. 2A and cache functionality of FIG. 2B may use the global cache to share data for acceleration. For example, each of the packet engines may store responses, such as HTML data, to the global cache. Any of the cache managers operating on a core may access the global cache to server caches responses to client requests.

In some embodiments, the cores 505 can use the global cache 580 to store a port allocation table which can be used to determine data flow based in part on ports. In other embodiments, the cores 505 can use the global cache 580 to store an address lookup table or any other table or list that can be used by the flow distributor to determine where to direct incoming and outgoing data packets. The cores 505 can, in some embodiments read from and write to cache 580, while in other embodiments the cores 505 can only read from or write to cache 580. The cores may use the global cache to perform core to core communications.

The global cache 580 may be sectioned into individual memory sections where each section can be dedicated to a particular core 505. In one embodiment, the control core 505A can receive a greater amount of available cache, while the other cores 505 can receiving varying amounts or access to the global cache 580.

In some embodiments, the system 575 can comprise a control core 505A. While FIG. 5C illustrates core 1 505A as the control core, the control core can be any core within the appliance 200 or multi-core system. Further, while only a single control core is depicted, the system 575 can comprise one or more control cores each having a level of control over the system. In some embodiments, one or more control cores can each control a particular aspect of the system 575. For example, one core can control deciding which distribution scheme to use, while another core can determine the size of the global cache 580.

The control plane of the multi-core system may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

The control core 505A can exercise a level of control over the other cores 505 such as determining how much memory should be allocated to each core 505 or determining which core 505 should be assigned to handle a particular function or hardware/software entity. The control core 505A, in some embodiments, can exercise control over those cores 505 within the control plan 570. Thus, there can exist processors outside of the control plane 570 which are not controlled by the control core 505A. Determining the boundaries of the control plane 570 can include maintaining, by the control core 505A or agent executing within the system 575, a list of those cores 505 controlled by the control core 505A. The control core 505A can control any of the following: initialization of a core; determining when a core is unavailable; re-distributing load to other cores 505 when one core fails; determining which distribution scheme to implement; determining which core should receive network traffic; determining how much cache should be allocated to each core; determining whether to assign a particular function or element to a particular core; determining whether to permit cores to communicate with one another; determining the size of the global cache 580; and any other determination of a function, configuration or operation of the cores within the system 575.

F. Systems and Methods for Managing SSL Session Persistence and Reuse

A SSL session may be allocated private memory address space and associated with a SSL protocol stack that is independent from other SSL sessions. In a single-core system such as a single-core appliance 200 maintaining a SSL session between a client 102 and a server 106, the SSL session may be resumed if the SSL session is temporarily disrupted and/or inactive. For example, a disruption may occur due to a mobile client disconnecting and reconnecting to a network 104, or a server going offline due to inactivity or power loss. A client may send a request to resume the SSL session instead of establishing a new session. This may be more efficient in terms of the time and resources consumed in performing a full handshake process, allocating memory, starting a protocol stack and meeting authentication/authorization requirements. Furthermore, the disrupted SSL session may remain persistent although a connection may be lost. Resuming a SSL session may also maintain some level of continuity in client-server communications.

In some embodiments, a packet engine 240 maintains a connection between a client 102 and a core 661, directing packets from the client 102 to the core 661. The packet engine 240 can maintain a TCP connection through a core, for example, by identifying the core based on information from received packets and/or client 102. A flow distributor 550 may direct traffic to a packet engine 240 of a core by associating a connection based on information from received packets and/or client 102. In one embodiment, this information includes a TCP tuple or TCP quadruple. A TCP tuple may include information on a source IP address, a source port number, a destination IP address and a destination port number. The TCP tuple may be extracted from a packet. The TCP tuple may remain the same for a client connection and/or session. In some embodiments, a disruption to a connection of session may cause the TCP tuple to change. For example, the source port number may change if the client attempts to reconnect to the intermediary 200.

The flow distributor 550 may generate a hash index or other identifier based on a TCP tuple to associate the packet traffic with a core. In some embodiments, when a TCP tuple changes, a different hash index or identifier is generated and a second core 662 is identified instead. Upon a disruption to a connection or session, a client 102 may attempt to resume transmission of packets. These packets may come from a different application instance of the client 102. These packets may provide a different source port information. Other components of the TCP tuple may also change. Based on a changed TCP tuple, the flow distributor may generate a second hash index or identifier and direct packet traffic from the client 102 to a second core 662 corresponding to the second hash index or identifier.

In some embodiments, use of a flow distributor 550 and/or packet engines in a multi-core system can result in higher SSL transactions per second (TPS) and/or bulk throughput numbers. Each core may have a virtual IP address (VIP) associated with the core that may or may not be established in relation to a SSL session 641. In some embodiments, the flow distributor 550 identifies each core via the VIP of the core.

Figure 6:
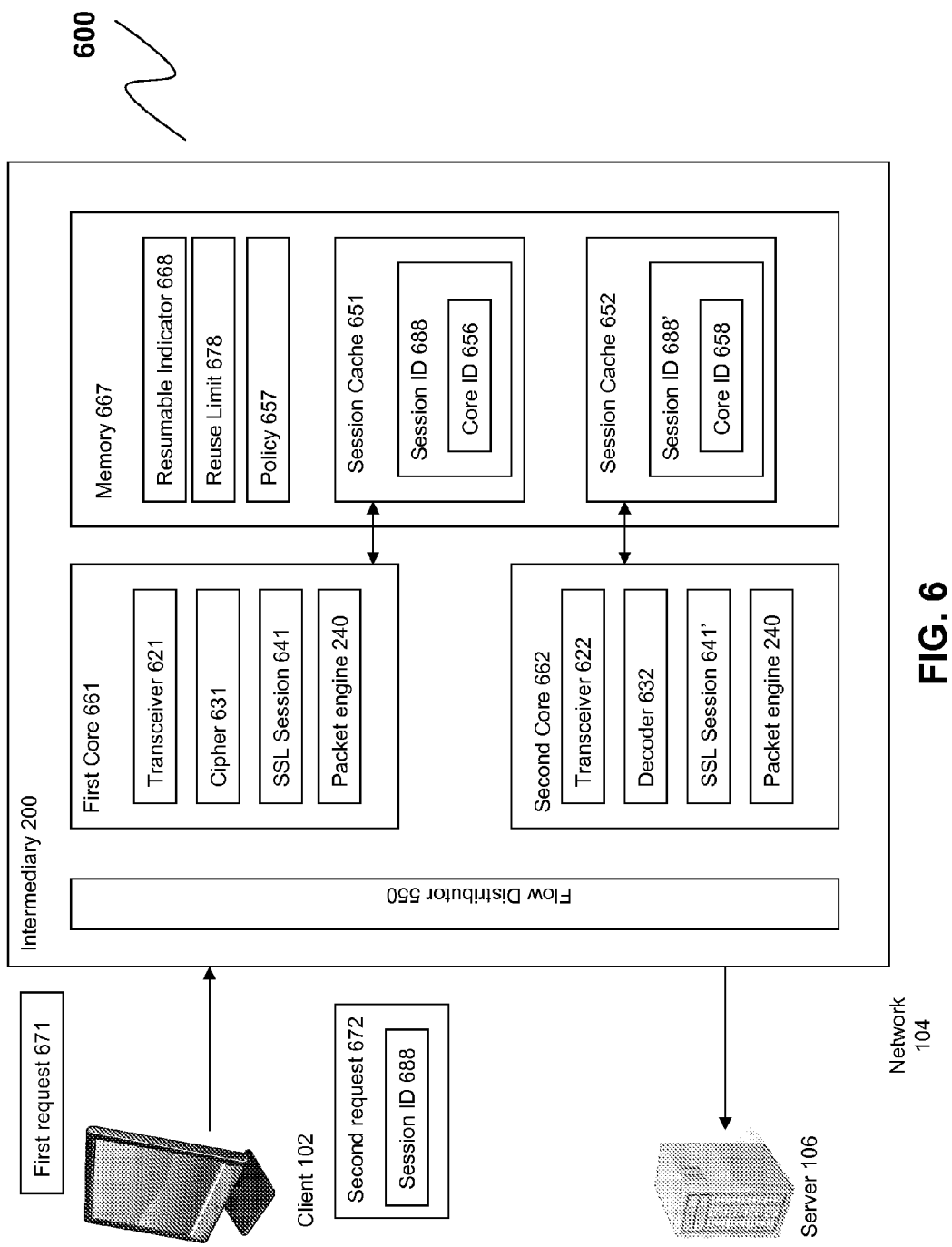
FIG. 6 is a block diagram of an embodiment of a system utilizing a multi-core network application.

Referring now to FIG. 6, an embodiment of a system 600 for managing SSL session persistence and reuse is depicted. In brief overview, the system includes an intermediary 200 between a client 102 and a server 106. The intermediary 200 comprises a multi-core system, a flow distributor 550, and a storage or memory module 667. In some embodiments, a SSL session 641 may be established and maintained by one of a plurality of cores in a multi-core system, such as the first core 661. This core 661 is sometimes referred to as the owner of the SSL session 641. Upon disruption of the SSL session 641, a client 102 may request resumption of the SSL session by sending a request 672 to the multi-core system. The flow distributor 550 may direct the request 672 to a second core 662 that will determine if it owns the disrupted SSL session 641. The second core 662 may identify the owner 661 of the session 641 and determine if the session can be resumed. The second core 662 can communicate with the first core 661 and receive information for cloning the disrupted SSL session for reuse by the second core 662. Upon completion of the cloning, the connection between the client and the server is resumed based on the cloned session 641'.

Each core 661, 662 of the multi-core system can include a transceiver 621, 622. The transceiver can receive packets or messages directed from the flow distributor 550. The transceiver can also communicate with other cores of the multi-core system. In some embodiments, inter-core communication involves sending a core-to-core messaging (CCM) message from a first core 661 to a second core 662. The transceiver may support packets and messages based on any type or form of communication protocols. The transceiver can also communicate with other components of the intermediary 200. For example, a core can access data from memory 667 using the transceiver as an interface. The transceiver can also transmit a packet or message to another machine such as server 106. The transceiver may direct outgoing packets or messages to a destination based on information from the associated TCP tuple.

Each core may include a decoder-encoder pair 631, 632 (hereinafter generally referred to as a "cipher"). A cipher may comprise hardware or any combination of software and hardware. The cipher may include an application, program, library, script, process, task, thread or any type and form of executable instructions. Although the cipher is illustrated as part of a certificate manager, in some embodiments, the cipher may be a separate component or module of the multi-core system. In one embodiment, the cipher may include a general-purpose encoder/decoder. In another embodiment, the cipher is designed and constructed to encode/encrypt or decode/decrypt any type and form of information, such as session identifiers 688 and/or core identifiers 656, 658. In one embodiment, the ciphers 631, 632 are block ciphers. Further, the ciphers may include functionality from any embodiment of the encryption engine 234 described in connection with FIG. 2. In some embodiments, the system 600 uses data encryption standard (DES) ciphers, such as standard DES ciphers and 3DES ciphers.

The first core 661 is assigned a core identifier 656. The core identifier 656 may be any type or form of alphanumeric identifier or code string. In addition, this core identifier 656 may be unique among the plurality of cores of the multi-core system. The core identifier 656 may be a CPU number of the core 661, or incorporate the CPU number of the core 661. A core identifier 656 may be assigned sequentially to each core based on the CPU numbers of the cores. The core identifier 656 can be of any size. In one embodiment, the core identifier 656 is one byte in size. In particular, one byte can give 256 (0-255) unique core identifiers.

The first core 661 can establish a SSL session 641 between the client 102 and the server 106. The SSL session 641 may be established in connection with the cipher 631 and/or functionality from any embodiment of the encryption engine 234 described in connection with FIG. 2. The SSL session 641 is assigned a session identifier 688 which can be any type or form of alphanumeric identifier or code string. The first core 661, the backend server 106 or the client 102 may issue the session identifier 688. The session identifier 688 may uniquely identify the SSL session among a plurality of SSL sessions associated with the multi-core system. A session identifier 688 may be a random 16 or 32 byte value. In one embodiment, the X-OR of the byte[0] with byte[1] location of the session identifier 688 results in a random value. By randomly selecting a one-byte location in the session identifier 688 for encoding the core identifier 656, such as at system boot time, additional security and randomness with respect to the session identifier 688 may be incorporated. In one embodiment, a SSLv2 session identifier 688 has a size of 16 bytes and the last 4 bytes may contain a time-stamp. In this embodiment, the one-byte location for the core identifier 656 is preferably between byte 0 to byte 11. In another embodiment, a session identifier 688 is 32 bytes for SSLv3 and TLSv1. The lower 4 bytes may be taken up by the timestamp, allowing 28 bytes for encoding a core identifier in SSLv3/TLSv1 protocol. Other than the byte locations reserved for timestamp purposes, the byte location for encoding a core identifier may be selected by any means.

By way of illustration and not limiting in any way, one embodiment of pseudo code for encoding a core identifier may be:

sessionid[0]=coreid;
    sessionid[0] ^=sessionid[1];

and one embodiment of pseudo code for retrieving the core identifier may be:

coreid=sessionid[0]^sessionid[1];

In some embodiments, a valid-session identifier is encoded with a core identifier. A valid-session identifier is sometimes referred to as a validity identifier. A valid-session identifier can be a string that identifies a valid session. As an example, a cipher may use 8 bytes to encode the valid-session identifier and the core identifier. The intermediary 200 or the multi-core system can determine whether a session 641 is valid. In one embodiment, use of a valid-session identifier helps to filter away random or malicious requests to reuse a session. A valid-session identifier may also identify active reused sessions.

In some other embodiments, the core identifier 656 is not encoded within a byte or a range of bits of a session identifier. Instead, individual bits of a session identifier 688 can be used to encode a core identifier 656. The core identifier 656 can be encoded as a bit pattern in the session identifier 688. Other than the byte locations that are reserved for timestamp purposes, the individual bit locations for encoding a core identifier 656 may be selected by any means. When a session identifier 688 is generated by the core 661 owning the SSL session 641, individual bits can be set to encode the core identifier 656. The number of bits that are set or unset may depend on the number of cores in the multi-core system. This method may impose a relatively small footprint on session identifiers as the number of bits affected is limited to the number of cores in the multi-core system.

The first core 661 or the packet engine 240 of the first core 661 may store the session identifier 688 in a session cache of the first core 661. In one embodiment, the session cache 651 is persistent for the duration that the core 661 is powered up and/or the duration that a session 641 is maintained. In another embodiment, the session cache 651 is persistent even when the core 661 is powered down, or when a session 641 has ended. The session cache 651 can be memory allocated to the first core 661 and/or the SSL session 641. The session cache 651 may be accessed by one or more cores. In some embodiments, the first core 661 maintains and/or updates the session cache 651. The memory module 667 may include the session cache 651. The memory module 667 may comprise one or more interconnected storage devices, such as any embodiment of storage devices 128, 140, 122, 264, 667 described above in connection with FIGS. 1E, 1F and 2A.

In some embodiments, the session cache 651 stores the session identifier 688 of the SSL session 641 established by the first core 661. The session cache 651 may store a plurality of session identifiers, such as session identifiers of sessions established by the first core 661. The first core 661 may encode the core identifier 656 in the session identifier 688 to form a second session identifier 688'. In some embodiments, the cipher 631 encodes the core identifier 656 in the session identifier 688 to form the second session identifier 688'. In one embodiment, the cipher 631 encodes the core identifier 656 in one byte of the session identifier 688. Encoder/decoder routines of the cipher 631 can securely encode the core identifier 656 in the second session identifier 688' and/or decode the core identifier 656. Encoder/decoder routines of the cipher 631 can also securely encode/decode a valid-session-identifier in association with the session identifier 688. In another embodiment, the core identifier 656 can be directly stored into bits of the second session identifier 688'. The second session identifier 688' can be stored in the session cache 651 either with the session identifier 688 or in replacement of the session identifier 688.

In some embodiments, the second core 662 is substantially similar or identical to the first core 661 in terms of functionality, capability and/or associated elements. For example, the second core includes a transceiver 622 and a decoder 632, and is associated with a session cache 652. The second core 662 can be assigned a unique core identifier 658. The second core 662 may similarly establish a new SSL session. In addition, the second core 662 may reuse a SSL session 641 of the first core 661.

The intermediary 200 includes a set of policies 657. These policies 657 may be any embodiments of the policies described in connection with FIGS. 1D, 2A, 2B and 3. These policies 657 may be applied to a request, such as a request 672 to resume a SSL session. The policies 657 can also determine to which core the flow distributor 550 directs an incoming message. In addition, an associated policy engine may apply the policies 657, for example, to determine whether a session can be resumed or reused. In some embodiments, the policies 657 are stored in the memory module 667. For example, the policies can be stored in a private partition of the memory module 667. Some of these policies 657 may be grouped and associated with a client 102 and/or a server 106.

A core may resume a session that it has established. For example, a core may resume a session that it has established by restarting part of the protocol stack of the session that was disrupted. A core may resume a session that was established by another core, by creating a copy or clone of the session in the core. In some embodiments, the latter case is referred to as a reuse of the session. In these embodiments, resuming a session may have a broader scope than reusing a session. In other embodiments, session resume or reuse can be used interchangeably. In still other embodiments, reuse refers to the reuse of some elements of a session, such as security parameters of the session.

Each SSL session may be associated with a resumable indicator 668. The resumable indicator 668 may be predetermined or dynamically updated. An administrator, the server 106 or a core 661 establishing a SSL session 641 may determine and/or set an associated resumable indicator 668. The resumable indicator 668 may be determined and/or set via analysis of session history and/or statistics, such as via any algorithm or process steps. In other embodiments, a core 662 reusing the SSL session 641 may be able to update the resumable indicator 668 of the SSL session 641. In some other embodiments, a core 662 reusing the SSL session 641 may send information to the owner 661 of the SSL session 641 to update the resumable indicator 668 of the SSL session 641.

The resumable indicator 668 may indicate whether a request 672 to resume a SSL session should be allowed. The resumable indicator 668 may indicate whether a request to resume a SSL session 641 is allowed subject to a reuse limit 678 and/or other factors. A resumable indicator 668 may be set based on the state of the SSL session, for example, whether the session is active and/or is being reused by one or more cores. In one embodiment, the resumable indicator 668 may be set as non-resumable when the SSL session 641 is still active. In another embodiment, the resumable indicator 668 may be set as resumable if an inactive SSL session 641 has not expired and/or is not corrupted. In one embodiment, if a fatal alert is sent or received in a SSL session 641, the corresponding resumable indicator 668 is set as non-resumable. In some embodiments, if the resumable indicator 668 is set as non-resumable, all further session resume requests may be rejected or discarded.

A second core 662 processing a request 672 to reuse and/or resume a SSL session 641 may access the resumable indicator 668 to determine whether the SSL session 641 is resumable. The resumable indicator 668 may be stored at a shared location in memory 667 accessible by a plurality of cores. The resumable indicator 668 may also be stored at a location in memory 667 accessible by each core of the multi-core system. In some embodiments, the resumable indicator 668 of a SSL session established by a core can be stored in the session cache 651 of that core and/or that session. The resumable indicator 668 may be stored in a location in shared memory. The resumable indicator 668 may be one byte in size although other embodiments are supported. In some embodiments, the stored value is a pointer to a larger memory location. In other embodiments, a plurality of cores (e.g., cores requesting reuse of the SSL session 641) can each store a copy of the resumable indicator 668. In one of these embodiments, the plurality of cores having a copy of the resumable indicator 668 may check for updates to the resumable indicator 668, or receive a notification of an update to the resumable indicator 668. An update or notification may be sent as a CCM message from the first core 661. An update or notification may be sent to cores identified to be reusing the SSL session 641.

In some embodiments, the packet engine 240 stores a reuse limit 678 to a memory module 667. A reuse limit 678 is sometimes referred to as a maximum reuse threshold. This reuse limit 678 may indicate the number of times a session can be resumed or reused. This reuse limit 678 may be predetermined or dynamically updated. The reuse limit 678 may be determined and set by an administrator and/or via analysis of session history and/or statistics, such as via any algorithm or process steps. The first core 861 may specify a reuse limit 678a directed to the first core 661, to the multi-core system, or to the SSL session 641 established by the first core 661. A second core 662 reusing a SSL session 641 owned by the first core 661 may specify a reuse limit 678b directed to the second core 662. The reuse limit 678 of a session for a core can be stored in the session cache 651 of that core and/or that session. The reuse limit 678 may also be stored in a shared location in memory 667 accessible by a plurality of cores. The reuse limit 678 of a core may also be stored in memory partitioned or allocated for a core. In some embodiments, a reuse limit 678 may be set to limit the reuse of a session that may be inherently unstable or prone to disruption. In other embodiments, a reuse limit 678 may be set to limit cumulative and/or parallel reuse of a SSL session by a plurality of cores.

In some embodiments, if the resumable indicator 668 for a session indicates that that the session is non-resumable, reuse of the session is not allowed. In one of these embodiments, the reuse limit 678 is removed. In another of these embodiments, the reuse limit 678 is set to zero. A core attempting to process a request 672 to reuse and/or resume a SSL session 641 may access the reuse limit 678 to determine whether the SSL session is reusable. If the resumable indicator 668 for a session indicates that that the session is resumable and the reuse limit 678 of a core and/or session is not reached, reuse of the session may be allowed. In some embodiments, the reuse limit 678 and the resumable indicator 668 are determined and/or set independently. In other embodiments, the reuse limit 678 and the resumable indicator 668 are determined and/or set in relation to each another. In some other embodiments, the reuse limit 678 and/or the resumable indicator 668 are determined in accordance with other factors such as whether the session has expired and/or is corrupted.

To resume a SSL session 641, a client may send a request 672 to the intermediary 200. The flow distributor 550 of the intermediary 200 can process the request 672 and/or forward the request to one of the plurality of cores. The request 672 may include a session identifier 688 of the SSL session 641 identified to resume. The request 672 may also include any information related to the session 641, the client 102, the server 106 and the first core 661. If a second core 662 receives the request, the second core 662 may send a message to the first core 661 requesting for information about the SSL session 641. The second core 662 can use this information about the SSL session 641 to copy, clone, reconstruct, duplicate, mirror or otherwise create a SSL session 641' substantially similar to the original SSL session 641. This process may be generally referred to as cloning a session. The SSL session 641' is sometimes referred to as a copy of the original session 641, or a clone of the original session 641.

The information about the SSL session 641 may include one or more of: protocol stack information, TCP tuple information, a master key, a client certificate, a name of a cipher, a result of client authentication, and an SSL version. Some or all of this information may be held in the SSL session data structure of the SSL session 641. The second core 662 may access some or all of this information via the first core 661. Although information for generating an identical SSL session may be available in the session data structure of the SSL session 641, a complete copy of the session data structure may not be required to clone and resume the SSL session.

In some embodiments, protocol stack information may be determined from the SSL version information. In other embodiments, information on the state and/or components of the protocol stack, such as that of drivers and agents that may be dynamically installed and/or configured, can be used for cloning the SSL session 641. The first core 661 may use at least some portions of TCP tuple information to clone the SSL session 641. The first core 661 may also obtain TCP tuple information from the request 672.

A first core 661 or a packet processor 240 of the core can use a master key for the SSL session to manage security, for example data encryption and decryption, and securing transactions though authorization and authentication. The master key can be applied to SSL certificates. The master key can be 48 bits long although other embodiments are also supported. In some embodiments, the master key can be a Federal Information Processing Standard (FIPS) key, such as one generated by a FIPS card. The intermediary 200 may include a FIPS card in communication with the first core 661. The master key can also be created by a certificate authority (CA), such as a local CA residing in the intermediary 200. In one embodiment, the CA executes on the first core 661 and generates certificates, certificate revocation lists (CRLs) and certificate signing requests (CSRs) in addition to the keys. By way of illustration and not limiting in any way, one embodiment of a set of typical commands for a CA is as follows:

create ssl rsakey
convert ssl pkcs12
convert ssl pkcs8
create ssl dhParam
create ssl dsaKey
create ssl crl
create ssl certReq
create ssl cert The second core 662 may request some or all of the generated information from the first core 661 to clone the SSL session 641. In some embodiments, the second core 662 requests a minimum set of information to reuse the SSL session 641. The first core 661 may send a minimal set of information to the second core 662 to clone the SSL session 641. The first core 661 may send one or more messages containing the set of information to clone the SSL session 641.

The first core 661 can use information related to the client certificate, for example, to determine the certificate authority status, issuer identifier of the certificate, and whether the certificate is valid and/or revoked. Client certificate information can facilitate authentication and/or authorization management in the cloned session. In some embodiments, a client certificate is required to support client authentication and/or SSL data insertion. In different embodiments, client certificate information can be of variable size.

The name or type of a cipher, including any configuration of the cipher, can allow the second core 662 to decode/encode/decrypt/encrypt data consistent with the SSL session 641. Cipher information can be sent in 32 bytes of information, although other embodiments can be supported. In addition, client authentication results can facilitate re-authentication of the client and/or allow bypass of some authentication steps. Client authentication results may also be used in policy-based authentication of the client 102, such as using one or more of the policies 657. Client authentication results can be sent in 4 bytes of information, although other embodiments can be supported.

The second core 662 may also request for the SSL version to clone a SSL network protocol stack and/or session data structure. The SSL version may also facilitate cloning of connections within the SSL network protocol stack as well as connections between any layer of the protocol stack with the client 102, server 106, and any other network component. SSL version information can be sent in 4 bytes of information, although other embodiments can be supported. In some embodiments, additional information or arguments for using the master key and/or other keys can be used to clone a SSL session. For example and in one embodiment, SSLv2 protocol may require the use of a 8 bit key argument.

The first core 661 that owns the SSL session 641 may store information about session reuse by other cores. This information can be maintained as a bit-pattern, such as a bit pattern representing the cores of the multi-core system, in the session cache 651 or in memory 667. This information may also include a reference count of cloned sessions 641'. This information can be used for ageing the cloned sessions for timeout. On timeout of a cloned session 641', the non-owner core (for example, the second core 662) may send a message to the first core 661 indicating that the cloned session 641' has ended. In response to this message, the first core 661 may update the stored information, e.g., a reference count of cloned sessions. In one embodiment, the SSL session 641 may not be terminated if cloned sessions are active. In some embodiments, each core processes session ageing irrespective of whether the SSL session is a cloned or original session. Certain operations performed by a core described herein in various embodiments may be performed by a packet engine 240 of the core.

Figure 7A:
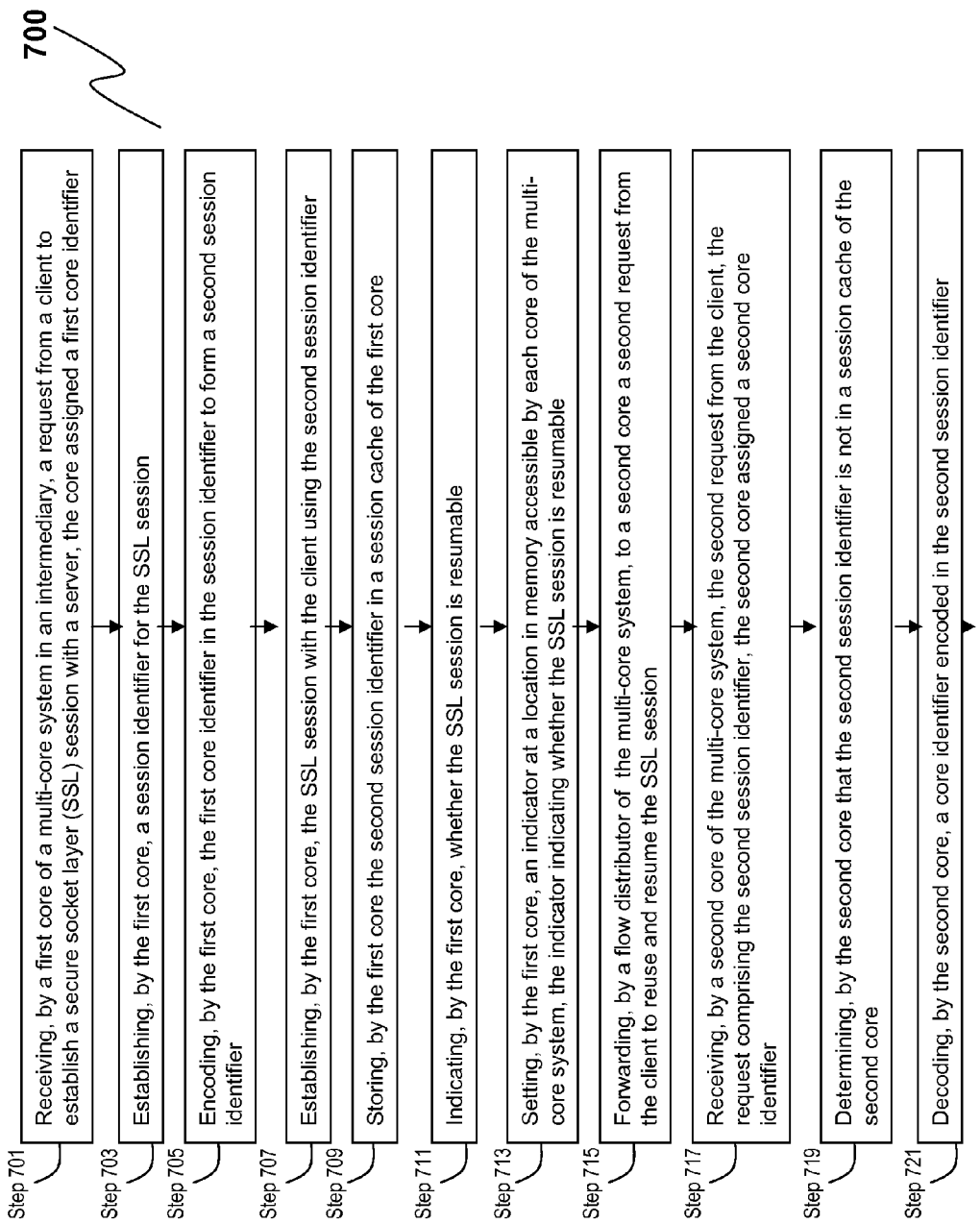
FIG. 7A-7B are flow diagrams of an embodiment of steps of a method for managing session persistence and reuse in a multi-core system.
Figure 7B:
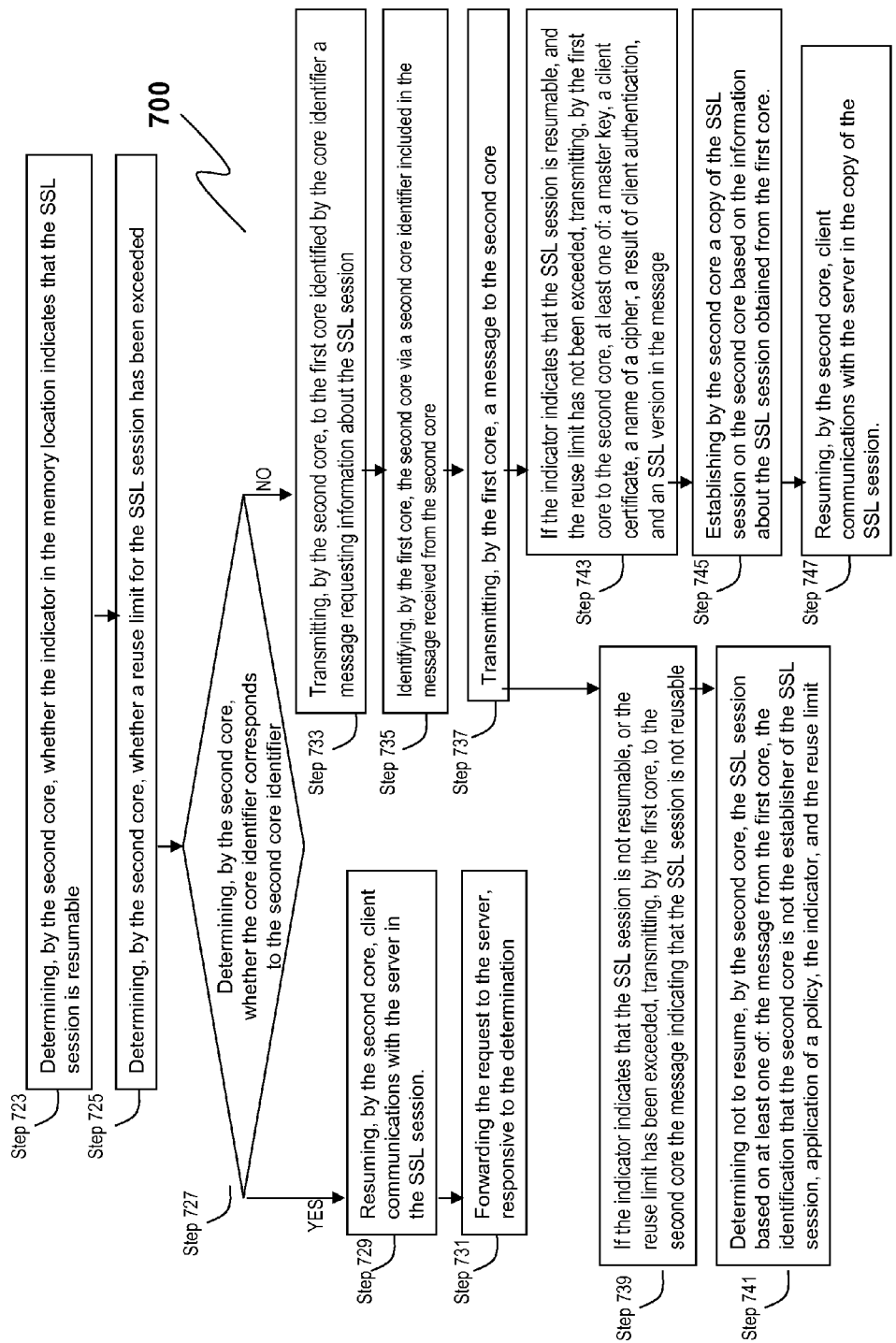

Referring now to FIGS. 7A and 7B, a flow diagram depicting an embodiment of steps of a method 700 for maintaining session persistence and reuse in a multi-core system is shown. In brief overview, at step 701, a first core of a multi-core system in an intermediary 200 receives a request 671 from a client 102 to establish a secure socket layer (SSL) session 641 with a server 106, the core 661 assigned a first core identifier 656. At step 703, the first core 661 establishes a session identifier for the SSL session 641. At step 705, the first core encodes the first core identifier 656 in the session identifier to form a second session identifier 688. At step 707, the first core 661 establishes the SSL session 641 with the client 102 using the second session identifier 688. At step 709, the first core 661 stores the second session identifier 688 in a session cache 651 of the first core 661. At step 711, the first core 661 indicates whether the SSL session 641 is resumable. At step 713, the first core 661 sets an indicator 668 at a location in memory 667 accessible by each core of the multi-core system, the indicator 668 indicating whether the SSL session 641 is resumable. At step 715, a flow distributor 550 of the multi-core system forwards a second request 672 from the client 102 to a second core 662 to reuse and resume the SSL session 641. At step 717, the second core 662 receives the second request 672 from the client 102, the request 672 comprising the second session identifier 688. The second core 662 is assigned a second core identifier 658. At step 719, the second core 662 determines that the second session identifier 688 is not in a session cache 652 of the second core 662.

At step 721, the second core 662 decodes a core identifier 656 encoded in the second session identifier 688. At step 723, the second core 662 determines whether the indicator 668 in the memory location indicates that the SSL session 641 is resumable. At step 725, the second core 662 determines whether a reuse limit 678 for the SSL session 641 has been exceeded. At step 727, the second core 662 determines whether the core identifier 658 corresponds to the second core identifier 658. At step 729, the second core 662 resumes client communications with the server 106 in the SSL session 641'. At step 731, the second core 662 forwards the request 672 to the server 106. At step 733, the second core 662 transmits a message requesting information about the SSL session 641 to the first core 661 identified by the core identifier 656. At step 735, the first core 661 identifies the second core 662 via a second core identifier 658 included in the message received from the second core 662. At step 737, the first core 661 transmits a message to the second core 662. At step 739, the first core 661 transmits to the second core 662 the message indicating that the SSL session 641 is not reusable. At step 741, the second core 662 determines not to resume the SSL session 641 based on at least one of: the message from the first core, the identification that the second core is not the establisher of the SSL session 641, application of a policy, the indicator 668, and the reuse limit 678. At step 743, the first core 661 transmits, to the second core 662, at least one of: a master key, a client certificate, a name of a cipher 631, a result of client authentication, and an SSL version in the message. At step 745, the second core 662 establishes a copy of the SSL session 641' on the second core 662 based on the information about the SSL session 641 obtained from the first core 661. At step 747, the second core 662 resumes client communications with the server 106 in the copy of the SSL session 641'.

In further details of step 701, a first core of a multi-core system in an intermediary receives a request from a client to establish a SSL session with a server. In one embodiment, a first core 661 of multi-core system deployed as an intermediary 200 between the client 102 and a server 106 receives a request 671 from a client 102 to establish a SSL session 641 with a server 106. In some embodiments, the first core 661 receives a client-hello message 671 from the client 102. The first core 661 may receive a first request 671 from the client 102 via the flow distributor 550. The first core 661 is assigned a first core identifier 656. The first core 661 may be assigned a core identifier 656 based on an identifier of a processing unit of the first core. In one embodiment, the first core 661 is assigned a one-byte core identifier 656. The multi-core system, the flow distributor 550, or other component of the intermediary 200 may generate and assign the first core identifier 656 to the first core 661. The first core identifier 656 may be generated via application of at least one policy 657.

The flow distributor 550 may identify the first core 661 based on information (e.g., TCP tuple) included in the request 671. For example, in one embodiment, the flow distributor 550 calculates a hash value for the first request 671 based on information (e.g., TCP tuple) included in the request 671. The flow distributor may identify the first core 661 from the calculated hash value. The flow distributor 550 may determine that the first core 661 is active and/or available to handle the request 671. The flow distributor 550 may then forward the request 671 to the first core 661. The first core 661 can receive the request 671 via a transceiver 621 of the first core 661.

In further details of step 703, the first core establishes a session identifier for the SSL session. Responsive to receiving the request 671, the first core may parse, extract or otherwise process information from the request 671. The first core 661 may parse the request 671 for a session identifier, if available. In some embodiments, an absence of a session identifier in the request 671 indicates that the request 671 is a request for establishing a new SSL session. The first core 661 may perform authentication and/or authorization in connection with request 671, for example, by applying at least one policy 657.

In some embodiments, the server 106 generates the session identifier 688' for the SSL session 641. The first core 661 may obtain the session identifier 688' from the server 106. In other embodiments, the first core 661 may generate the session identifier 688' for the SSL session 641. The session identifier 688' may be generated via any program code, formulas or algorithms. In one embodiment, the server 106 and/or the first core 661 may generate a 16 byte session identifier 688'. In one embodiment, the server 106 and/or the first core 661 may generate a 32 byte session identifier 688'. In some embodiments, the server 106 and/or the first core 661 may reserve 4 byte of the session identifier 688' for timestamp information. The server 106 and/or the first core 661 may generate a random session identifier 688'. The server 106 and/or the first core 661 may generate a session identifier 688' using a cipher 631 and/or a random code generator. The server 106 and/or the first core 661 may apply at least one policy 657 in generating the session identifier 688'. During generation of the session identifier 688', the server 106 and/or the first core 661 may determine that the session identifier 688' is unique for the multi-core system. In some embodiments, the session identifier 688' is generated after the SSL session 641 is established. In other embodiments, the session identifier 688' is generated while the SSL session 641 is established.

In some embodiments, a SSL server or vserver generates the session identifier. In other embodiments, the client 102 generates the session identifier 688'. In some other embodiments, the session identifier 688' may be generated by a cipher 631 and/or an encryption engine 234.

In further details of step 705, the first core encodes the first core identifier 656 in the session identifier 688' to form a second session identifier 688. In some embodiments, the first core 661 uses an encoder/decoder pair or a cipher 631 to encode the first core identifier 656 in the session identifier 688' to form a second session identifier 688. The first core 661 may encode a byte of the session identifier 688' with the core identifier 656 to form the second session identifier 688. The first core 661 may encode the core identifier into a plurality of bits of the session identifier 688' to form the second session identifier 688. The first core 661 may determine at a predetermined frequency a predetermined set of one or more bytes of the session identifier 688' to encode to form the second session identifier 688. The first core 661 may determine a predetermined set of one or more bytes of the session identifier 688' to encode to form the second session identifier 688. The first core 661 may determine a predetermined set of one or more bits of the session identifier 688' to encode to form the second session identifier 688. The first core 661 may encode the core identifier 656 as a bit pattern in the session identifier 688. The first core 661 may set or unset a number of bits in the session identifier 688 to encode the core identifier 656.

The first core 661 may encode, with a block cipher, the core identifier 656 and a validity identifier with the session identifier 688' to form the second session identifier 688. The first core 661 may encode the core identifier 656 and/or a validity identifier with the session identifier 688' using a DES or 3DES cipher. The first core 661 may use 7 bytes of the session identifier 688' to encode the validity identifier. The first core 661 may use 8 bytes of the session identifier 688' to encode both the core identifier 656 and the validity identifier. The multi-core system, intermediary 200, a SSL server or a SSL vserver may generate the validity identifier.

In some embodiments, the first core 661 uses an encoder/decoder pair or a cipher 631 to encode the first core identifier and/or a validity identifier in the session identifier 688' to form a second session identifier 688. In some embodiments, the first core 661 executes program codes to encode the first core identifier 656 and/or a validity identifier in the session identifier 688' to form a second session identifier 688. The first core 661 may also perform mapping or apply hash functions on session identifier 688' before or after encoding. The second session identifier 688 may be a result of mapping, hash functions and/or encoding applied on the session identifier 688'. The first core 661 may randomly select a byte location in the session identifier to encode the core identifier.

The first core 661 may randomly select byte locations in the session identifier to encode the validity identifier.

In further details of step 707, the first core establishes the SSL session 641 with the client using the second session identifier 688. The first core 661 may establish an SSL session 641 with a client responsive to the request 671. The first core 661 may establish an SSL session 641 with a client 102 responsive to successful authentication and/or authorization. The first core 661 may initiate handshaking operations with the client 102 and/or server 106, to establish one or more connections between the client 102 and the server 106. The first core 661 may negotiate a SSL version with the client 102 and/or the server 106. Upon reaching agreement of a SSL version, the first core 661 may establish a session protocol stack for a SSL session 641. The first core 661 may execute one or more drivers and/or agents in the protocol stack in establishing the protocol stack. The first core 661 may establish one or more connections between the client 102, server 106 and layers of the session protocol stack. In addition, the first core 661 may establish a session data structure for the SSL session 641.

The first core 661 may perform any of the steps of establishing the SSL session 641 via functionality provided by one or more of: the cipher 631, the encryption engine 234 and/or a SSL vserver executing on the first core 661 or on the multi-core system. In addition, the SSL session 641 may be generated based on application of at least one policy 657. The first core 661 may allocate memory for establishing and/or maintaining the SSL session 641. Further, the first core 661 may establish the session data structure for the SSL session 641. In some embodiment, the backend server 106 establishes the SSL session 641 on behalf of the first core 661.

In further details of step 709, the first core stores the second session identifier 688 in a session cache 651 of the first core 661. The first core 661 may create or allocate memory for a session cache 651 responsive to the request 671. The first core 661 may create or allocate memory for a session cache 651 responsive to successful authentication and/or authorization. The first core 661 may create a session cache 651 for one or more SSL sessions associated with the first core 661. The first core 661 may create a session cache 651 in association with establishing a SSL session. In one embodiment, the first core 661 stores the second identifier 688 at a location in memory 667. The first core 661 may store the second identifier 688 in a private memory space of the first core 661. In one embodiment, the first core 661 stores the second identifier 688 at a location in shared memory 667 accessible by a plurality of cores.

In further details of step 711, the first core indicates whether the SSL session is resumable. In one embodiment, the first core 661 of a multi-core system indicates that an SSL session 641 established by the first core 661 is resumable or non-resumable. In another embodiment, the first core 661 of the multi-core system deployed as an intermediary 200 between the client 102 and a server 106 receives a notification that the SSL session 641 is resumable or non-resumable. The multi-core system or the flow distributor 550 may determine that the SSL session 641 is resumable or non-resumable. The SSL session 641 may be resumable or non-resumable based on a setting, preference or configuration associated with the client 102, the server 106 and/or the request 671. In still another embodiment, the first core 661 of the multi-core system deployed as an intermediary 200 between the client 102 and a server 106 determines that the SSL session 641 is resumable or non-resumable in accordance with a policy 657.

In some embodiments, the first core 661 identifies, via core identifiers included in requests for session information for the SSL session 641, one or more cores of the multi-core system that sent the requests. The first core 661 may receive these requests as CCM messages from other cores. The first core 661 may receive these requests from other cores responsive to a session disruption. The first core 661 may parse each request for a core identifier, each core identifier identifying a core that sent the request. The first core 661 can identify one or more cores based on a bit pattern of data stored on the first core 661. The first core 661 can identify one or more cores based on a bit pattern of data stored in the memory 667. The first core 661 can identify the one or more cores by comparing the core identifiers included in the requests with the bit pattern.

In some embodiments, the first core 661 transmits to each of the identified one or more cores of the multi-core system a message indicating that the SSL session 641 is resumable or non-resumable. The first core 661 may broadcast a message to each of the identified one or more cores indicating that the SSL session 641 is resumable or non-resumable. In some embodiments, the first core 661 sends a message to each of the identified one or more cores if a resumable indicator 668 is not available and/or not set.

In further details of step 713, the first core 661 sets an indicator 668 at a location in memory 667 accessible by each core of the multi-core system. The indicator 668 indicates whether the SSL session 641 is resumable. In one embodiment, responsive to the indication, the first core 661 sets an indicator 668 at a location in memory 667 accessible by each core of the multi-core system. The indicator 668 may indicate that the SSL session 641 is resumable or non-resumable. The indicator 668 may be referred to as a resumable indicator 668. The first core 661 may store, to the location in the memory 667, a value for a resumable field associated with the SSL session 641 as the indicator.

In further details of step 715, a flow distributor 550 of the multi-core system forwards a second request 672 from the client 102 to a second core 662 to reuse and resume the SSL session 641. In some embodiments, a flow distributor 550 (e.g., receive side scaler) of the multi-core system determines to forward the request 672 to the second core 662 based on a source port indicated by the request 672. The flow distributor 550 may receive the second request 672 from the client 102. The flow distributor 550 may receive the second request 672 after a disruption related to the SSL session 641. The flow distributor 550 may determine to forward the request 672 to the second core 662 based on a non-availability of the first core 661. The flow distributor 550 may determine to forward the request 672 to the second core 662 based on a TCP tuple indicated by the request 672. The flow distributor 550 may determine to forward the request 672 to the second core 662 based on a hash index determined from a TCP tuple indicated by the request 672. The flow distributor 550 may determine to forward the request 672 to the second core 662 by associating the hash index with the second core 662.

In further details of step 717, the second core 662 receives the second request 672 from the client 102. The request comprises the second session identifier 688. In some embodiments, the second core 662 of the multi-core system deployed as an intermediary 200 between the client 102 and a server 106 receives the request 672 from the client 102 to resume the SSL session 641 with the server. The second core 662 is assigned a second core identifier 658. The multi-core system may assign the second core identifier 658 to the second core 662 based on an identifier of a processing unit of the second core 662. The multi-core system may assign the core a one-byte core identifier 658. The multi-core system may generate for the second core identifier 658 a random and/or unique core identifier in the multi-core system.

The second core 662 can receive, via a transceiver 622 of the second core 662, the second request 672. The second core 662 may receive the second request 672 from the flow distributor 550. The second core 662 may receive the second request 672 as a client-hello message. The second core 662 may receive the request 672 from a client 102 via a SSL session. For example, a connection between the client and the intermediary 200 may be maintained but a connection between the intermediary 200 and the server 106 may be disrupted. The second core 662 may receive the request 672 to resume and/or reuse the SSL session 641.

The second request 672 may comprise a session identifier 688. The second core 662 may parse, extract and/or decode a session identifier 688 from the second request 672. The second core 662 may parse, extract and/or decode this second session identifier 688 from the second request 672 responsive to receiving the second request 672. The second core 662 may decode the second session identifier 688 to extract a core identifier 656 and/or validity identifier from the session identifier 688. The second core 662 may apply mapping and/or hash functions on the session identifier 688 before or after the decoding.

In some embodiments, the decoding process includes applying mapping and/or hash functions on the session identifier 688. Application of mapping and/or hash functions may yield the original session identifier generated by the server 106 for the SSL session 641. The second core 662 may apply this original session identifier in communications with the server 106. The second core 662 may use this original session identifier to identify the server 106 and/or SSL session 641. In some embodiments, the second core 662 may check the session cache 652 against this original session identifier.

The second session identifier 688 may identify the first core 661 as an establisher or owner of the SSL session 641. The second core 662, may establish that the validity identifier is valid by accessing related information from memory 667, applying at least one policy 657, and/or communicating with at least one of: the first core 661, the flow distributor 550 and some other component of the intermediary 200.

In further details of step 719, and in one embodiment, the second core 662 determines that the second session identifier 688 is not in a session cache 652 of the second core 662. In another embodiment, the second core 662 determines that the second session identifier 688 is in a session cache 652 of the second core 662. Responsive to obtaining the second session identifier 688, the second core 662 may access at least one session cache 652 of the second core 662. The second core 662 may retrieve the at least one session cache 652 from memory 667. The second core 662 may retrieve information from the session cache 652, such as a session identifier, to compare against the second session identifier 688. Responsive to the comparison, the second core 662 can determine whether the second session identifier 688 is in a session cache 652 of the second core 662. In some embodiments, if the second session identifier 688 is in the session cache 652, the corresponding session is already associated with the second core 662. Consequently, the second core 662 can resume the session and resume client communications with the server 106 if other factors for resuming the session is met.

In further details of step 721, the second core decodes a core identifier 656 encoded in the second session identifier 688. The second core 662 may decode a second core identifier 658 from a byte of the second session identifier 688. The second core 662 may decode a predetermined byte of the second session identifier 688 to obtain the second core identifier 658. The second core 662 may apply a decoder to decode the second session identifier 688 to obtain the second core identifier 658. The second core 662 may apply a cipher 632 (e.g., a block cipher) to decode the second session identifier 688 to obtain the second core identifier 658. In other embodiments, the second core 662 may use a DES or a 3DES cipher. The second core 662 may decode the second core identifier 658 from a predetermined number of bits in the second session identifier 688.

In further details of step 723, the second core 662 determines whether the indicator 668 in the memory location indicates that the SSL session is resumable. The second core 662 processing a request 672 to reuse and/or resume a SSL session 641 may access the resumable indicator 668 to determine whether the SSL session 641 is resumable. The second core 662 may access the resumable indicator 668 from memory 667. The second core 662 may access a copy of the resumable indicator 668, for example, from the private memory space of the second core 662. The second core 662 may process the resumable indicator field or pointer destination to determine whether the SSL session 641 is resumable. In one embodiment, the second core 662 may determine that a resumable indicator 668 of the SSL session 641 does not exist or is not set. In some embodiments, the second core 662 receives a notification or message from the first core 661 or other component of the multi-core system on whether the SSL session 641 is resumable.

In one embodiment, the resumable indicator 668 and/or notification indicates that the SSL session 641 is non-resumable. In this embodiment, the second core 662 may determine not to resume the SSL session. Further details are described in connection with step 741. In another embodiment, the resumable indicator 668 and/or notification indicates that the SSL session 641 is resumable. In this embodiment, the second core 662 can resume the session and resume client communications with the server 106 if other requirements for resuming the session are met (see step 729).

In further details of step 725, the second core determines whether a reuse limit 678 for the SSL session has been exceeded. The second core 662 may access the memory 667 (e.g., shared memory space or private memory space) for a reuse limit 678. The second core 662 may set a reuse limit 678 for the SSL session 641, for example if a reuse limit 678 does not already exist. The second core 662 may compare the reuse limit 678 against a reuse history, counter or tracker. The second core 662 may access the memory 667 for the reuse history, counter or tracker.

In one embodiment, the second core 662 determines that the reuse limit 678 for the SSL session has been exceeded. In this embodiment, the second core 662 may determine not to resume the SSL session. Further details are described in connection with step 741. In another embodiment, the second core 662 determines that the reuse limit 678 for the SSL session has not been exceeded. Consequently, the second core 662 can resume the session and resume client communications with the server 106 if other requirements for resuming the session are met (see step 729).

In further details of step 727, the second core 662 determines whether the core identifier 656 corresponds to the second core identifier 658. In one embodiment, the second core 662 identifies from encoding of the second session identifier 688 that the second core 662 is not the establisher of the SSL session 641. For example, the second core 662 may determine that the core identifier 658 does not correspond to the second core identifier 656. In another embodiment, the second core 662 may identify from encoding of the second session identifier 688 that the first core 662 is the establisher of the SSL session 641. The second core 662 may send a message to the first core 661 to verify that the first core 662 is the establisher of the SSL session 641.

In still another embodiment, the second core 662 identifies from encoding of the second session identifier 688 that the second core 662 is the establisher of the SSL session. For example, the second core 662 may determine that the core identifier in the received session identifier matches the second core identifier 656. In this embodiment, the second core 662 can resume the session and resume client communications with the server 106 if other requirements for resuming the session are met (see step 729).

In further details of step 729, the second core 662 resumes client communications with the server 106 in the SSL session. If the core identifier 658 of the second core 662 corresponds to the second core identifier 656, the second core 662 may resume client communications with the server in the SSL session 641 if other requirements for resuming the session are met. If the second core 662 determines that the second core 662 is the establisher of the SSL session 641, the second core 662 may resume client communications with the server in the SSL session 641 if other requirements for resuming the session is met. In different embodiments, some or all of the following requirements must be met before the second core 662 can resume the SSL session 641:

i) the resumable indicator 668 (or a notification) indicates that the session is resumable;
ii) the reuse limit 678 is not exceeded;
iii) the session is not expired; and
iv) the session is not corrupted.

In connection with resuming the session 641, the second core 662 may update one or more of the: resumable indicator 668, the reuse limit 678 and the associated session cache. The second core 662 may restart a portion of the session protocol stack and/or restore a connection of the SSL session 641 (e.g., a disrupted connection between the server 106 and the protocol stack). In addition, the second core 662 may send a message to the client 102. In some embodiments, the second core 662 may initiate handshaking with the client to resume the SSL session 641, and may include authentication and/or authorization process steps.

In further details of step 731, the second core 662 forwards the request 672 to the server 106. The second core 662 may resume communications with the server 106 responsive to resumption of the SSL session 641. In one embodiment, the second core 662 resumes client communications with the server 106 from the point of disruption of the SSL session 641. In some embodiments, the resumption of client communications is transparent or substantially transparent to one or more of: the user of the client, the client 102 and the server 106

In further details of step 733, the second core transmits a message requesting information about the SSL session 641 to the first core identified by the core identifier 656. The second core 662 may transmit to the core identified by the core identifier a message requesting information about the established SSL session 641. In some embodiments, the second core 662 determines that the second core 662 is not the establisher of the SSL session 641. Responsive to the determination, the second core 662 may transmit a request to the core 661 that established the SSL session 641. The second core 662 may transmit a request to verify that the first core is the establisher of the SSL session 641.

The second core 662 may transmit a request for information to reuse and clone the SSL session 641. The second core 662 may transmit a request for a minimum set of information to reuse and clone the SSL session 641 on the second core 662. The second core 662 may transmit a request for at least a partial copy of the session data structure of the SSL session 641. The second core 662 may transmit a request for at least a master key, a client certificate, a name of a cipher, a result of client authentication, and an SSL version to reuse and clone the SSL session 641. The second core 662 may transmit a request for a key processing argument, a CRL and/or TCP tuple information. The second core 662 may transmit the request or message as a CCM message.

In further details of step 735, the first core 661 identifies the second core 662 via a core identifier 658 included in the message received from the second core 662. In some embodiments, the first core 661 receives the message or request from the second core 662. The first core 661 may parse or extract a core identifier 658 from the message or request to identify the second core 662. Based on the identification, the first core 661 may respond to the second core 662.

In further details of step 737, the first core 661 transmits a message to the second core 662. The first core 661 may transmit a message to the second core 662 responsive to the request or message from the second core 662. The first core 661 may send a confirmation message to the second core 662 that the first core 661 is the establisher of the SSL session 641. Steps 739 and 743 describe other embodiments of the first core's responses.

In further details of step 739, the first core 661 transmits to the second core 662 the message indicating that the SSL session is not reusable or resumable, if the indicator indicates that the SSL session is not resumable (e.g., from step 723) and/or the reuse limit has been exceeded (e.g., from step 725). In some embodiments, this message is a CCM message. The first core 661 may transmit the message indicating that the SSL session is non-resumable based on the resumable indicator 668. The first core 661 may transmit the message indicating that the SSL session is non-resumable based on a notification that the first core 661 has received. The first core 661 may transmit the message indicating that the SSL session is not reusable based on a reuse limit 678 of the SSL session 641. The first core 661 may transmit the message indicating that the SSL session is not reusable or resumable based on an expiration of the SSL session 641. The first core 661 may transmit the message indicating that the SSL session is not reusable or resumable based on a determination that the SSL session 641 is corrupted. The first core 661 may transmit the message indicating that the SSL session is not reusable or resumable based on detecting an error message in the SSL session 641.

In further details of step 741, the second core determines not to resume the SSL session based on at least one of: the message from the first core, the identification that the second core is not the establisher of the SSL session, application of a policy, the indicator, and the reuse limit. The second core 662 may receive a message from the first core 661 indicating that the SSL session 641 is not reusable or resumable based on any of the reasons described in connection with step 739. The second core 662 may determine not to resume the SSL session 641 based on the message from the first core 661. The second core 662 may determine not to resume the SSL session 641 based on limited resources available on the second core 662.

The second core 662 may determine not to resume the SSL session 641 based on a determination that the second core 662 did not establish the SSL session 641. The second core 662 may determine whether a predetermined maximum reuse threshold (e.g., reuse limit 678) has been reached. The second core 662 may determine not to resume the SSL session 641 if the maximum reuse threshold is reached or exceeded. The second core 662 may determine not to resume the SSL session 641 in the absence of a reuse limit 678. The second core 662 may determine not to resume the SSL session 641 based on a determination that the SSL session 641 is non-resumable according to the resumable indicator 668.

In some embodiments, the second core 662 removes information about the SSL session 641 from a session cache 652 of the second core 662. The second core 662 may remove a session cache 652 of the second core 662. The second core 662 may remove the information and/or the session cache 652 responsive to a determination not to resume or reuse the SSL session 641. In some embodiments, the second core 662 establishes a new SSL session responsive to the client request 672. The second core may negotiate with the client 102 for a new SSL version and/or send a new session identifier to the client 102. Embodiments of details for establishing a new SSL session are described above in connection step 701.

In further details of step 743, the first core transmits, to the second core, at least one of: a master key, a client certificate, a name of a cipher, a result of client authentication, and an SSL version in the message, if the indicator indicates that the SSL session is resumable (e.g., from step 723) and the reuse limit has not been exceeded (e.g., from step 725). In one embodiment, the first core 661 transmits to the second core 662 a master key, a client certificate, a name of a cipher, a result of client authentication, and an SSL version. The first core 661 may also transmit information associated with key processing arguments, CRLs and TCP tuples. The first core 661 may send the second core 662 at least a portion of the session data structure of the SSL session 641.

The first core 661 may send the second core 662 any other information for resuming or reusing the SSL session 641. The first core 661 may send the second core 662 a minimum set of information for resuming or reusing the SSL session 641 in the second core 662. The first core 661 may send the second core 662 information for cloning or creating a copy of the SSL session 641 in the second core 662. The first core 661 may send any of this information to the second core 662 in one or more messages. The one or more messages may be sent via CCM. In some embodiments, the first core 661 may provide any of this information at a location in memory 667 for the second core 662 to access. The first core 661 may also provide the second core 662 a pointer or location to any of this information.

In further details of step 745, the second core establishes a copy of the SSL session 641' on the second core based on the information about the SSL session obtained from the first core. In some embodiment, the second core 662 establishes a clone or copy of the SSL session 641' using one or more steps substantially similar to establishing a new SSL session. The second core 662 may build a session data structure for the SSL session 641' from a partial data structure of the original SSL session 641 provided by the first core 661. The second core 662 may initiate handshaking steps with the client 102 and/or server 106. The handshaking steps may include any extent and combination of authentication, authorization, certificate validation/renewal, and key validation/renewal depending on the information provided by the first core 661.

The second core 662 may generate a session identifier 688' for the cloned SSL session 641'. The second core 662 may generate a session identifier 688' that is the same as the session identifier 688 for SSL session 641 except for the encoded bits for the core identifier. The second core 662 may encode the core identifier 658 of the second core 662 in the session identifier 688'. A validity identifier for the SSL session 641' may be issued and encoded in the session identifier 688'. The second core 662 may create a session cache 652 in connection with establishing the cloned SSL session 641'. The second core 662 may update the session cache 652 with the session identifier 688'. The second core 662 may create and/or update the session cache according to embodiments of steps described above in connection with FIG. 6 and steps 701 and 707.

The second core 662 may update the resumable indicator 668, reuse limit 678 and/or reuse count. The second core 662 may also send a message to the first core 661 indicating that the cloned session 641' is resumed. The first core 661 may update a record for tracking session reuse of the SSL session 641 amongst the plurality of cores. The first core 661 may maintain the original SSL session 641 if any corresponding cloned sessions 641' are active.

In further details of step 747, the second core 662 resumes client communications with the server 106 with the copy of the SSL session 641'. The second core 662 may resume client communications with the server 106 with the cloned SSL session 641' substantially similar to the steps described in connection with steps 729 and 731. The second core 662 may transmit a message to the client 102 and/or server 106 including the new session identifier 688' and core identifier 658. In one embodiment, the second core 662 resumes client communications with the server 106 from the point of disruption of the original SSL session 641. In some embodiments, the resumption of client communications is transparent or substantially transparent to one or more of: the user of the client, the client 102 and the server 106.

Although generally discussed with respect to a first and a second core, the techniques in this disclosure can apply to any cores of the multi-core system. Various embodiments of the methods may include any combination of the steps described. The systems and methods disclosed can apply to homogeneous and heterogeneous systems. Homogeneous systems includes but are not limited to i) cores in a multi-core system, ii) a plurality of multi-core systems, and iii) servers in a server farm. Heterogeneous systems include but are not limited to i) general purpose CPUs and application specific cores, ii) a network of machines of various types, iii) multi-core systems of different types and/or number of cores, and iv) server farms comprising machines of different types and/or number of machines.

In some embodiments, the systems and methods disclosed can applied to cluster deployment where session cloning is performed across homogenous or heterogeneous systems. In one embodiment, a plurality of sessions in a first multi-core system may be cloned in a second multi-core system. In other embodiments, session information and parameters may be reused across homogenous or heterogeneous systems. In some embodiments, SSL security parameters may be transferred across homogenous or heterogeneous systems. Some or all of a set of SSL security parameters may be copied, regenerated, or otherwise reused in one or more cores or machines. Examples of SSL security parameters include identification of a secure port for SSL connection, the level or strength of encryption, the interval for session renegotiation, enablement of host matching and location of private key. Furthermore, reuse may include, but is not limited to, information and/or parameters related to keys, encryption, certificates, ciphers. authentication results and SSL version. Embodiments of this information and/or parameters are described above in connection with FIG. 6.

The systems and methods disclosed can also be applied to state-full SSL session failover in homogenous or heterogeneous systems. In some embodiments, Active-Standby deployment may be available where a SSL session established on an active node is cloned on a standby node. When failover happens, the standby node can take over as the active node. The SSL clients may not need to re-negotiate the SSL session as the new Active node already has the complete cloned session. The systems and methods disclosed can be further applied to external heterogeneous systems, such as those with well-defined authentication processes in place to identify the external device performing session cloning.

G. Systems and Methods for Maintaining Certificate Revocation Lists for Client Access A certificate revocation list (CRL) may be used in any cryptographic system, such as a public key infrastructure (PKI) system, for storing information on digital certificates that have been revoked or are no longer valid. Such certificates may be any form or type of encryption or security certificate, for example, SSL certificates. A CRL may include any type or form of list, table or data representation associated with one or more certificates. A CRL may incorporate any type or form of identifiers for the certificates. In some embodiments, a CRL incorporates serial numbers identifying certificates that have been revoked. Upon receiving a client request, a certificate manager may compare the serial number of a certificate identified by the request against one or more CRLs. A matching serial number in the one or more CRLs may indicate that the certificate has been revoked. A certificate may be revoked for a number of reasons, for example, if it is determined that an associated certificate authority (CA) has improperly issued the certificate. A certificate may also be revoked if a private key is compromised or suspected to be compromised. A certificate may also be revoked if the certificate has expired. When a certificate from a client requesting access to a service, file or connection is revoked, the request may be rejected, ignored or evaluated further under certain circumstances.

Referring now to FIG. 8A, an embodiment of a system for maintaining at least one CRL is depicted. In brief overview, the system includes at least one memory device storing a plurality of CRLs. A serial number of a certificate that is revoked can be mapped and stored into a bit array 808 of a CRL. Some of the CRLs may be linked, for example, as an extended list or an associated group of CRLs. Each of the linked CRLs may be stored at different locations in memory. A CRL may be shared and accessed by one or more cores of a multi-core system. A CRL is may be associated with one CA or a plurality of CAs. One or more CRLs can be accessed in response to a client request for validation against a certificate identified by the request. In some embodiments, a group of linked CRLs may be accessed via a single pointer 827 linked to a first CRL (CRL1) by traversing links between the CRLs (CRL2, CRL3, etc). In some embodiments, the pointer 827 is referred to as a CRL head. The CRL head 827 may be associated with one or more nodes, including a dead node 821. In some embodiments, a link associated with a CRL may be in a transient stage, for example, while a node or CRL entry is added to a linked list. The group of linked CRLs may be associated with one or more of: a machine 102, 106, an SSL proxy or appliance 200, and a core of a multi-core system.

In further details of FIG. 8A, the plurality of CRLs may be maintained or stored at one or more locations within a memory device or distributed across multiple memory devices in a network. Any group of linked CRLs can be maintained or stored across one or more locations in a network. A certificate manager, such as a CA or some other agent, may access a group of linked CRLs in response to a client request. For example, a client 102 may request for access to a server 106 associated with CRL2 accessible via the pointer 827. The certificate manager will access CRL2 via the pointer 827 and CRL1. If a request is related to more than one linked CRLs, the linked CRLs may be traversed sequentially and compared against the certificate serial number identified by the request. This process may terminate upon finding a first match against the serial number, indicating that the certificate has been previously revoked.

In some embodiments, a group of linked CRLs may be implemented as a double linked list of nodes. A double linked list may start at one end at a pointer 827 and include a dead node 812 at the far end. In one embodiment, an intermediate node may exist between the pointer 827 and CRL1. Each node may include two links, or a pair of bidirectional links, with another node. These links can allow bidirectional traversal between nodes for accessing related/additional CRLs. Each active node may include at least one CRL, each CRL supporting at least one certificate in a bit array 808. The bit array may be any aggregate of storage elements for data bits, such a one-dimensional array or a multi-dimensional array. A bit array is sometimes referred to as a hash bucket or table. In some embodiments, each node may include a pointer to the bit array instead of containing the bit array.

Each linked list may include a dead node 812. The dead node 812 may or may not include a CRL. In one embodiment, a dead node is not inspected while traversing a linked list. The dead node 812 may include a dead node flag 814, for example, to indicate that it is a dead node. The dead node flag 814 may indicate that the node 812 does not include any CRLs. The dead node flag 814 may identify a dead node 812 to a certificate manager as the linked list of CRLs is traversed, indicating one end of the list. In addition, the dead node flag 814 may identify the dead node 812 as the point for adding a new node. In some embodiments, a new node CRL4 replaces the dead node 812, for example, by re-connecting the links of the dead node 812 to the new node CRL4 after disconnecting the dead node 812. In one of these embodiments, the new node CRL4 is linked to another dead node 812'. In another embodiment, the dead node 812 is populated with a CRL. Responsive to this, the dead node flag 814 of node 812 is removed, set or otherwise modified to indicate that node 812 is no longer a dead node, i.e., active. A new dead node 812' may be appended to node 812 or CRL4 to complete the linked list. A plurality of linked lists can exist in memory. In some embodiments, a circularly linked group of nodes may be implemented with single or bi-directional links between each node.

Referring now to FIG. 8B, an embodiment of a system for updating a CRL is depicted. In brief overview, a change may be applied to a node CRL2 in a linked list, such as an update with new data or a deletion of that node. In some embodiments, this may coincide with another operation, such as a read operation on a bit array in the same node. The bit array may include a reader bit flag or variable to indicate if the bit array is being accessed. If the reader bit is set, the system may delay the change. This delay may be in accordance with a predetermined period of time or a determination that the node is not longer being accessed, based on the reader bit flag or variable for example. The system may delay the change by storing the change to a delayed "clean up" list. A delayed "clean up" list may be associated with one or more CRLs, linked lists and cores. This delayed "clean up" list may be any form or type of storage construct, such as a queue or cache containing the data change or operation. For example, and in one embodiment, a deletion of CRL2 may be desired. If the reader bit is set, the CRL may not be deleted from the linked list. If the reader bit is set, the delete operation can be added to the delayed "clean up" list for later processing. If the reader bit is not set, the bit array of CRL may be freed or unlinked from the CRL. If the reader bit is not set, the CRL may be deleted from the node. In some embodiments, the node remains in the linked list and may be re-used for a new CRL entry.

In some embodiments, a node or CRL may include a delete flag to indicate deletion of the CRL in the node. In one embodiment, a deletion of the CRL may occur upon setting of the delete flag. In one embodiment, a deletion of the CRL may occur at a predetermined time, according to a schedule, or in response to a specified occurrence, after the setting of the flag. A reader bit or variable of a bit array associated with a node may be set responsive to setting a delete flag of the node. In other embodiments, a node may include a "don't use" flag to indicate that information in the node or a CRL in the node should not be used. The "don't use" flag may be set when information in the node or the CRL is being modified and/or the node or the CRL is being deleted. For example, the "don't use" flag may be set responsive to setting a delete flag of the node and/or setting a reader bit of a bit array associated with the node or CRL. If one or both of the delete or "don't use" flag is set, a subsequent operation may be queued in the delayed "clean up" list.

Referring now to FIG. 8C, another embodiment of a system for updating a CRL is depicted. In brief overview, a change may be applied to a bit array of a CRL of a node in a linked list. The change may be a partial or complete update or replacement of the bit array. For example, a certificate serial number may be added into the bit array. If the reader bit or variable of the bit array is not set and/or the "don't use" flag is not set, the system may process this change. The system may create a new bit array with the serial number, directly refresh the bit array with the serial number, or refresh a copy of the bit array with the serial number. The system may link a replacement bit array (a new bit array or a refreshed copy of the bit array) and the old bit array to the CRL while processing a replacement of the old bit array with the replacement bit array. In some embodiments, the system removes the old bit array and adds the old bit array to the delayed "clean up" list. The system may also add the replacement bit array to the delayed "clean up" list. The old bit array may be replaced with the replacement bit array in the delayed "clean up" list before linking the replacement bit array to the CRL. In another embodiment, the replacement bit array is linked to the CRL upon removal of the old bit array to the delayed "clean up" list.

The operations described in connection with FIGS. 8A-8C may be performed by a core of a multi-core system. This core is sometimes referred to as a master core. A master core may maintain a CRL. The CRL may be shared between a plurality of cores in a multi-core system. For example, the master core may release old, deleted bit arrays associated with a CRL from memory by removing these bit arrays from the delayed "clean up" list. The master core may also perform operations queued in the delayed "clean up" list.

Figure 8D:
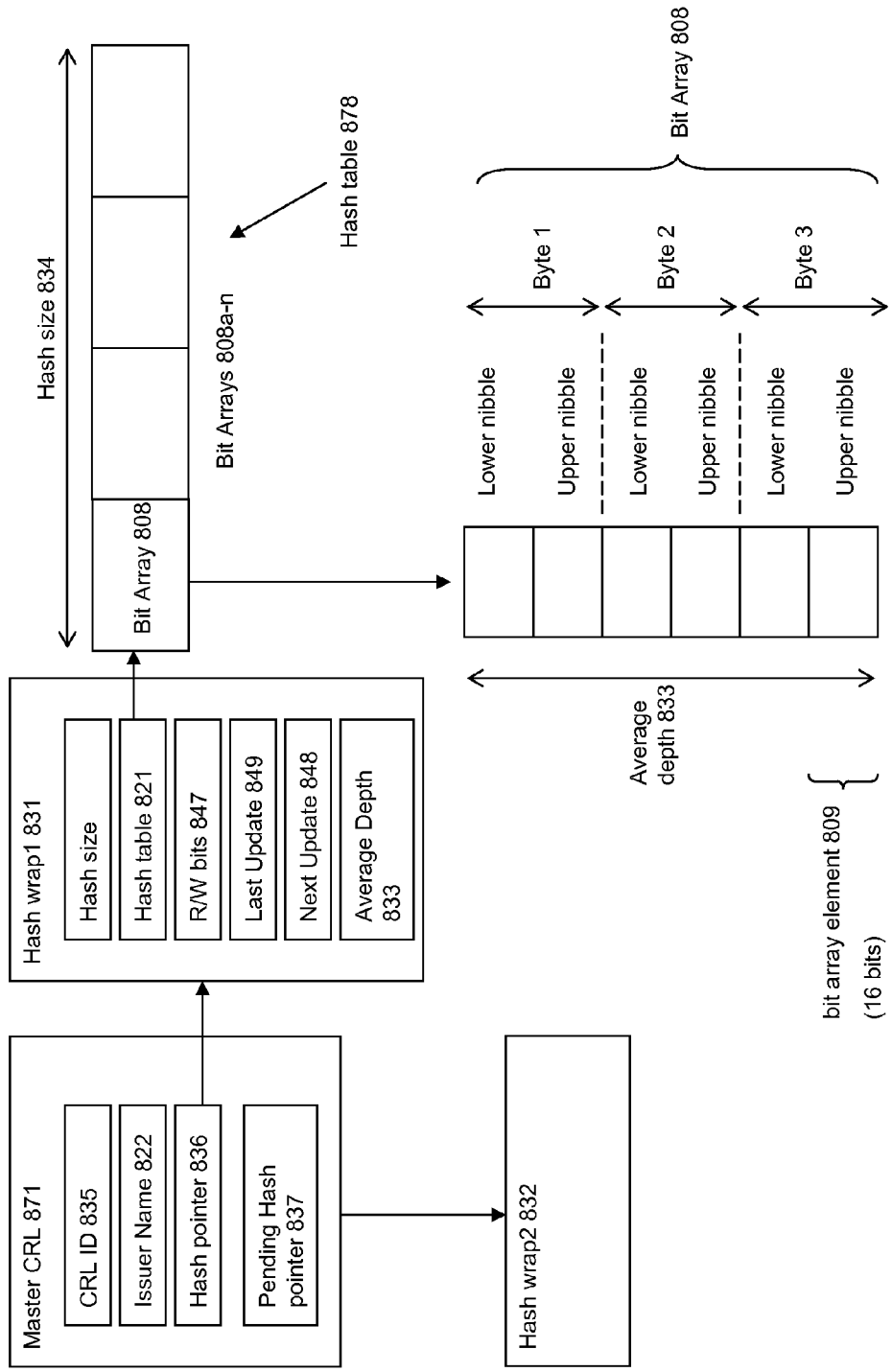

Referring now to FIG. 8D, an embodiment of a CRL is depicted. In brief overview, a CRL may be associated with at least one hash wrap 831, 832 linked to at least one bit array 808. A CRL may be a master CRL 871 or a secondary CRL 872. In one embodiment, a master CRL 871 is maintained by a master core. A secondary CRL 872 can be maintained by a core other than the master core. A secondary CRL 872 can be maintained by the master core itself. A secondary CRL 872 can be a copy of the master CRL 871, or include a portion of the master CRL 871 in any form. Information in the secondary CRL 872 may or may not be synchronized with information in the master CRL 871 at a particular instant of time.

A CRL may include one or more of a CRL identifier 835, an issuer name 822, a hash pointer 836, and a pending hash pointer 837. The CRL identifier 835 can be any type or form of alphanumeric identifier or code string for identifying the CRL. For example, when a core traverses a linked list of CRLs, the core accesses the desired CRL by identifying the CRL via the CRL's identifier 835. The CRL identifier 835 may be unique to a CRL among a plurality of CRLs, for example, a plurality of CRLs associated with a certificate issuer or CA, a core, or a multi-core system. In some embodiments, the issuer name 822 identifies the issuer (i.e., certificate authority) of the certificate associated with the CRL. The issuer name 822 can be any type or form of alphanumeric identifier or code string. In addition, the issuer name may be unique to an issuer among a plurality of certificate authorities, such as a plurality of certificate authorities associated with a multi-core system or a core.

A CRL can include at least one hash pointer 836, 837 that can be any form or type of link, identifier or pointer to a hash table (generally referred to as "hash") in memory space. In another embodiment, the hash pointer 836, 837 can be replaced by any form or type of data structure such as a hash table and function. In some embodiments, a CRL is associated with a linear list instead of a hash. Any linear lists, hash or other memory aggregate will be generally referred to as a "hash" in this disclosure. Memory space may be provided by one or more storage devices, such as any embodiment of storage devices 128, 140, 122, 264, 667 described above in connection with FIGS. 1E, 1F, 2A and 6. The storage devices may be shared and accessible by one or more cores, such as cores in a multi-core system. In some embodiments, a hash pointer points to a hash wrap 831.

A hash wrap 831 may be any form or type of construct or wrapper that includes a hash or a pointer to a hash. A hash wrap 831 may include one or more of the following elements or information: a pointer to a hash table 821, hash size 834, hash depth 833, last update of the hash, next update of the hash, and read/write bits of the hash. The pointer 821 may be any form or type of link, identifier or pointer to a hash. The pointer 821 may also be any form or type of construct including a hash.

A hash 878 may be represented as two-dimensional or three-dimensional matrix of memory bits. The hash 878 may be characterized by at least the hash size 834 and hash depth 833. The hash size 834 may represent the number of bit arrays in the hash 878. In some embodiments, the hash size 834 represents a minimum and/or maximum limit for the number of bit arrays in the hash 878. For example and in one embodiment, the hash size is a minimum of 1024. In one embodiment, the hash size is determined using the formula: hash size=(Number of revoked certificate)/4, or a modified version of this formula. A certificate serial number may be hashed or mapped into one of the bit arrays in the hash 878. In some embodiments, at least one serial number is hashed or mapped into one bit array. A plurality of serial numbers may be associated, for example, to one certificate issuer and mapped to one bit array. For example, the lower nibble (4 bits) of the first byte of each of the plurality of associated serial numbers may be calculated to yield a value (0 to 15) and the corresponding bit of the first bit array element set. Similarly, the upper nibble of the first byte of each serial number can be mapped to the second bit array element.

The hash depth 833 may represent the number of bytes of a serial number mapped into the hash. In one embodiment, not all bytes of a serial number are mapped into the hash 878. For example, the number of bytes of a serial number mapped into a bit array may be determined by an administrator or limited by the size of the hash 878. The hash depth 833 can also be determined as an average depth, for example represented by the average length of all serial numbers in the CRL.

In some embodiments, when an input is provided to the CRL 871, the associated hash 878 outputs or provides access to information in the hash 878. This functionality may be provided by a hash function of the CRL 871. In one embodiment, when a serial number and/or issuer identifier 822 is provided to the CRL 871, the hash function identifies and provides access to the bit array 808 associated with the serial number and/or issuer identifier 822. The CRL may also provide any form or type of information responsive to the input, for example, the CRL identifier 835, the read/write bits, and the update status 848, 849 of the CRL 871. In some embodiments, the CRL 871 receives an input serial number and determines if the serial number matches the entries in a bit array 808.

A bit array 808 of a hash 878 may be include any number of bits of memory. A bit array 808 may be represented as two-dimensional or three-dimensional matrix of memory bits. In one embodiment, a bit array may be characterized by the hash depth or average depth 833. A bit array 808 may also be characterized by the number of bit array elements 809 and the size of the bit array elements. For example, and in one embodiment, a bit array element includes 16 bits of memory. This may store 4 bits of information. Accordingly, two bit array elements can store a byte or 8 bits of information, such as a byte of a certificate serial number. This byte of information may include a lower nibble and an upper nibble, each of 4 bits. In this embodiment, each bit array will store or map a nibble of information, as illustrated by FIG. 8D. If the bit array 808 stores or maps three bytes of a serial number, the depth 833 of the bit array 808 may be three bytes or six bit array elements. This depth 833 is sometimes referred to as the length of the bit array 808.

The hash wrap 831, 832 may maintain and/or provide indicators such as read/write bits 847 associated with CRL 871. In some embodiments, these indicators provide functionality substantially the same as one or more of the read bit and "don't use" flag described in connection with FIG. 8B. In one embodiment, there is one read/write bit or bit-pair for each bit array of the hash 878. A read/write bit 847 may indicate if an associated bit array 808 is being accessed by a core. A second core may not access the bit array 808 if the bit array 808 is being accessed by another core. In one embodiment, accessing a bit array retrieves the bit array information into memory, such as volatile memory. In another embodiment, accessing a bit array stores the bit array 808 into registers. In some embodiments, once a core modifies a bit array 808, the memory or registers holding the bit array is flushed after moving the modified bit array into the hash 878.

The hash wrap 831, 832 may maintain and/or provide information or indicators regarding the update status of a bit array or the hash. In one embodiment, the hash wrap includes a last update indicator 849 and/or a next update indicator 848. A last update indicator 849 may represent any form or type of timestamp for a previous modification an/or access to a bit wrapper 808 and/or the hash 878. A next update indicator 848 may represent a specified time at which the CRL 871 allows or expects a next modification and/or access to happen. In one embodiment, the next update indicator 848 value may be determined from the last update indicator 849 value. For example, the next update indicator 848 value may be calculated to be a predetermined time duration after the time indicated by the last update indicator 849. In another embodiment, one or more of these indicators are updated when a new bit array is populated and/or a bit array is modified or accessed.

In some embodiments, a CRL includes a second hash pointer, such as a pending hash pointer 837. A pending hash pointer 837 may or may not be substantially similar to the hash pointer 836. In one embodiment, a pending hash pointer 837 may be used during the creation of a new CRL, or while a current CRL is accessed or modified by another core. For example, when a CRL is replaced or refreshed, the master core for the CRL may create a pending hash in connection with the pending hash pointer 837. When the pending hash is complete or refreshed and ready to replace the old hash 878 indicated by the hash pointer 836, the hash pointer 836 can switch over to the pending hash. In some embodiments, the old hash is maintained, for example, to avoid memory leak. In other embodiments, the old hash is maintained in memory, for example, because another core may be accessing it. In some other embodiments, the old hash is deleted from memory.

The following are illustrative embodiments of constructs and/or data structures for defining and implementing a CRL, and are not to be construed as limiting in any way. One embodiment of a data structure for a CRL is illustrated as follows:

```
typedef struct ns_mpcrl_struct
{
  NS_TAILQ_ENTRY(_ns_mpcrl_struct) mpcrl_list;
  u08bits crlname[SSL_CRL_NAME_LEN];
  u08bits *issuerDER;
  u32bitsissuerLen;
  volatileu32bits flag;
  ns_mpcrl_hsh_wrap *hshw;
  ns_mpcrl_hsh_wrap *pending_hshw;
} ns_mpcrl_struct;
where,
  crlname:    can be an identifier for the CRL;
  issuerDER:  can be an identifier for issuer of the CRL;
  hshw:       may point to a bit array of a CRL. In some
  embodiments, this points to information associated with a CRL.
  Consequently, a master core can switch to a completely new set of
  information by switching this pointer.
  pending_hshw:  can be a pending hash wrap.
:
```

One embodiment of a data structure for a hash wrap is illustrated as follows:

```
typedef struct ns_mpcrl_hsh_wrap
{
  u32bits   hsize;
  u32bits   avgdep;
  volatile  u32bits per_cpu_rdbits;
  u08bits   *lastUpdateDER;
  u32bitslastUpdateLen;
  u08bits   *nextUpdateDER;
  u32bitsnextUpdateLen;
  ns_mpcrl_hsh *hsh;
} ns_mpcrl_hsh_wrap;
where,
  hsize:           can be the hash size of the hash.
  avgdep:          can be the number of bytes of a serial number
  mapped into the hash.
  per_cpu_rdbits:  can be the read bit for a bit array, CRL or hash.
  lastUpdateDER:   can be a last update indicator.
  nextUpdateDER:   can be a next update indicator.
  hsh:             can be a pointer to the bit array hash. This pointer
  can have hsize bit arrays and each bit array can have avgdep number of
  bit array elements.
```

One embodiment of a data structure for a hash is illustrated as follows:

```
typedef struct ns_mpcrl_hsh
{
  volatile u16bits *bitarr;
```

```
} ns_mpcrl_hsh;
where,
  bitarr: can be the bit array, comprising an array of 16 bit memory
  elements.
```

A function such as ns_mpcrl_addstruct may be called to add a new CRL. This function can access a dead node from a linked list, and can define or set a CRL identifier, issuer identifier, validation time and other information to initiate the node and the CRL. The function can create the primary hash. When the new CRL is created, the function can reset the dead node flag.

A function such as build_crl_hash can be used to build a hash of bit arrays. The function may initialize the hash pointer of a hash wrap. Further, this function can allocate a number of bit array elements for the hash corresponding to the hash size. This function can also allocate(avgdep*2) bit array elements of 16 bits each to each bit array. The function may process a list of serial numbers and set the corresponding bits in the bit arrays.

Referring now to FIG. 8D, an embodiment of a system 800 for maintaining a CRL for a multi-core system is depicted. In brief overview, the system includes a first core 505*a* maintaining a master CRL 871, and a second core 505*b* having access to a secondary CRL 872. One or both of these cores may include a certificate manager 888, 889 and a CRL generator 886. When the second core 505*b* receives a client request with a certificate associated with the first CRL 871, the certificate may be verified against the secondary CRL 872. The secondary CRL 872 may be used to validate the certificate or provisionally revoke the certificate. When a certificate is provisionally revoked, the revocation status is verified against the master CRL 871.

Figure 8E:
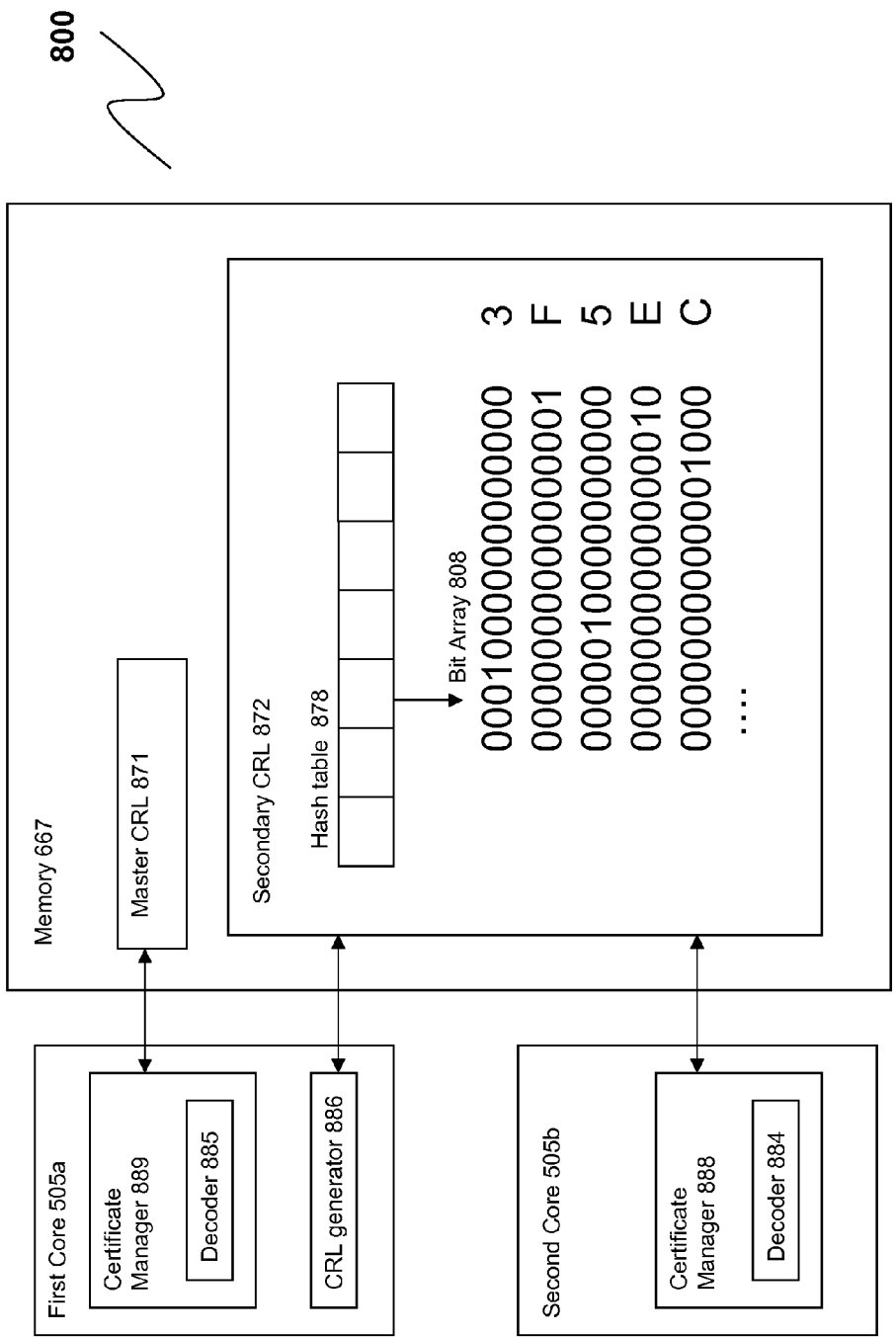
FIG. 8E is a block diagram of an embodiment of a multi-core system supporting certificate revocation lists (CRL) for client access.

In further details of FIG. 8E, any of the cores, such as the first core 505*a* and the second core 505*b*, may share a memory 667 that stores at least one of the master CRL 871 and the secondary CRL 872. In some embodiments, cores other than a master core do not have access to the master CRL 871. These cores may be cores from a multi-core system described above in connection with FIGS. 5A-5C. The memory 667 may be any type or form of memory 128, 140, 122, 264, 667 described above in connection with FIGS. 1E, 1F, 2A and 6. The memory may reside in the same machine as the cores, or may be accessible through a network by the cores.

A core 505*a* maintaining the master CRL 871 is sometimes referred to as the master core 505*a*. The second core associated with a secondary CRL 872 is sometimes referred to as a slave core. In some embodiments, the master core 505*a* maintains the master CRL 871 that contains the main CRL data structure. In a multi-core system, slave cores, including the second core 505*b* may not be able to access this main CRL data structure.

The secondary CRL 872 may include data structure and functionality substantially similar to, or the same as the master CRL 871. In some embodiments, the secondary CRL 872 is a copy or partial copy of the master CRL 871. The secondary core 872 may be a compressed version or form of the master CRL 871. The secondary core 872 may have a reduced footprint relative to the master CRL 871. The secondary core 872 may include any type and form of partial or reduced data structure in relation to the master CRL 871. The secondary CRL 872 may be maintained or partially maintained by a master core 505*a*. The secondary CRL 872 may be maintained or partially maintained by any of the cores.

In some embodiments, the secondary core can be accessed by a plurality of cores in the multi-core system, including the first core 505a and the second core 505b. The secondary CRL 872 is sometimes referred to as a shared hash table. In some of these embodiments, the master core 505a can update the master CRL 871 while other cores may not be allowed to update the master CRL 871. In one embodiment, a second core 505b may be conditionally allowed to update the master CRL 871. In another embodiment, the secondary CRL 872 may be updated by the master core 505a via the second core 505b. The secondary CRL 872 may be generated by the first core 505a or the second core 505b. The secondary CRL 872 can be added into a node of a linked list maintained by the second core 505b. The secondary CRL 872 can also be part of a new node added into a linked list.

In some embodiments, the first core 505a generates the master CRL 871 and/or the secondary CRL 872 via a CRL generator 886. The CRL generator 886 may comprise hardware or any combination of software and hardware. The CRL generator 886 may include an application, program, library, script, process, task, thread or any type and form of executable instructions. Although the CRL generator 886 is illustrated as part of the first core 505a, in some embodiments, the CRL generator 886 may be a separate component of a multi-core system or in communication with the multi-core system. The CRL generator 886 may be designed and constructed to generate any type and form of CRLs, including the data structures for the master CRL 871 and the secondary CRL 872. In some embodiments, the CRL generator 886 executes one or more functions to generate a CRL, such as the ns_mpcrl_addstruct function and the build_crl_hash function described above. In other embodiments, the CRL generator 886 includes functionality from the ns_mpcrl_addstruct and build_crl_hash functions to generate a CRL. The CRL generator 886 may generate a CRL as defined by one or more of the ns_mpcrl_struct, ns_mpcrl_hsh_wrap and ns_mpcrl_hsh data structures described above. The CRL generator 886 may generate a CRL in accordance or substantially similar to that described in connection with FIGS. 8A and 8D.

Each core 505 may include a certificate manager 888, 889. The certificate manager may comprise hardware or any combination of software and hardware. The certificate manager may include an application, program, library, script, process, task, thread or any type and form of executable instructions. Although the certificate manager is illustrated as part of a core 505, in some embodiments, the certificate manager may be a separate component or module of the multi-core system or a component in communication with the multi-core system. In one embodiment, the certificate manager 888 includes the CRL generator 886. In another embodiment the CRL generator 886 includes the certificate manager 888. In another embodiment, the certificate manager 888 shares functionality with the CRL generator 886 and/or operate in communication with each other.

The certificate managers 888, 889 can maintain a CRL on behalf of a core. The certificate manager may generate, update, refresh, delete, or otherwise process a CRL. The certificate manager can extract and process a certificate received in a request. The certificate manager may specify a certificate for inclusion in a CRL. The certificate manager can also validate a certificate against a CRL. For example, and in one embodiment, the certificate manager 889 of a master core 505a can determine whether to revoke a certificate from a request. In another embodiment, the certificate manager 888 of a second core 505b determines whether to validate a certificate. In still another embodiment, the certificate manager 888 of a second core 505b provisionally determines whether to revoke a certificate. If the certificate manager 888 provisionally revokes a certificate, the certificate manager 888 may communicate with the master core 505a to verify the revocation status.

The certificate managers 888, 889 may communicate amongst each other using any type or form of conventional, standard or proprietary message exchange and/or handshaking methods. The certificate managers 888, 889 may be designed and constructed to communicate in accordance with any type and form of protocol. One embodiment of inter-core communication between components of two cores is core-to-core messaging (CCM). For example, a certificate manager 888 can send a CCM message to the master core 505b or the certificate manager 889 of the master core to verify a revocation status. A CRL generator 886 can communicate to a certificate manager 888 of the second core 505b via CCM to update a secondary CRL 872 in accordance with a master CRL 871.

Each certificate manager 888, 889 may include a cipher or a decoder 884, 885. The decoder may comprise hardware or any combination of software and hardware. The decoder may include an application, program, library, script, process, task, thread or any type and form of executable instructions. In one embodiment, the decoder may include a general-purpose decoder. In another embodiment, the decoder is designed and constructed to process certificate information, such as any information related to a certificate authority or a certificate. For example, a decoder may process issuer identifiers and/or certificate serial numbers for accessing or updating a CRL.

In one embodiment, a decoder 885 of a master core receives certificate information to add to a CRL. The decoder 885 may decode, decrypt, calculate, hash, or otherwise determine an index into the hash table 878' of the master CRL 871, using the certificate information. The hash table 878' may be built on the issuer identifier and/or serial number of the certificates identified as revoked. An index into the hash table 878 may identify a bit array for mapping the serial number of a certificate for revocation. The certificate manager 889 may then map at least a portion of the serial number into the identified bit array. In some embodiments, a decoder 885 may identify a bit array for mapping more than one certificate serial numbers. For example, these serial numbers may belong to certificates associated with the same issuer or CA. Each bit array element of the identified bit array may therefore have more than one bit set via the mappings.

Using the example and embodiment depicted in FIG. 8E, a portion of a serial number of a certificate is already mapped onto the identified bit array 808. This bit array stores information associated with only one serial number. For example, the first byte of the serial number is 00111111 in binary format. The lower nibble is 0011 and the upper nibble is 1111. The lower nibble is translated or otherwise decoded by the decoder 885 to be hexadecimal number 3. In this embodiment, each bit array element includes 16 bit positions corresponding to hexadecimal numbers 0 through F. Therefore, the lower nibble is mapped into the first element (top row of binary numbers) of the bit array at the hexadecimal number 3 position. Similar, the upper nibble is mapped to the F position of the second element. For each position mapped, the bit of the position may be set as 1, or toggled from an initial state (such as 0). Once set, the position may not be reset or toggled if another serial number is mapped onto the same bit array. This bit array mapping is sometimes referred to as a partial CRL Trie.

In one embodiment and by way of illustration, a decoder 884 of a second core or slave core 505b receives certificate information for validation. The decoder 884 may decode, decrypt, calculate, hash, or otherwise determine an index into the hash table 878 of the secondary CRL 872, using the certificate information. An index into the hash table 878 may identify a bit array for validating against the serial number of the certificate. The decoder translates or otherwise decodes at least a portion of the serial number into hexadecimal positions as described above. The certificate manager 889 may then perform a bit scan of each bit array element of the identified bit array against the hexadecimal positions. For example, if the bit scan of any element (or row) does not match, the present serial number has not been previously specified in the CRL 872 for revocation. This can be true even if the bit array maps a plurality of serial numbers. This can also be true even if the bit array only maps a portion of a serial number for revocation. This may also be true whether the bit scan is applied to a master CRL 871 or a secondary CRL 872. In this embodiment, the certificate manager 888 determines that the serial number is valid or active (not revoked).

If a bit scan of a certificate against a master CRL 871 matches perfectly, the certificate manager 889 may determine that the certificate is revoked. If a bit scan of a certificate against a secondary CRL 871 matches perfectly, the certificate manager 889 may provisionally determine that the certificate is revoked. This provisional determination may be due to a number of reasons. For example, and in one embodiment, if the bit array only maps a portion of a serial number, the bit scan match may represent only that portion of the serial number. Therefore, the certificate manager 888 may not completely sure that a certificate being validated should be revoked. In another embodiment, where a plurality of serial numbers are mapped to a CRL bit array, the number of bits set in a bit array can create additional combinations of serial numbers that will result in a bit scan match. A CRL bit array 808 may more accurately predict a certificate revocation if fewer serial numbers are mapped into the bit array 808. A CRL bit array 808 may more accurately predict a certificate revocation if longer portions of serial numbers are mapped and compared.

Figure 9:
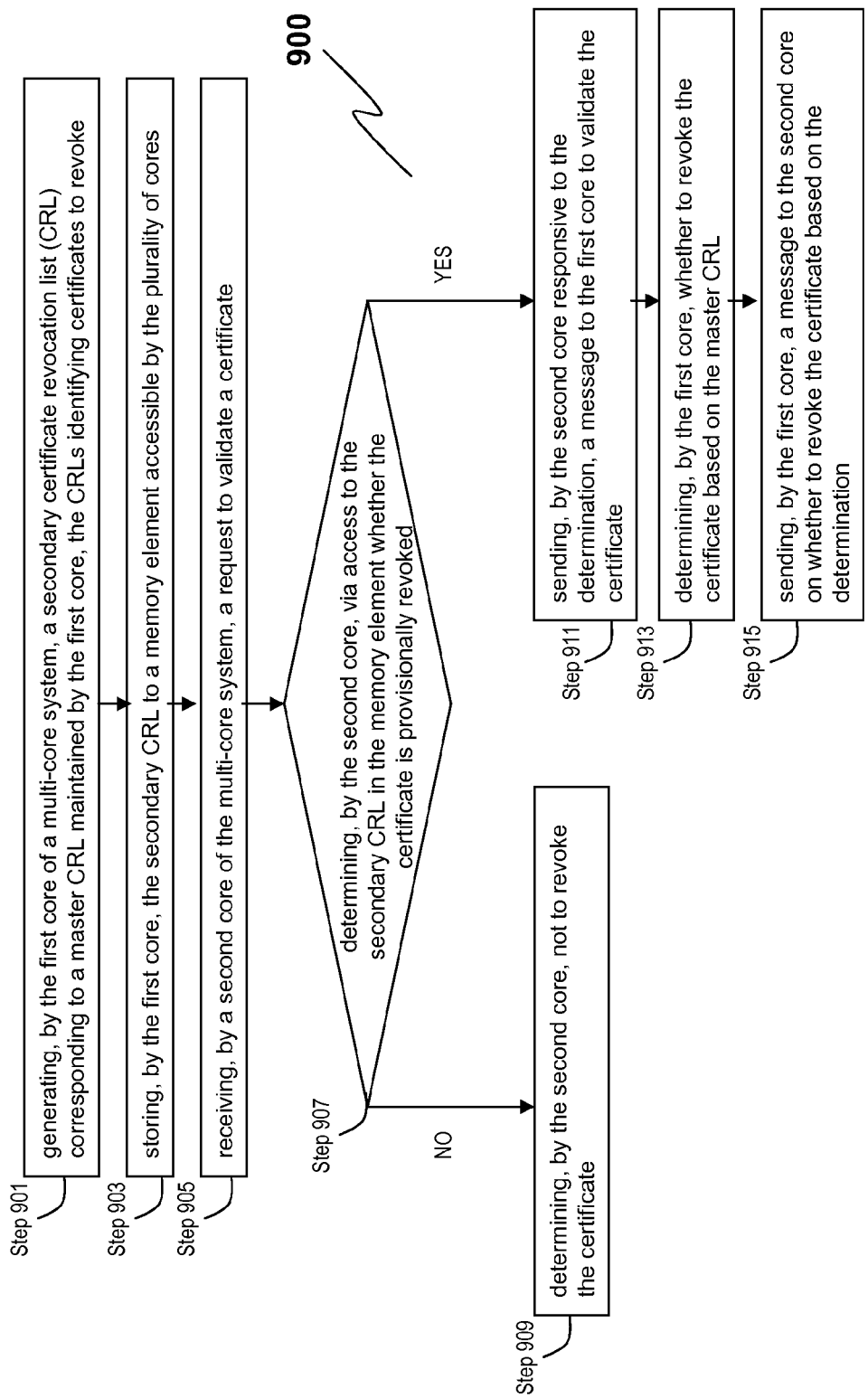
FIG. 9 is a flow diagram of an embodiment of steps of a method for maintaining a certificate revocation list (CRL) for a multi-core system.

Referring now to FIG. 9, a flow diagram depicting an embodiment of steps of a method 900 for maintaining a certificate revocation list (CRL) for a multi-core system is shown. In brief overview, at step 901, the first core of a multi-core system generates a secondary CRL 872 corresponding to a master CRL 871 maintained by the first core, the CRLs identifying certificates to revoke. At step 903, the first core stores the secondary CRL to a memory element accessible by the plurality of cores. At step 905, a second core of the multi-core system receives a request to validate a certificate. At step 907, the second core provisionally determines, via access to the secondary CRL in the memory element, whether the certificate is revoked. At step 909, the second core determines not to revoke the certificate. At step 911, responsive to the determination, the second core sends a message to the first core to validate the certificate. At step 913, the first core determines whether to revoke the certificate based on the master CRL. At step 915, the first core sends a message to the second core on whether to revoke the certificate based on the determination.

In further details of step 901, the first core of a multi-core system generates a secondary CRL 872 corresponding to a master CRL 871 maintained by the first core, the CRLs identifying certificates to revoke. In some embodiments, the master CRL identifies certificates to revoke and the secondary CRL identifies certificates to provisionally revoke and certificates not to revoke. The secondary CRL 872 may be generated in parallel with, or after the master CRL 871 is formed. In some embodiments, a first or master core 505*a* generates, via a CRL generator 886 of the master core, a master CRL 871 to identify certificates to revoke. The CRL generator may allocate memory 667 from any storage device to store and maintain the master CRL 871. The CRL generator 886 may execute one or more functions to generate the master CRL 871, such as the functions ns_mpcrl_addstruct and build_crl_hash described above.

Furthermore, the CRL generator 886 may generate the master CRL 871 substantially similar to the methods described in connection with FIGS. 8A, 8D and 8E. For example, the CRL generator 886 may create the data structures for the master CRL 871 and the associated hash wraps and hash 878. In addition, the CRL generator 886 can operate with a decoder 885 of the first core 505*a* to decode or otherwise determine an index into the generated hash 878 based on certificate information. The decoder can also translate certificate information, such as a serial number of the certificate, into data to include in the master CRL 871. The CRL generator 886 and/or the certificate manager 889 of the first core 505*a* can then map this data into a bit array of the master CRL 871 based on the determined index. A number of serial numbers corresponding to the certificates to be revoked may be mapped into the master CRL 871. Other embodiments of steps in the generation and maintenance of any component of the master CRL 871 are described in connection with FIGS. 8A-8E.

In some embodiments, the first core 505*a* generates a secondary CRL 872 corresponding to the master CRL 871. The CRL generator 886 may determine whether to generate a secondary CRL based on information associated with the master CRL 871. The CRL generator 886 may generate a secondary CRL based on a message from the second core 505*b*, such a request to validate a certificate received by the second core 505*b*. The CRL generator 886 may generate a secondary CRL based on a determination that a request from second core is a first request to access the master CRL 871. The CRL generator 886 may also generate a secondary CRL based on a determination that the second core 505*b* is not able to access the master CRL 871.

The first core 505*a* can generate, via the CRL generator 886, the secondary CRL 872. The first core 505*a* may generate the secondary CRL 872 in the same way as, or substantially similar to, the generation of the master CRL 872. The CRL generator 886 may generate the secondary CRL to comprise a plurality of bit arrays. The CRL generator 886 may assign each bit array to at least one certificate and set bits of a serial number of each certificate in the assigned bit array.

In one embodiment, the CRL generator 886 generates the secondary CRL 872 as a copy or a partial copy of the master CRL 871. The CRL generator 886 may also generate the secondary CRL 872 using information of the master CRL 871. In another embodiment, the CRL generator 886 generates the secondary CRL 872 using a different or reduced data structure with respect to the master CRL 872. The CRL generator 886 may also generate the secondary CRL 872 as a compressed version or form of the master CRL 871. The secondary CRL 872 may not include all CRLs and/or bit arrays of the master CRL 871. The secondary CRL 872 may have a smaller memory footprint relative to the master CRL 871. Further, the CRL generator 886 may use a subset of the information in the master CRL 872 to generate the secondary CRL 872. The CRL generator 886 may also generate the secondary CRL 872 via the second core 505*b*, such as via a CRL generator 886' of the second core. The CRL generator 886 may also generate the secondary CRL 872 via the second core 505*b* using CCM.

The CRL generator 886 may generate the secondary CRL 872 as an approximation of the master CRL 871. In some embodiments, the CRL generator 886 maps at least a portion of each serial number from the master CRL 871 into a hash of the secondary CRL. The CRL generator 886 may use less resources (e.g. memory) to generate and/or store the secondary CRL relative to the master CRL 871. The CRL generator 886 may also generate the secondary CRL as a first level determination for validating a certificate. In some embodiments, the CRL generator 886 generates the secondary CRL to limit inter-core communications, such as communications with the first core 505*a* to access the master CRL 871. The CRL generator 886 may generate the secondary CRL 872 to optimize or facilitate shared access by a plurality of cores.

At step 903, the first core stores the secondary CRL to a memory element accessible by one or more, or all of the plurality of cores. The CRL generator 886 may allocate memory 667 in one or more storage devices accessible by the plurality of cores for storing the secondary CRL 872. In addition, the CRL generator 886 may update an existing node of a linked list to include the secondary CRL 872. The CRL generator 886 may add a node to an existing linked list of the second core to include the secondary CRL 872. In some embodiments, the CRL generator 886 configures and/or stores the secondary CRL into a dead node of a linked list. Responsive to storing the secondary CRL into the dead node, the CRL generator 886 can reset the dead node flag of the dead node to make the node active.

In some embodiments, the second core 505*b* stores the secondary CRL to a memory element accessible by one or more, or all of the plurality of cores. For example, the second core 505*b* may store the secondary CRL to the memory element in response to a message from the first core 505*a*. The secondary CRL may be generated substantially in the manner whether by the first core 505*a*, the second core 505*b*, or any other component associated with the multi-core system. In some embodiments, the secondary CRL is stored to a memory element only accessible by the first core 505*a* and/or the second core 505*b*. The first core 505*a* and/or the second core 505*b* may allow a third core to access the stored secondary CRL. The secondary CRL may be stored in memory space allocated to the first core 505*a* and/or the second core 505*b*.

The first core 505*a* may notify a second core 505*b* of a location to access the stored secondary CRL, for example, in response to a request to validate a certificate. The first core 505*a* may notify a plurality of cores of the location to access the secondary CRL 872. The location to access the secondary CRL 872 can be a shared location for a plurality of cores. The notification may be sent via a broadcast or via a dedicated message to a core. The notification may be sent in response to a polling request, a request to validate a certificate or any event associated with certificate and/or CRL processing. For example, the notification may be sent upon generation and/or update of the secondary CRL 872. The notification may also be sent according to any type or form of schedule.

In some embodiments, any of the operations described in connection with step 903 may be performed by at least one of the CRL generator 886 and the certificate manager 888 of a core. In some embodiments, any of the operations described in connection with steps 905 through 915 may be performed by at least the certificate manager 888 and/or decoder 884 of the second core 505*b*.

At step 905, a second core of the multi-core system receives a request to validate a certificate. The second core may receive the request via a flow distributor 550 or load-balancing module of the multi-core system. The flow distributor 550 or load-balancing module of the multi-core system may determine that the second core 505*b* can access the secondary CRL 872 in association with processing the request. In one embodiment, the second core 505*b* may receive the request directly from the client 102. In another embodiment, the second core 505*b* may receive the request via the first core 505*a*. In still another embodiment, the second core 505*b* may receive the request via a third core 505*c*. The second core 505*b* may receive the request as a CCM message.

The second core 505*b* may receive the request because the first core 505*a* and/or the master CRL 871 is not available. The second core 505*b* may receive the request as part of a request by a client to resume or reuse a session of another core. The second core 505*b* may receive the request because the request is not validated by a third core. For example, the third core may not have access to the CRL, or do not have enough information to revoke and/or validate a certificate. The second core 505*b* may receive the request via a transceiver of the second core 505*b* or via the certificate manager 888.

In some embodiments, the second core accesses shared memory 667 to access the secondary CRL 872. The second core 505*b* may access the memory element via authorization, for example, via direct authorization by the first core 505*a*. The second core 505*b* may access the memory element via affiliation, for example, via affiliation to a plurality of cores allowed to access and/or having knowledge of the memory element. In some embodiments, the second core 505*b* may reject the request to validate the certificate, for example, due to incomplete information in the request. The second core 505*b* may decode or otherwise process the request to determine if the second core 505*b* has access to the secondary CRL 872. The second core 505*b* may decode or otherwise process the request to determine information about the certificate, such as the issuer and/or serial number of the certificate. The second core 505*b* may determine that the secondary CRL 872 is a CRL corresponding to the master CRL 871. In some embodiments, if the secondary CRL 872 is not available or is corrupted, the second core sends a message to the first core (see step 911).

At step 907, the second core provisionally determines, via access to the secondary CRL in the memory element, if the certificate is revoked. The second core may decode or otherwise process the request to determine which CRL and/or bit array to access. The second core may determine the memory address of the secondary CRL 872, for example using any of the information included in the request. A bit array can be identified based on an issuer name 822 included in the request. For example, the second core may identify a bit array of the secondary CRL to validate the certificate, the identification based on applying a hash function on the name of the certificate's issuer. The second core may determine if the secondary CRL is being accessed and/or modified by another core or process. If so, the secondary CRL may postpone access to the secondary CRL 872, attempt to access the master CRL 871 or another CRL, or forward the request to the first core 505*a*.

The second core 505*b* may access the secondary CRL 872 and/or the identified bit array via pointers or addresses associated with any type and form of data structures, such as data structures described in connection with FIGS. 8A-8E. The second core 505*b* may traverse one or more linked lists of CRL nodes to access the secondary CRL 872 and/or the identified bit array. In accessing the secondary CRL 872 and/or the identified bit array, the second core may set the read bits and/or "don't use" flag of the secondary CRL 872 and/or the bit array. After accessing the secondary CRL 872 and/or the identified bit array, the second core may reset the read bits and/or "don't use" flag of the secondary CRL 872 and/or the bit array. The second core may compare at least one bit array against the certificate. For example, at least a portion of a serial number of the certificate is compared against each bit array.

In some embodiments, the second core may perform a bit scan of the identified bit array against a serial number of the certificate, the serial number comprising a plurality of bits. One or more bytes of the serial number may be compared. The second core 505*b* may perform a bit scan of a bit array against one or more bytes of the serial number. For example, for each nibble of a byte of the serial number, a position of an element of the bit array is identified and checked. In some embodiments, if the position is set, there is a match in the corresponding nibble of the serial number. If the position is not set, there is a mismatch for the corresponding nibble. In one embodiment, the validation process stops or terminates when a mismatch occurs. In another embodiment, the validation process continues when a mismatch occurs, either in the same bit array, or in another bit array of the secondary CRL 872 and/or another CRL. The validation process may stop or terminate when a predetermined number of mismatches is found, for example, 5 mismatches over each bit array.

In some embodiments, the second core determines that the certificate is provisionally revoked based on a matching bit scan against a serial number of the certificate. In other embodiments, the second core determines that the certificate is not revoked based on a non-matching bit scan against a serial number of the certificate. The second core may determine whether the certificate is revoked, for example based on a mismatch or a number of mismatches. The second core may provisionally determine whether to revoke the certificate, for example based on a mismatch or a number of mismatches. If the second core 505*b* determines that the certificate is not revoked, the validation process may proceed to step 909.

If the second core 505*b* provisionally determines that the certificate is revoked, the validation process may proceed to step 911. If the second core 505*b* provisionally determines that the certificate is not revoked, the validation process may proceed to step 911. The second core may make a provisional determination, for example, because the secondary CRL 872 provided insufficient information to make a final determination. As an example, the second core may determine that the secondary CRL 872 is corrupted or is empty, and cannot make a final determination. If a provisional determination is made, the request may be put on hold until a final determination is made, for example, a final determination by the first core 505*a*.

In some embodiments, the second core 505*b* makes a determination based in part on any type or form of history and/or statistical records of requests and/or certificates related to a client and/or a certificate issuer. If the second core determines to revoke the certificate, the request may be denied. If the certificate is revoked, the client may send a new request, for example, with another certificate or to another core of the multi-core system. In some embodiments, the client may attempt to send the same request or a new request to the first core 505*a*.

At step 909, the second core 505*b* determines that the certificate is not revoked. The second core may determine, by, via access to the secondary CRL in the memory element that the certificate is not revoked. In response to one or more mismatches, the second core 505*b* may determine that the certificate is not revoked. In some embodiments, the second core is able to determine with high accuracy that the certificate is not revoked. In other embodiments, the second core is able to make a final determination that the certificate is not revoked. The second core 505*b* may allow the request based on the determination that the certificate is not revoked. The second core 505*b* may determine not to send a message to the first core based on the determination that the certificate is not revoked.

At step 911, responsive to the determination, the second core 505*b* sends a message to the first core to validate the certificate. This message can be a CCM message. In some embodiments, the second core 505*b* sends a message to the first core to validate or further validate the certificate. In one embodiment, the second core and/or the secondary CRL 872 may not have enough information to validate the certificate. In another embodiment, the second core may provisionally determine to revoke and/or not to revoke a certificate for certain requests, certificates and/or issuers.

The second core 505*b* may send a message to the first core 505*a* based on the request. The second core 505*b* may send a message including the provisional determination. The second core 505*b* may send a message including the certificate. The second core 505*b* may send a message including the issuer identifier and serial number of the certificate. The second core 505*b* may send a message including information from at least one of: the request, the provisional determination, and the secondary CRL 872. For example, the second core 505*b* may send information regarding one or more bytes of the serial number that have been validated against the secondary CRL 872. The second core 505*b* may forward the second request to the first core 505*a*, or modify the request before sending to the first core 505*a*. The first core may receive the message via a transceiver or via the certificate manager 889.

At step 913, the first core determines whether to revoke the certificate based on the master CRL. The first core 505*a* may determine whether to revoke the certificate via operations substantially similar to operations of the second core 505*b* described in connection with step 907. The first core may determine whether to revoke the certificate based on a list of certificates to revoke. This list may be maintained in the master CRL 871. A determination to revoke may be based on a check against the complete serial number, or a portion of the serial number. The first core can make a final determination on whether to revoke the certificate, based at least in part on the master CRL 871 and/or the request.

At step 915, based on the determination, the first core sends a message to the second core on whether to revoke the certificate. The first core 505*a* sends, via a transceiver or the certificate manager 889, a message to the second core 505*b*. This message can be a CCM message. The first core 505*a* may send a message including one or more of: the determination to revoke or not to revoke the certificate, a directive to allow or disallow the request, and information to help the second core make a determination on whether to revoke the request. In some embodiments, the first core sends a message including information to update the secondary CRL 872. Based on information from the first core 505*a* and/or updates to the secondary core 505*b*, the second core may make a determination on whether to revoke the request.

In some embodiments, based on a final determination not to revoke the certificate, a requested connection with the client is established, completed or resumed. Based on a final determination to revoke, a requested connection with the client is denied. The second core 505*b* may send a message to the client regarding the denial. If denied, the client 102 may send a new request, for example, with a new certificate.

In one embodiment, and by way of illustration, a secondary CRL, or a reduced size CRL in shared memory may include a hash table with minimal information. This minimal information may be sufficient for a provisional determination but not for a final determination on whether to revoke a certificate. This minimal information is used to make a determination or provisional determination on whether to revoke a certificate. Each core other than the first or master core can refer to the secondary CRL before deciding whether to communicate with the first core 505*a*. For example, the first core may generate a 16-bit hash value (16-bit hash function) corresponding to a 64K bits hash array. The 16-bit hash value can be associated with a revoked certificate, for indexing into the 64K bits hash array. The bit or location in the hash array identified by the hash value (hv1) can be set, e.g., Set array [hv1]=1. For validation of a received certificate, a 16 bit hash value (hv2) of the certificate is determined or generated. Using the hash value to index into the hash array, if array [hv2]=1, the certificate is provisionally determined to be revoked. A CCM message may be sent to the first core to make a final determination of the revocation status. The certificate is determined to be not revoked if array[hv2]=0. In this embodiment, 64K bits or 8K bytes of memory space is required for the hash array.

In another embodiment, and by way of illustration, a hashed trie method and system may be used. For example, the first core may generate a hash value (e.g., 16-bit value) for a revoked certificate. A hash array with a bit array corresponding to the hash value is generated by the CRL generator. The CRL generator may set the bits of the hash array according to the methods described in connection with FIGS. 8E and 9. To validate a received certificate, a hash value for the received certificate is determined or generated. If this values indexes to a valid bit array, a bit scan is performed and a determination of the revocation status made in accordance with the methods described in connection with FIGS. 8E and 9. In one embodiment, we may have 1,000,000 serial numbers and a 32K hash array. An average of four provisional determinations of revocation per array may result. A reduced number of provisional determinations may result in reduced CCM communication with the master core 505*a*.

In the various embodiments described in this disclosure, bit lengths and sizes of elements, arrays, tables and hashes are provided only for illustration and are not limiting in any way. These units and/or values may be modified or adapted without departing from the spirit and scope of the invention.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the invention has been particularly shown and described with reference to specific embodiments, it should be understood by those skilled in the art that various changes in form and detail may be made therein without departing from the spirit and scope of the invention as defined by the following claims.

What is claimed is:

1. A method of identifying a not resumable secure sockets layer (SSL) session, the method comprising:
   a) identifying, by a first packet engine of a first core of a multi-core system, that an SSL session is not resumable;
   b) setting, by the first packet engine responsive to the identification, at a location in memory accessible by a second core of the multi-core system, an indicator to indicate that the SSL session is not resumable;
   c) receiving, by a second packet engine of a second core of the multi-core system, a request identifying the SSL session established by the first core; and
   d) determining, by the second packet engine, that a core different from the second core established the SSL session, the second packet engine not resuming the SSL session responsive to the determination.

2. The method of claim 1, wherein step (a) further comprises receiving, by the first packet engine of the first core of the multi-core system deployed as an intermediary between the client and a server, a notification that the SSL session is not resumable.

3. The method of claim 1, wherein step (a) further comprises determining, in accordance with a policy, by the first packet engine of the first core of the multi-core system deployed as an intermediary between the client and a server, that the SSL session is not resumable.

4. The method of claim 1, wherein step (b) further comprises storing, by the first packet engine, to the location in the memory a value for a resumable field associated with the SSL session to indicate if the SSL session is resumable.

5. The method of claim 1, wherein step (c) further comprises determining, by a flow distributor of the multi-core system, to forward the request to the second core based on a source port indicated by the request.

6. The method of claim 1, wherein step (c) further comprises receiving the request comprising a session identifier, the session identifier identifying that the first core established the SSL session.

7. The method of claim 6, wherein step (d) further comprises decoding, by the second packet engine, a core identifier from a byte of the session identifier.

8. The method of claim 6, wherein step (d) further comprises determining, by the second packet engine, that the session identifier is not in a session cache of the second core.

9. The method of claim 1, wherein step (d) further comprises identifying, by the second packet engine, from a session identifier of the SSL session that the second core is not the establisher of the SSL session.

10. The method of claim 1, further comprising removing, by the second packet engine, information about the SSL session from a session cache of the second core.

11. The method of claim 1, further comprising establishing, by the second packet engine, a second SSL session responsive to the request.

12. The method of claim 1, further comprising determining, by the second packet engine, whether a predetermined maximum reuse threshold has been reached.

13. A method of identifying an secure sockets layer (SSL) session as not resumable, the method comprising:
   a) indicating, by a first processor of multiple processors, that an SSL session is not resumable;
   b) setting, by the first processor responsive to the indication, an indicator at a location in memory accessible by each processor of the multiple processors, the indicator indicating that the SSL session is not resumable;
   c) receiving, by a second processor of the multiple processors, a request to resume the SSL session established by the first processor, the request comprising a session identifier of the SSL session, the session identifier identifying the first processor as an establisher of the SSL session; and
   d) identifying, by the second processor, from encoding of the session identifier that the second processor is not the establisher of the SSL session, the second processor not resuming the SSL session responsive to accessing the indicator at the location.

* * * * *